(12) United States Patent
Rinker et al.

(10) Patent No.: US 9,950,933 B1
(45) Date of Patent: Apr. 24, 2018

(54) WATER PITCHER SYSTEM

(71) Applicant: Brita LP, Oakland, CA (US)

(72) Inventors: Edward B. Rinker, Pleasanton, CA (US); Jonathan McDonald, Pleasanton, CA (US)

(73) Assignee: Brita LP, Oakland, CA (US)

( * ) Notice: Subject to any disclaimer, the term of this patent is extended or adjusted under 35 U.S.C. 154(b) by 480 days.

(21) Appl. No.: 14/339,535

(22) Filed: Jul. 24, 2014

Related U.S. Application Data

(60) Provisional application No. 61/893,389, filed on Oct. 21, 2013, provisional application No. 61/862,711, filed on Aug. 6, 2013.

(51) Int. Cl.
*C02F 1/00* (2006.01)

(52) U.S. Cl.
CPC .......... *C02F 1/003* (2013.01); *C02F 2307/04* (2013.01)

(58) Field of Classification Search
None
See application file for complete search history.

(56) References Cited

U.S. PATENT DOCUMENTS

| 1,861,481 A * | 6/1932 | Rabjohn | C02F 1/003 210/123 |
|---|---|---|---|
| 4,969,996 A | 11/1990 | Hankammer | |
| 5,518,620 A | 5/1996 | Eguchi et al. | |
| 5,980,743 A | 11/1999 | Bairischer | |
| 6,103,114 A | 8/2000 | Tanner et al. | |
| 6,254,768 B1 | 7/2001 | Dulieu et al. | |
| 6,348,084 B1 * | 2/2002 | Gieseke | B01D 46/0002 55/357 |
| 6,383,381 B1 | 5/2002 | O'Flynn et al. | |
| 6,524,477 B1 * | 2/2003 | Hughes | C02F 1/003 210/282 |
| 6,638,426 B1 | 10/2003 | Fritter et al. | |
| 8,043,502 B2 | 10/2011 | Nauta | |
| 8,202,418 B2 | 6/2012 | Wallerstorfer et al. | |
| 8,216,465 B2 | 7/2012 | Nauta | |
| 8,388,841 B2 | 3/2013 | Moretto | |
| 2006/0000763 A1 | 1/2006 | Rinker et al. | |
| 2010/0187168 A1 * | 7/2010 | Moretto | C02F 1/003 210/86 |

(Continued)

FOREIGN PATENT DOCUMENTS

| WO | WO9832705 | 7/1996 |
| WO | WO9817582 | 4/1998 |
| WO | WO14014789 | 1/2014 |

*Primary Examiner* — Benjamin M Kurtz
(74) *Attorney, Agent, or Firm* — Thomas C. Feix

(57) ABSTRACT

In one example, a pitcher is provided that includes a chassis in which an untreated water reservoir is received. The untreated water reservoir has a candle that defines a receptacle with a fluid inlet and a fluid outlet, where the fluid outlet is arranged for fluid communication with the treated water reservoir, and the receptacle is configured to receive a filter cartridge. The candle also includes a filter seat that cooperates with the filter cartridge to form a substantially fluid-tight seal when the filter cartridge is positioned in a sealing range defined by the candle. The pitcher also includes a structural element that is connected to a portion of the pitcher and has a protruding portion that is located near the filter cartridge when the filter cartridge resides in the sealing range.

6 Claims, 40 Drawing Sheets

(56) References Cited

U.S. PATENT DOCUMENTS

2010/0307986 A1  12/2010  Alexandrou
2014/0083924 A1* 3/2014  Bergendal ............... C02F 1/003
                                                210/451

* cited by examiner

Convex Top

Concave Top

Flat Top

WATER PITCHER SYSTEM

RELATED APPLICATIONS

This application hereby claims priority to: U.S. Provisional Patent Application Ser. No. 61/862,711, entitled FILTER RETAINING FLUME, and filed Aug. 6, 2013; and, U.S. Provisional Patent Application Ser. No. 61/893,389, entitled PROTRUSION-FILTER SYSTEM, and filed Oct. 21, 2013. All of the aforementioned applications are incorporated herein in their respective entireties by this reference.

This application is related to the following United States Patent Applications, all of which are filed the same day herewith and incorporated herein in their respective entireties by this reference: U.S. patent application Ser. No. 14/339,517, entitled MECHANISMS AND SYSTEMS FOR FILTER SEATING; U.S. patent application Ser. No. 14/339,521, entitled INTERMEDIATE ADAPTER FOR FILTER SEATING; and, U.S. patent application Ser. No. 14/339,528, entitled MECHANISMS AND SYSTEMS FOR DIRECTING WATER FLOW IN A FLUID CONTAINER.

FIELD OF THE INVENTION

Embodiments of the present invention generally concern water filtration systems for pitchers and other fluid containers. More particularly, embodiments of the invention relate to devices for seating, aligning, and/or retaining a filter element in a fluid container, and for directing fluid flow within a fluid container.

BACKGROUND

Water filtration has become common in homes, offices and other places to produce cleaner and better tasting water. One popular filtration system is used in conjunction with a water pitcher. Some water pitchers include an upper chamber for holding untreated water and a lower chamber for holding treated water that has exited the upper chamber. A filter cartridge is placed in a fluid path between the two chambers so that untreated water exits the upper chamber through the filter cartridge and enters the lower chamber as filtered water.

The filter cartridge includes openings that allow unfiltered water to enter the interior of the filter cartridge where the unfiltered water comes into contact with a filtering medium that acts to remove contaminants from the water as the water flows through the interior of the filter cartridge. After filtering is completed, the filtered water exits the filter cartridge into the lower chamber. As a result, treated water is available and ready to be poured from the water pitcher for consumption by a user.

The filter cartridge typically resides in a receptacle defined by a candle that is located at the bottom of the upper chamber and that is open to both the upper and lower chambers. Absent the filter cartridge, water can flow from the upper chamber to the lower chamber by way of the candle. With proper alignment and seating of the filter cartridge within the candle, water can only flow from the upper chamber to the lower chamber through the filter cartridge. Typically, the filter cartridge is removable so that at the end of its useful life, the filter cartridge may be removed and replaced with a new filter cartridge.

Placement of the filter cartridge within the candle of the water pitcher is important for proper water treatment. In order to place the cartridge, the user typically must maneuver the filter cartridge so that the filter cartridge is properly aligned and firmly seated within the candle. If the filter cartridge is properly aligned and seated within the candle, a fluid tight seal, or substantially fluid tight seal, is formed between the candle and the exterior of the filter cartridge such that water can only flow from the upper chamber to the lower chamber through the filter cartridge.

In practice however, achievement of proper seating of the filter cartridge has proven problematic. This is due at least in part to the construction of typical water pitchers and, more particularly, the relation between various elements of the water pitcher.

For example, one problem is that proper alignment and seating of the filter cartridge in the candle requires focused effort on the part of the user. That is, proper alignment and seating of the filter cartridge generally cannot be achieved by simply dropping the filter cartridge into the candle. Instead, the user must perform an extra action to properly align the filter cartridge with respect to the candle, and then seat the filter cartridge within the candle.

In particular, after aligning the filter cartridge so that it can be received within the candle with the proper angular orientation, the user must also push the filter cartridge downward into the candle so that a fluid tight seal, or substantially fluid tight seal, is formed between the filter cartridge and the filter seat in the candle. Users often neglect to perform this necessary step and, as a result, the filter cartridge may be aligned but not properly seated, even though it can appear so to the user. This problem is further aggravated by the fact that typical filtration systems lack any sort of feedback mechanism that indicates to the user that the filter cartridge is properly seated.

Misalignment and/or improper seating of the filter cartridge, as described above, can present a variety of problems with respect to the operation of the filtration system. Among other things, misalignment and/or improper seating of the filter cartridge can result in a gap between the filter cartridge and the filter seat, thus allowing untreated water to bypass the interior of the filter cartridge and flow into the lower chamber, thereby introducing contaminants into the water held in the lower chamber.

Another problem with many filtration systems is that even if the filter cartridge is initially placed in the correct alignment and is properly seated in the candle, the filter cartridge may not be reliably retained in that position. For example, the filter cartridge can move out of position as a result of repeated use of the water pitcher, such as when the water pitcher is tipped to pour treated water from the lower chamber. That is, the tipping motion may act to change the position of the filter cartridge relative to the candle. Moreover, repeated tipping may also cause the filter cartridge to move partly, or completely, out of the candle.

In either case, the seal formed between the exterior of the filter cartridge and the candle has been compromised. Consequently, the next time the upper chamber is filled, untreated water can bypass the filter cartridge and flow directly into the lower chamber, thus contaminating the filtered water in the lower chamber.

Yet another concern with many filtration systems relates to the construction and placement of the filter cartridge. For example, filter cartridges often include a set of air vents at, or near, the top of the filter cartridge which allow air in the filter cartridge to escape as fluid flows into the filter cartridge. However, many filtration systems are constructed in such a way that as water is poured into the upper chamber, the incoming water directly impinges upon the air vents, effectively blocking the air vents and thus preventing the escape of air from the filter cartridge. Because air is prevented from escaping the filter cartridge, a static, or near static, condition results where water cannot easily enter the filter cartridge. This condition is sometimes referred to as airlock and slows the rate at which water flows through the filter cartridge.

A related problem that affects many filtration systems concerns the placement of the filter cartridge and the filtration media employed in the filter cartridge. For example, and as noted above, the filter cartridge is often located in a position where water entering the upper chamber impinges upon the filter cartridge air vents. As the inrushing water enters the air vents, the relatively high velocity of that water causes compaction of the filtration media within the filter cartridge. This compaction reduces the overall surface area available for filtration, thus reducing the effectiveness of the filtration media. Compacted filtration media also presents increased resistance to the fluid that is to be filtered, such that the fluid is not able to readily flow through the filtration media.

In light of problems such as those noted above, it would be useful to provide devices that ensure proper alignment and seating of a filter cartridge that is placed within a water pitcher. As well, it would be useful for the devices to be able to retain the filter cartridge in place, once properly positioned, during use of the pitcher, or other device, that includes the filter cartridge. Finally, it would be useful to avoid, or at least reduce, airlock of the filter cartridge, and media compaction.

Aspects of an Example Embodiment

One or more embodiments within the scope of the invention may be effective in overcoming one or more of the disadvantages in the art. One example embodiment is directed to a fluid container, such as a water pitcher for example, that includes a device that helps to ensure proper seating of a filter cartridge, and also helps to maintain the filter cartridge alignment and seating during use of the water pitcher. As well, this example embodiment of the device directs an inflow of untreated water away from the air vents of the filter cartridge so as to help avoid, or at least reduce, problems such as media compaction and airlock.

The water pitcher includes a candle in which a filter cartridge can be removably positioned. A filter seat is provided within the candle to interface with the filter cartridge in such a way that a seal is established between the filter cartridge and the filter seat. The candle is configured and arranged for fluid communication with both an untreated water reservoir, and a treated water reservoir, of the water pitcher so that water exiting the untreated water reservoir is able to pass through the filter cartridge, when present in the candle, and enter the treated water reservoir.

As suggested above, the device can help to seat the filter cartridge, and also retain the filter cartridge in that seated position. More particularly, the device is generally configured and arranged to transmit a force to the filter cartridge in a direction and magnitude such that, if the filter cartridge is not already properly seated on the filter seat, the filter cartridge will be moved into a sealing contact with the filter seat.

Moreover, the device may directly contact the filter cartridge, although that is not required and, alternatively, one or more intervening structures can be used to transfer a force exerted by the device to the filter cartridge. Where one or more such intervening structures are present, the device is considered to be in indirect contact with the filter cartridge.

In this example embodiment, the device is positioned somewhere between a cover of the water pitcher and the top of the filter cartridge, such as by temporary or permanent attachment to the cover for example, so that as part of a process in which a user attaches the cover to an untreated water reservoir, or chassis, the device exerts a force, either directly or indirectly, on the filter cartridge. The exertion of this force moves the filter cartridge into sealing contact with the filter seat in the candle.

The device need not remain in contact with the filter cartridge once the filter cartridge is in the sealing range of the candle. More generally, the device can be positioned to prevent the filter cartridge from moving out of the sealing range. This can be accomplished either with the device in contact with the filter cartridge, or with the device spaced apart from the filter cartridge but positioned such that the filter cartridge is prevented by the device from moving out of the sealing range.

In any case, assurance is provided to the user that when the cover is attached to the pitcher, the filter cartridge is properly seated and, as such, untreated water cannot bypass the filter. In connection with this embodiment, one or more components of the water pitcher can be configured to provide sensory feedback to the user so that the user can ascertain proper seating of the filter cartridge.

For example, the cover can include structures that engage complementary structures on the unfiltered water reservoir of the pitcher so that a snap sound is produced when the cover is fully engaged with the unfiltered water reservoir. This cover configuration can also help to ensure that the cover remains closed, thereby maintaining the filter cartridge in the correct position and alignment, even when the water pitcher is tipped.

In terms of its various particular specific physical implementations, the device can take any size, orientation and/or configuration consistent with performance of any one or more of the aforementioned functions, and so is not constrained to any particular size, orientation and/or configuration. Accordingly, other embodiments of the device may have a size, orientation and/or configuration that is consistent with the performance of fewer, additional, or alternative functions.

The foregoing embodiment is provided solely by way of example and is not intended to limit the scope of the invention in any way. Consistently, various other embodiments of such a device and associated filters and containers within the scope of the invention are disclosed herein.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 6b is a view of an inverted cover that includes the example filter management element of FIG. 6a;

DETAILED DESCRIPTION OF SOME EXAMPLE EMBODIMENTS

Figure 1A:
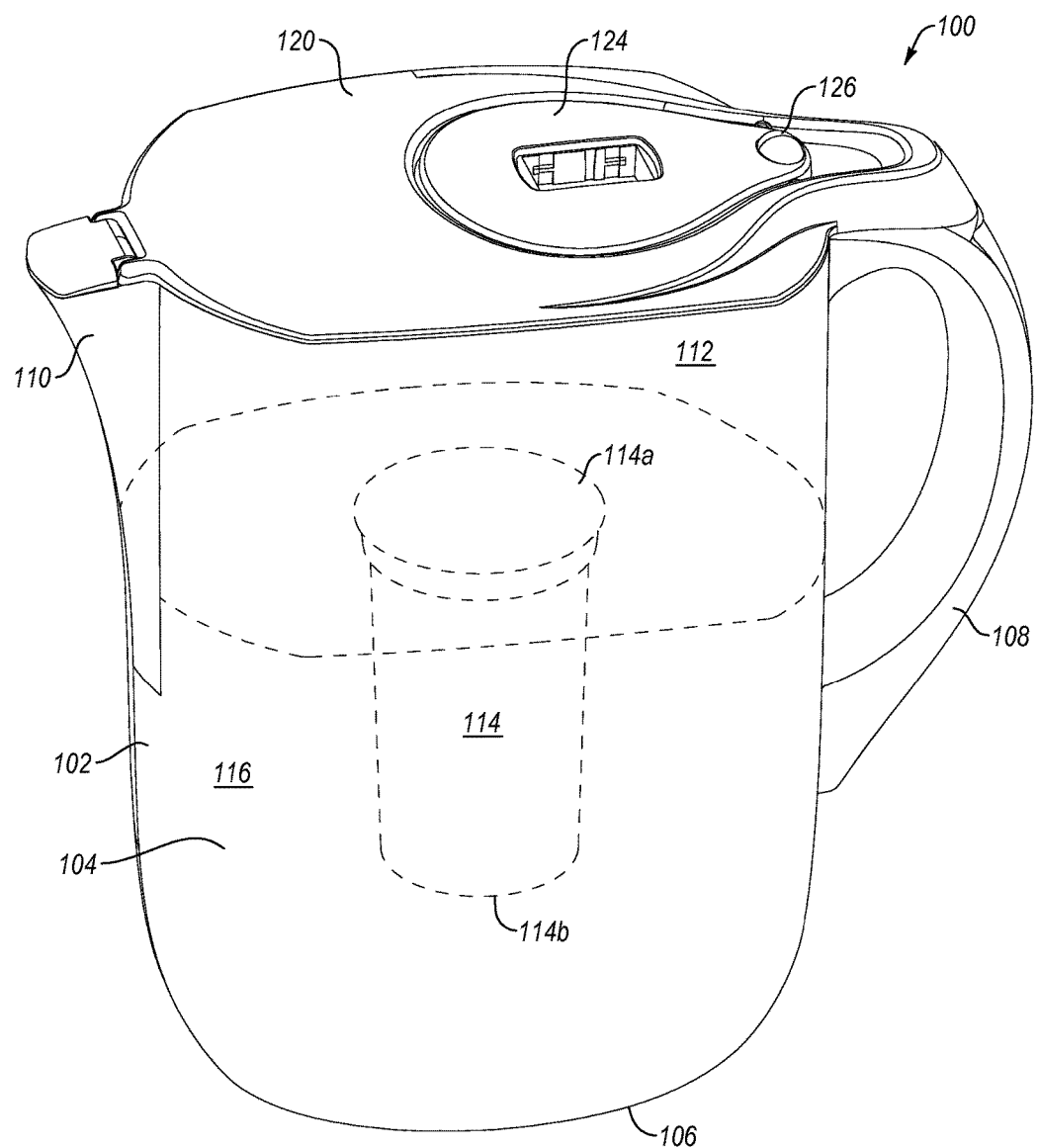
FIG. 1a is a perspective view of an example embodiment in the form of a water pitcher.

Reference will now be made in detail to aspects of various embodiments of the present disclosure, examples of which are illustrated in the accompanying drawings. While described in conjunction with these embodiments, it will be understood that they are not intended to limit the disclosure to these embodiments.

Embodiments of the invention can be employed in a variety of different environments, one example of which is a water pitcher, although the scope of the invention is not limited to this example environment and extends, more generally, to any environment where such embodiments can be usefully employed.

In environments such as these, there may be a need to perform a variety of functions. Such functions include, but are not limited to, alignment of a filter cartridge in a candle or other structure, sealing of the filter cartridge to avoid the possibility of bypass, retention of the filter cartridge in a sealing range, and reduction or avoidance of airlock and/or media compaction in a filter cartridge. Various embodiments of the invention can perform one or more of the aforementioned functions, among others.

In general, at least some of the aforementioned functions can be performed in connection with one or more protrusions and/or structures that include one or more protrusions. For example, one example of a protrusion is a filter management element configured and arranged to transfer a force to a filter cartridge to move the filter cartridge into a sealing range of a structure such as a candle. The filter management element may also be configured and arranged to retain the filter cartridge in the sealing range. In at least some embodiments, the filter management element may also aid in the alignment of a filter cartridge in a structure such as a candle. As well, at least some embodiments of the filter management structure are configured to engage a filter cartridge in such a way that the filter management structure is able to perform the filter cartridge seating and retention functions without materially impairing fluid flow into the filter cartridge and air flow out of the filter cartridge.

Another example of a protrusion takes the form of an adapter element that, in general, is configured and arranged to transfer a force to a filter cartridge to as to move the filter cartridge into a sealing range, and also to retain the filter cartridge in the sealing range. The adapter element can be a discrete structure that is not connected to any part of a fluid container or to the filter cartridge, but which can nonetheless interact with one or both of the fluid container and the filter cartridge. As well, embodiments of the adapter element may be compatible with a variety of different fluid container and/or filter cartridge configurations and arrangements.

Still another example of a protrusion takes the form of one or more protruding elements of a filter cartridge seat. In general, these protruding elements can take the form of any structure, or structures, that extend outward from the filter seat and into contact with a filter cartridge so as to enhance retention of the filter cartridge once it is positioned on the filter cartridge seat. The protruding elements can also provide a relative increase in a contact area between the filter cartridge and filter seat so as to enhance the reliability of the seal formed between the filter cartridge and filter seat.

As a final example, another embodiment of a protrusion takes the form of flume that, in general, is configured and arranged to direct a flow of water into a fluid container in such a way as to reduce, or eliminate, airlock and/or media compaction in a filter cartridge. As well, embodiments of the flume can be configured and arranged to transfer a force to a filter cartridge to move the filter cartridge into a sealing range of a structure such as a candle. The flume may also be configured and arranged to retain the filter cartridge in the sealing range.

As suggested above, various embodiments of the protrusion can be combined in a single water container implementation, such as a pitcher. By way of illustration, a water pitcher may include both a flume, and a filter seat that includes protruding elements. Thus, the scope of the invention extends to combinations of the example protrusions included in this disclosure.

A. Example Pitcher Configuration

Directing attention now to FIGS. 1a-1c, and FIG. 2, details are provided concerning an example embodiment in the form of a water pitcher 100. The water pitcher 100 includes a chassis 102 that defines an interior 104. The chassis 102 can be any suitable size or shape. The chassis 102 includes, or is attached to, a base 106. A handle 108 attached to, or integrally formed with, the chassis 102 enables a user to grasp and operate the water pitcher 100. Opposite the handle 108, a spout 110 is provided that is in fluid communication with the interior 104 of the chassis 102. In some embodiments, the chassis 102, base 106, handle 108 and spout 110 are integral with each other and thus have a unitary one-piece construction, which may be constructed of plastic and/or other suitable materials.

An untreated water reservoir 112 is removably disposed in the interior 104 of the chassis 102. In at least some embodiments, the untreated water reservoir 112 is configured to be removably received in a corresponding recess 102a (FIG. 2) defined by the chassis 102 and which serves to support the untreated water reservoir 112. The inside dimension of the recess 102a may be substantially the same as the exterior dimension of the untreated water reservoir 112, such that the untreated water reservoir 112 fits closely within the recess 102a. Thus positioned, and as indicated in FIGS. 1 and 2, the untreated water reservoir 112 occupies a portion of the interior 104 of the chassis 102. In general, the untreated water reservoir 112 serves to receive, and hold for a period of time, water from an external source.

As further indicated in FIGS. 1 and 2, the untreated water reservoir 112 includes a hollow candle 114 that defines a receptacle within which a filter cartridge 150 (FIG. 2), comprising a granular and/or other filtering medium such as ion exchange resin (IER), can be removably positioned. The candle 114 is open at its upper end 114a and lower end 114b and, as such, is in fluid communication with the untreated water reservoir 112, as well as with a treated water reservoir 116 that comprises a portion of the overall interior 104 of the chassis 102. In general, the upper end 114a serves as a fluid inlet, and the lower end 114b serves as a fluid outlet. A seat 118 positioned near the upper end 114a of the candle 114 is configured to cooperate with the filter cartridge 150 in the candle 114 to form a seal such that water in the untreated water reservoir 112 can enter the treated water reservoir 116 only by passing through the filter cartridge 150, as best indicated in FIG. 2. It should be noted that while the gap between the filter cartridge 150 and the candle 114 indicated in FIG. 2 is solely for the purpose of clarity in showing the relation between the filter cartridge 150 and the candle 114, the gap also illustrates the bypass problem that can occur if the filter cartridge 150 is not properly aligned in the candle 114, and seated on the seat 118.

The example water pitcher 100 also includes a cover 120, different embodiments of which can mate with various other elements of the water pitcher 100, in a variety of different ways. For example, in some embodiments, the cover 120 simply rests on the chassis 102, but is not connected to the chassis 102, while in other embodiments, the cover 120 can be removably connected to the untreated water reservoir 112. In either case, a flange 120a of the cover 120 may reside on a surface 122 that is defined by one or both of a top edge 102b of the chassis 102, and a top edge 112a of the untreated water reservoir 112, where the respective top edges 102b and 112a may be substantially flush with each other, as indicated in FIG. 1b for example.

Where the cover 120 is configured to be removably attached to the untreated water reservoir 112, a variety of structures can be employed to this end. In at least some embodiments, the cover 120 and untreated water reservoir 112 include respective complementary structures that releasably engage each other so that the cover 120 and untreated water reservoir 112 can be securely connected to each other, but detached from each other when desired. In light of the foregoing, it will be appreciated that the example complementary structures disclosed herein are example structural implementations of a means for removably attaching the cover 120 and the untreated water reservoir 112 to each other. Any other structure(s) capable of providing comparable functionality can alternatively be employed and are considered as being within the scope of the invention.

Figure 1B:
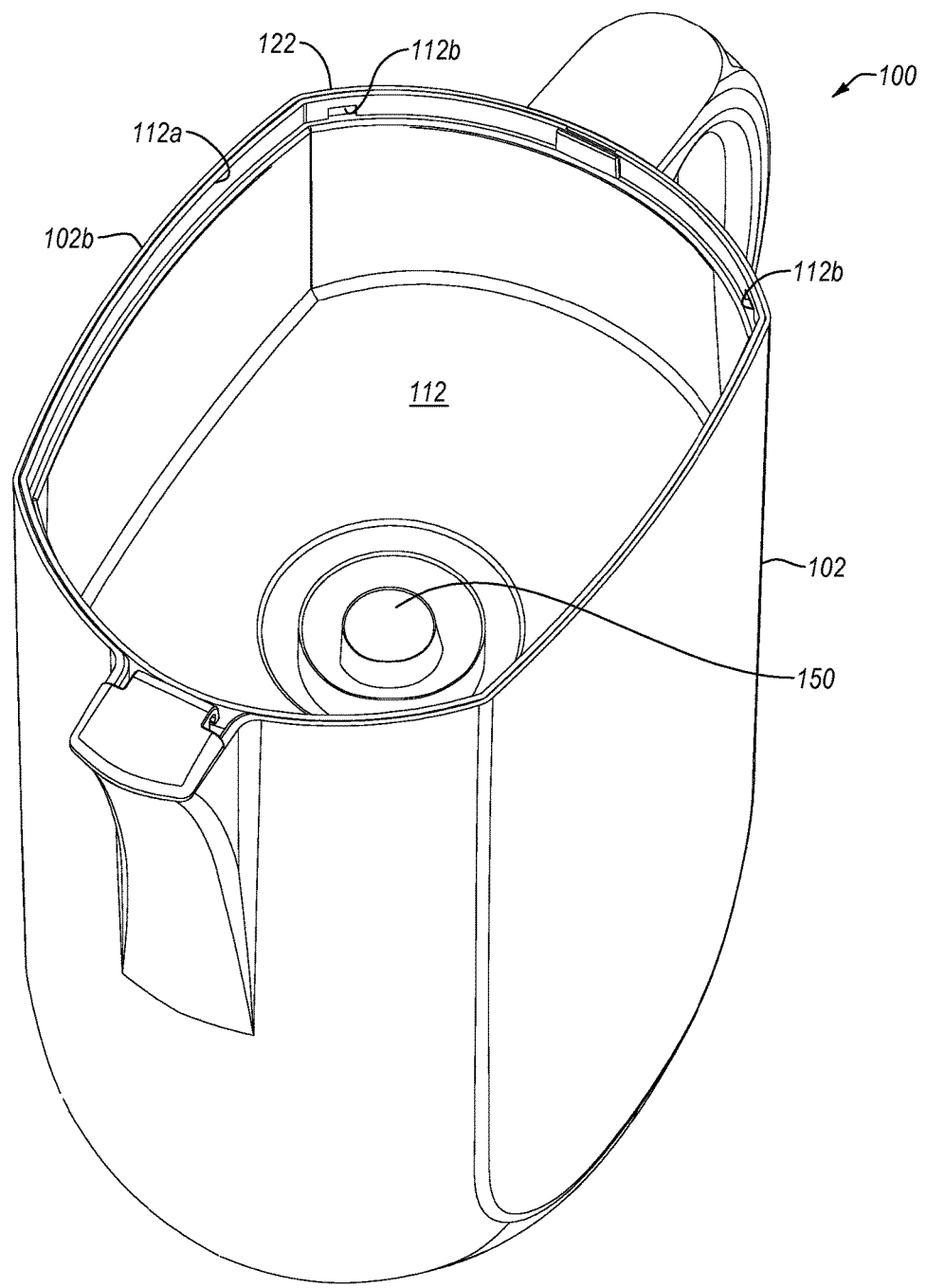
FIG. 1b is a top perspective view of an example pitcher and untreated water reservoir.
Figure 1C:
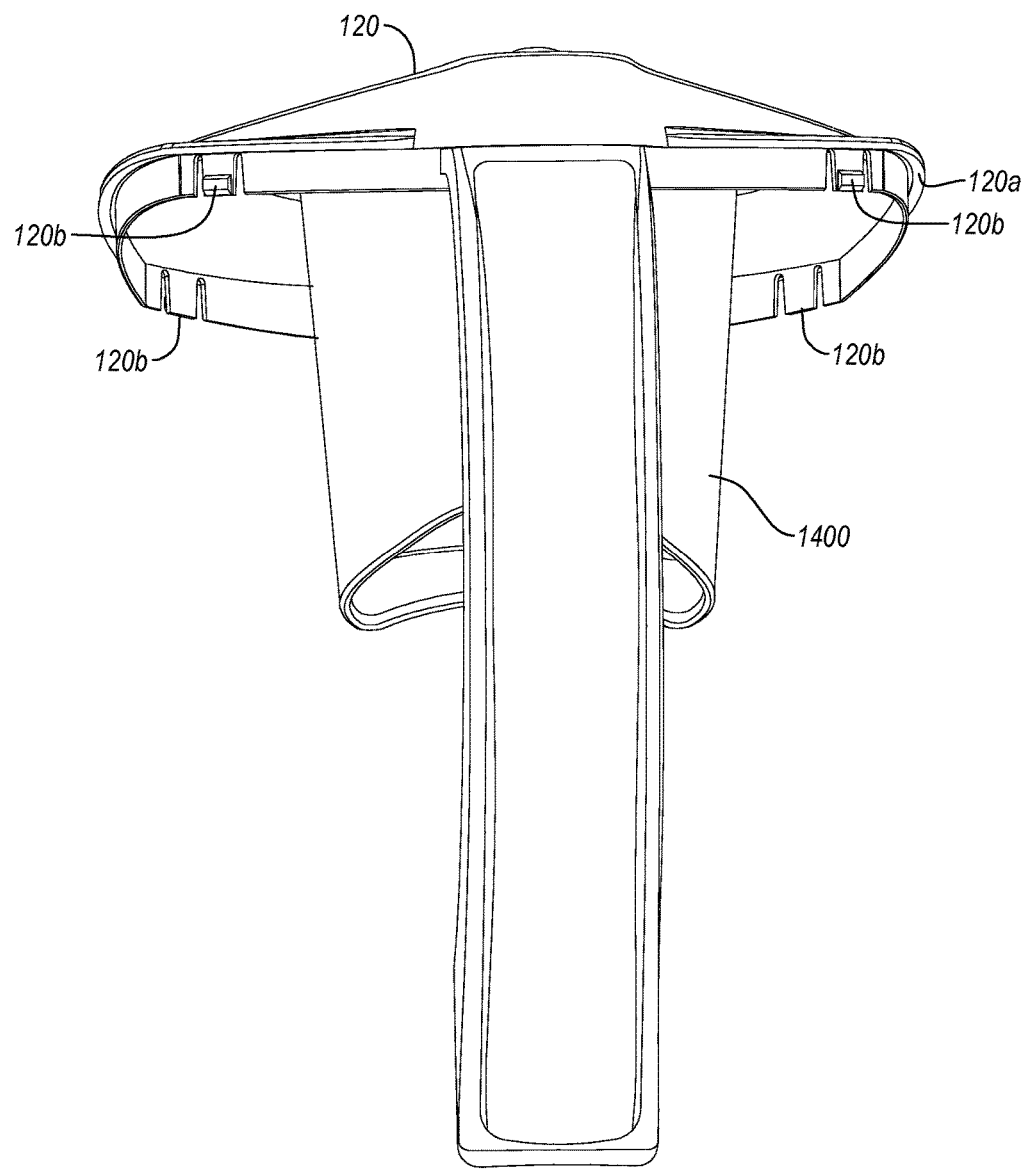
FIG. 1c is a perspective view of an example cover.
Figure 1D:
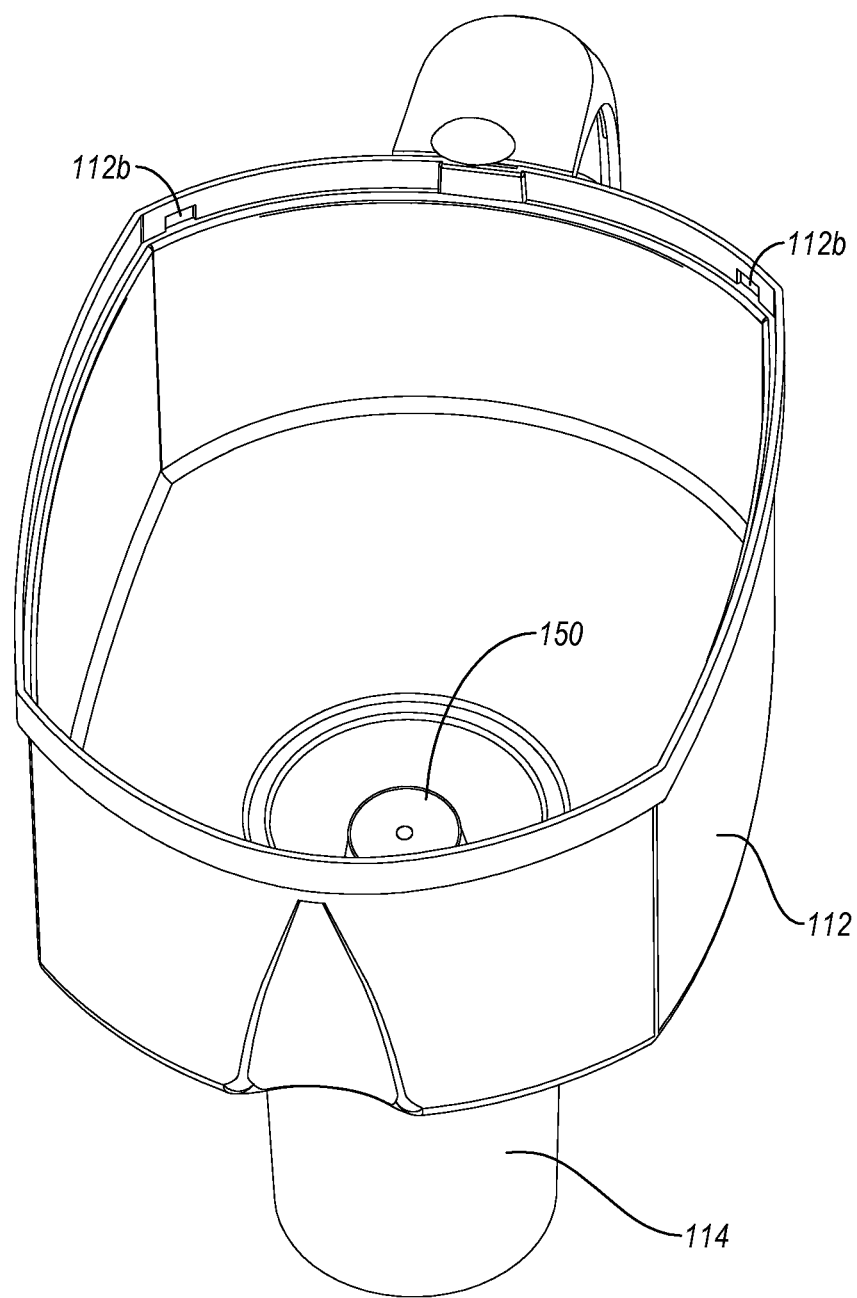
FIG. 1d is a perspective view of an example untreated water reservoir configured to releasably connect to a cover.
Figure 2:
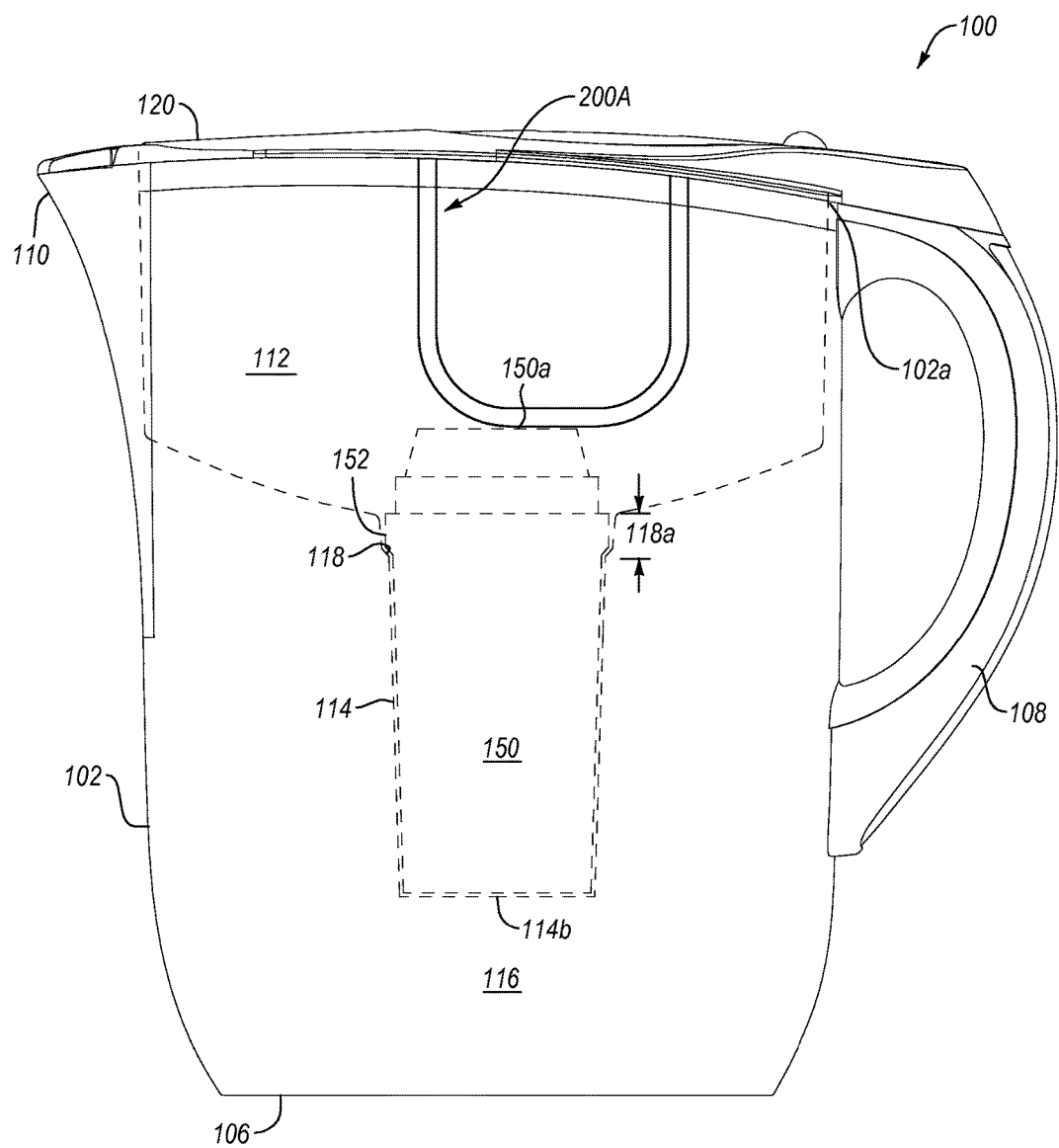
FIG. 2 is a cutaway view of an example pitcher.
Figure 3A:
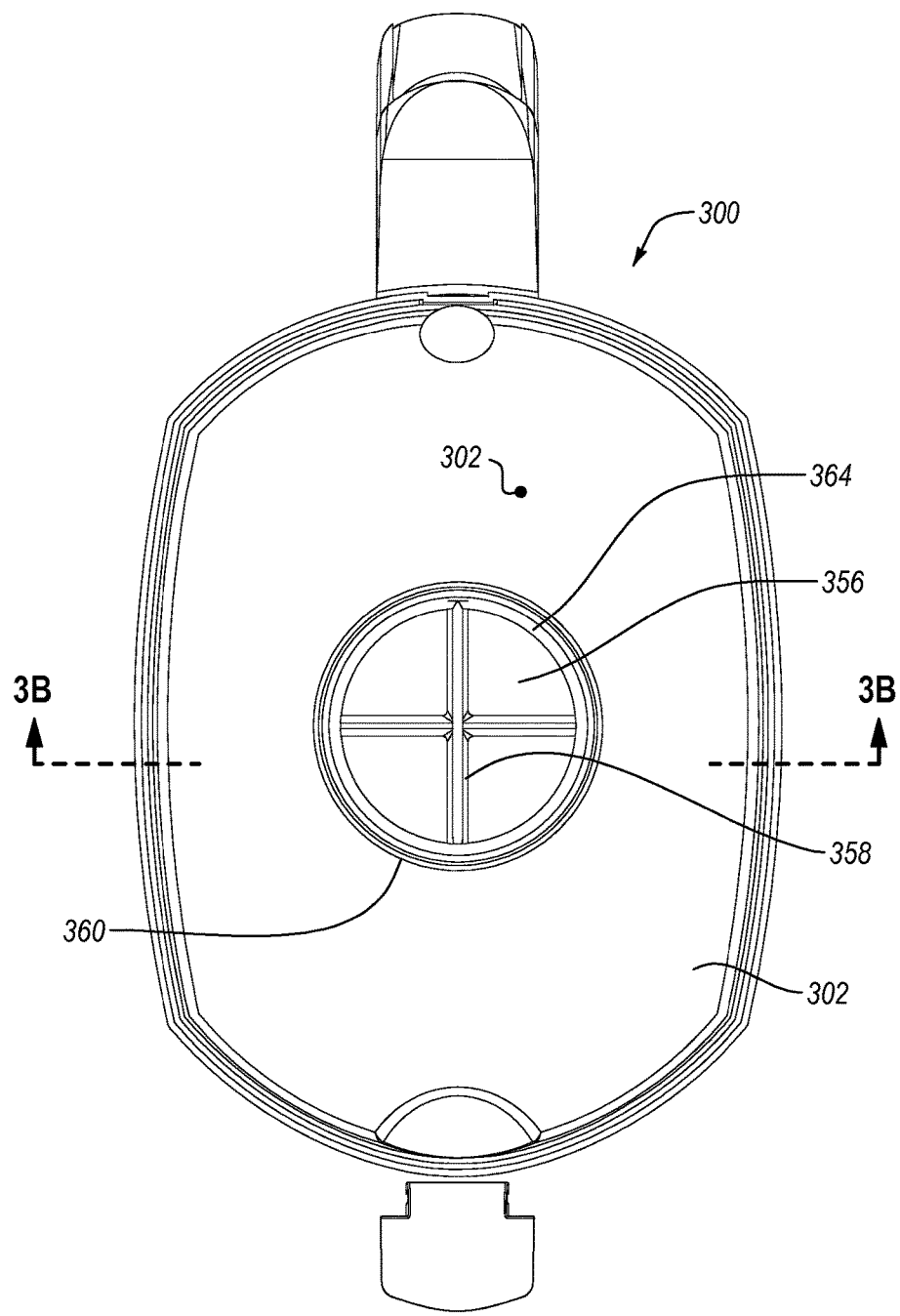
FIG. 3a is a top view of a portion of an untreated water reservoir that includes a filter seat.
Figure 3B:
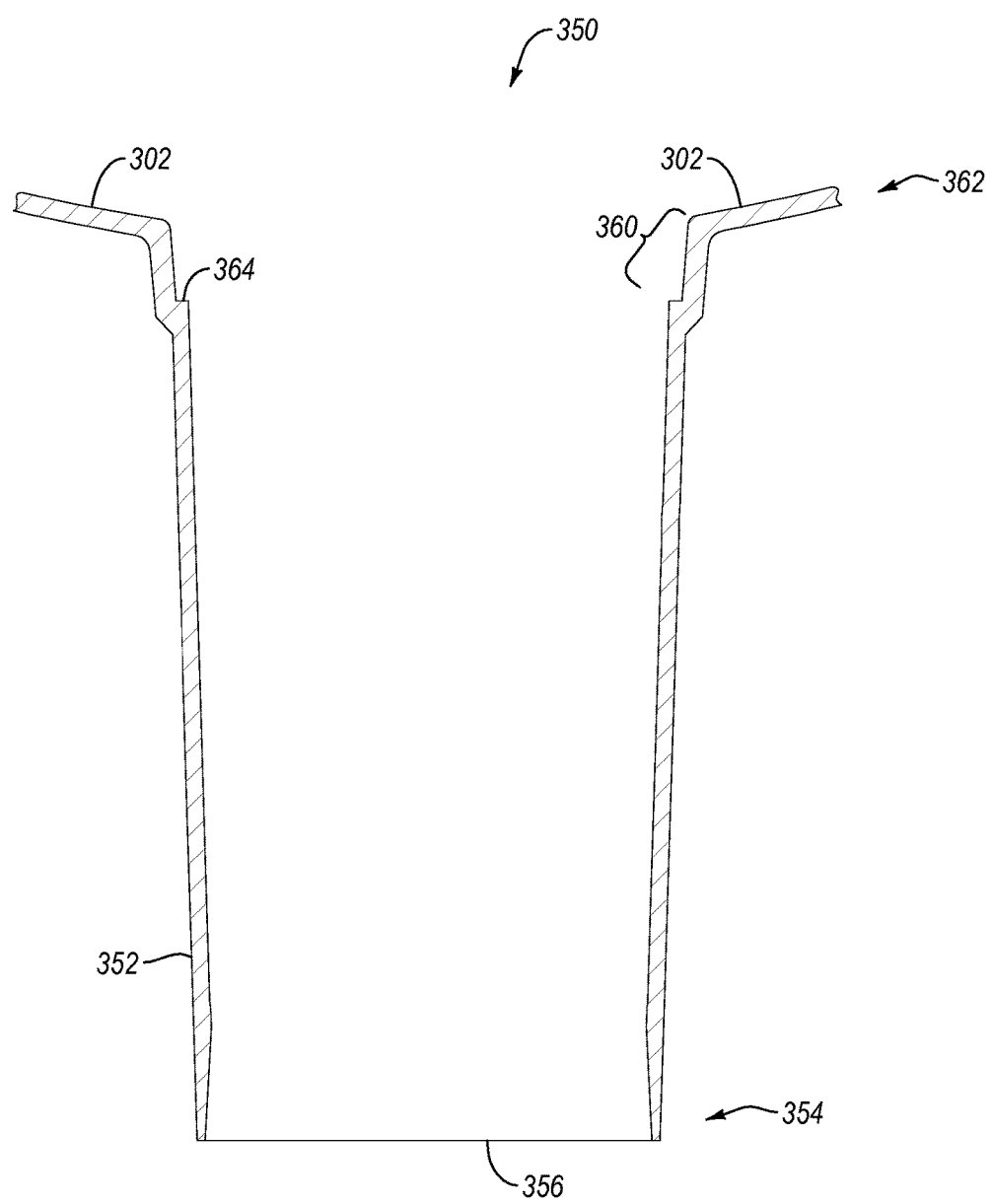
FIG. 3b is a section view taken from FIG. 3a and disclosing aspects of a candle of an untreated water reservoir.
Figure 3C:
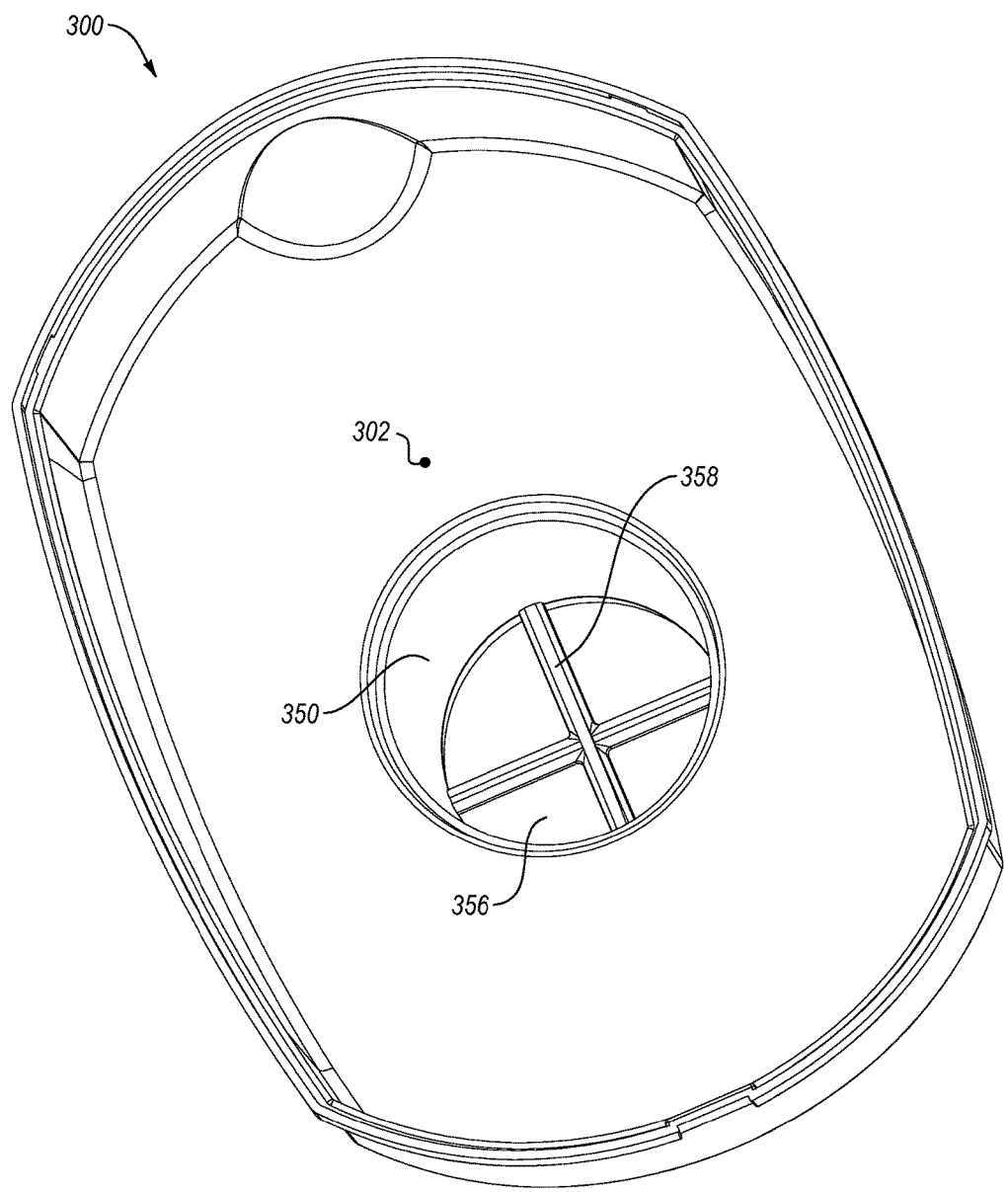
FIG. 3c is a perspective view of a portion of an untreated water reservoir that includes a filter seat.

As best shown in FIGS. 1b-1d, the aforementioned complementary structures can take the form, for example, of one or more tabs 120b of the cover 120 that are configured to snap into respective detents 112b of the untreated water reservoir 112. As indicated in FIG. 1c, each tab 120b may have a free end that can be temporarily deflected so as to move into a corresponding detent 112b. To free the cover 120 from the untreated water reservoir 112, the free ends of the tabs 120b can be deflected sufficiently far that the tab 120b can move out of its respective detent 112b.

As best indicated in FIGS. 1a and 2, the cover 120 extends over the untreated water reservoir 112 so that water does not escape from the untreated reservoir 112 when the water pitcher 100 is tilted. The cover 120 may also include a lid 124 rotatably connected to the cover 120 by way of a hinge 126. In operation, the lid 124 can be opened so that a user can pour water into the untreated water reservoir 112. In some embodiments, the lid 124 and hinge 126 can be omitted, and water poured into the untreated water reservoir 112 with the cover 120 removed.

B. Some Aspects of Example Filter Management Elements

With continued attention to FIG. 2, and directing attention as well to FIGS. 3a-3c and FIG. 4, aspects of a filter management element, one example of which is denoted at 200a, are disclosed. It should be noted at the outset that the scope of the invention is not limited to the particular configuration, arrangement, and orientation of the filter management element 200a indicated in FIG. 2. Rather, this particular filter management element 200a is provided as an example for illustrating various concepts underlying the general notion of a filter management element. Consistent with the foregoing, a variety of other example filter management elements having various configurations, arrangements, and orientations are disclosed elsewhere herein. Examples of such alternate seating elements include those referred to as constituting a "protrusion" in the United States provisional applications referenced, and incorporated, herein.

In general, and as discussed in more detail below, filter management elements, such as the example filter management element 200a of FIG. 2, may be provided within a fluid container, such as a water pitcher for example, and are generally configured and arranged to align, seat, and/or retain, in any combination, a filter cartridge.

In the example embodiment of FIG. 2, the filter management element 200a can exert a force on the filter cartridge in a direction and magnitude such that, if the filter cartridge is not already properly seated on the filter seat, the filter cartridge will be moved into a sealing contact with the filter seat, although other embodiments of a filter management element may perform additional, or alternative, functions. In some instances, multiple filter management elements may be employed. Moreover, the filter management element may directly contact the filter cartridge, although that is not required and, alternatively, one or more intervening structures can be used to transfer a force exerted by the filter management element to the filter cartridge. As noted above, the filter management element can take any form or configuration consistent with its function and so is not constrained to any particular form or configuration, nor location relative to the filter cartridge. Finally, at least some embodiments of the filter management element are configured so as to substantially occupy a gap that would otherwise exist between a cover of the water pitcher and the top of the filter cartridge when the filter cartridge is in and/or out of a sealing range.

In the example embodiment of FIG. 2, the filter management element 200a is positioned between the cover 120 of the water pitcher 100 and the top 150a of the filter cartridge 150. The filter management element 200a may be attached, either permanently or removably, to the cover 120 for example, so that when a user places the cover 120 in the fully closed position indicated in FIG. 2, the cover 120 exerts a force, either directly or indirectly, on the filter management element 200a that is then transferred by the filter management element 200a to the top 150a of the filter cartridge 150. The exertion of this force moves a sealing surface 152 of the filter cartridge 150 into sealing contact with the filter seat 118, which can by defined by a recess.

The filter management element 200a may remain in contact with the filter cartridge 150 even after the filter cartridge 150 is properly aligned and seated. This contact can be maintained, for example, by retaining the cover 120 in the fully closed position indicated in FIG. 2. One useful aspect of this arrangement is that the filter cartridge 150 remains properly aligned and seated even when the water pitcher 100 is tipped. Thus, the user need not be concerned with bypass that could result if the filter cartridge 150 were to become misaligned or unseated.

Moreover, embodiments of the invention are configured and arranged to provide immediate and unambiguous feedback, such as sensory feedback, to the user if the filter cartridge 150 is not properly seated. With reference to the particular example of FIG. 2, the top of a sealing range 118a, discussed in more detail below in connection with FIG. 4 (see reference 366), corresponds to the uppermost position in the candle 114 that the filter cartridge 150 can occupy that will still permit the cover 120 to be properly positioned or attached relative to the chassis 102. Thus, if the filter cartridge 150 is positioned out of, that is, above, the sealing range 118a, the interposition of the filter management element 200a between the top of the filter cartridge 150 and the cover 120 prevents the cover 120 from being properly positioned on, or attached to, the chassis 102. The inability to position or attach the cover 120 signifies to the user that the filter cartridge 150 is out of position and must be pushed down into the sealing range 118a. As explained above, a downward force can be exerted by the filter management element 200a to this end and/or the user can exert a downward force on the filter cartridge 150 manually.

Thus, not only is the problem of an improperly positioned filter cartridge immediately visually apparent to the user, but the solution of moving the filter cartridge downward into the sealing range immediately and naturally occurs to the user. This is true even if the user does not necessarily understand that by moving the filter cartridge in this way, a seal between the filter cartridge and the candle is thereby established.

Thus, assurance is provided to the user that when the cover is fully closed, the filter cartridge is properly seated and, as such, unfiltered water cannot bypass the filter. In connection with this and other embodiments, one or more components of the water pitcher can be configured to provide sensory feedback to the user so that the user can ascertain proper seating of the filter cartridge.

For example, the cover can include structures, such as tabs 120b for example, that engage complementary structures, such as detents 112b for example, on the unfiltered water reservoir so that a snap sound is produced when the cover is securely attached to the unfiltered water reservoir. This cover configuration can also help to ensure that the cover remains closed, thereby maintaining the filter cartridge in the correct position and alignment, even when the water pitcher is tipped.

More generally, sensory feedback, which includes any feedback perceptible by one of the senses of a user, can be employed in connection with various embodiments of the invention. Among other things, one or more types of sensory feedback can be used, alone or in combination, to indicate to a user when a filter is properly aligned and/or seated in a candle.

With particular reference now to FIGS. 3a-3c and FIG. 4, further details are provided concerning the relation between an example untreated water reservoir 300 and an example filter cartridge 400.

As noted earlier, a candle 350 may be included as part of the untreated water reservoir 300. In the illustrated example, the candle 350 includes a generally tubular portion 352 that defines a receptacle, which may or may not be tapered to conform with the shape of the filter cartridge 400, that extends vertically downward from a bottom 302 of the untreated water reservoir 300, and the inside diameter of the generally tubular portion 352 is slightly larger than the outside diameter of the filter cartridge 400. The lower end 354 of the candle 350 includes a fluid outlet 356 that allows fluid to exit the candle 350 and enter a treated water reservoir (see, e.g., FIG. 2).

An index structure 358, which can be located in the lower end 354 of the candle 350, can help to ensure proper rotational alignment of the filter cartridge 400 by engaging one or more complementary structures (not shown) on the bottom of the filter cartridge 400. For example, the index structure 358 can be configured with a web 358a that is configured to be received in a corresponding slot 402 of the filter cartridge 400 such that the filter cartridge 400 will only fit into the candle 350 in an orientation in which the web 358a is received in the slot 402.

An annular filter seat 360 is provided at an upper end 362 of the candle 350. In general, the filter seat 360 is configured to cooperate with the filter cartridge 400 to establish a seal that prevents, or at least substantially prevents, fluid in the unfiltered water reservoir 300 from bypassing the filter cartridge 400. With more particular reference to its configuration, the example filter seat 360 is angled, relative to vertical, and terminates in an annular shoulder 364 that serves to limit the extent to which the filter cartridge 400 can be inserted into the tubular portion 352 of the candle 350.

Figure 4:
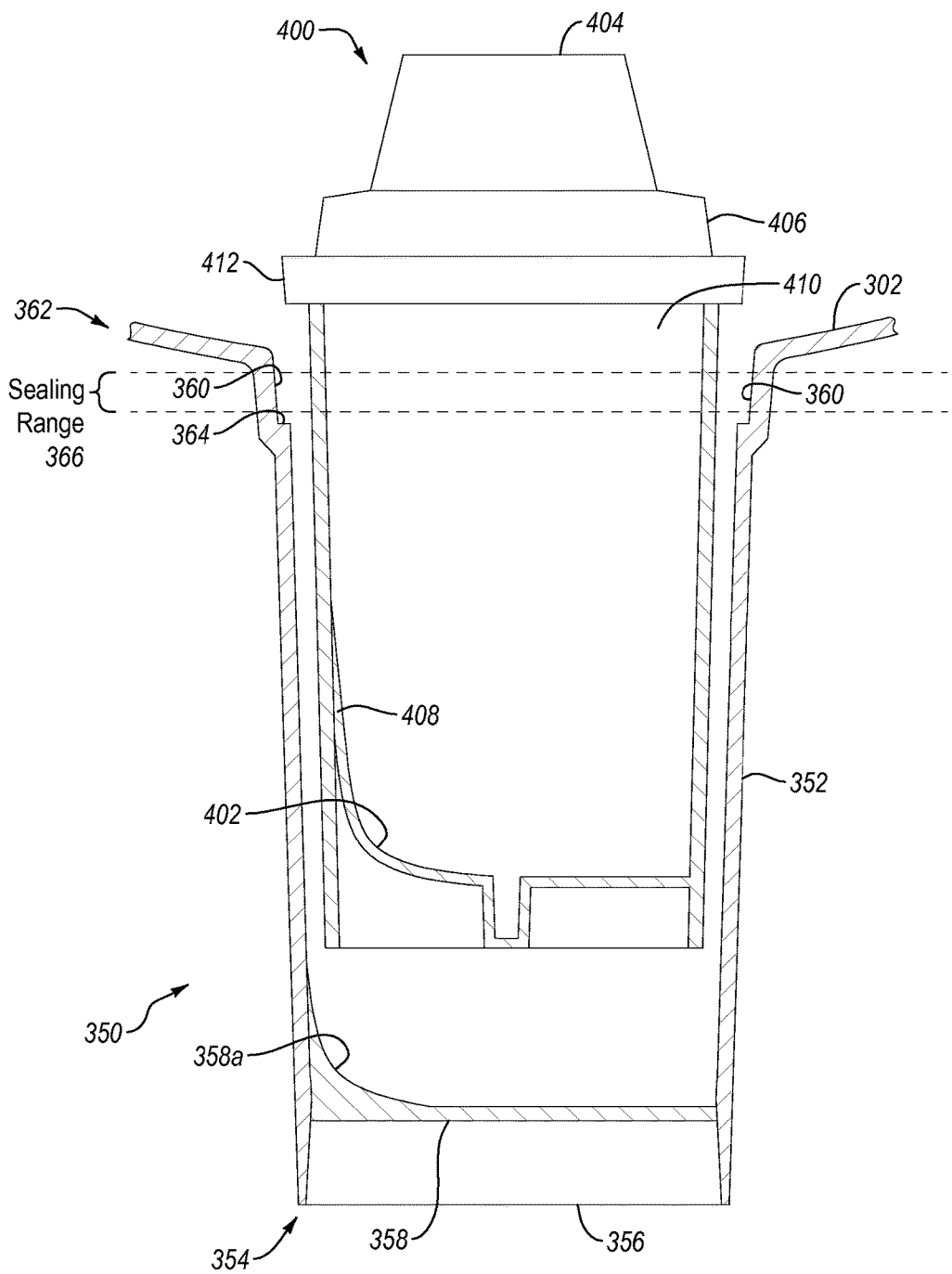
FIG. 4 is a cutaway view disclosing an example filter cartridge and candle of an untreated water reservoir.

With continued reference now to FIG. 4 in particular, details are provided concerning the example filter cartridge 400. As shown, the filter cartridge 400 includes a top 404 that, as illustrated in the example of FIG. 2, interfaces with a filter management element (not shown) in order to promote proper seating of the filter cartridge 400 in the candle 350.

The filter cartridge 400 also includes a fluid inlet section 406 comprising one or more inlet ports that enable fluid from the untreated water reservoir 300 to enter the filter cartridge 400 and pass into a media chamber 408 having an interior 410 that contains filtration media (not shown).

As discussed in more detail below, the filter cartridge 400 includes an annular sealing surface 412 which, in general, can be formed on the periphery of the filter cartridge 400. Thus, the position and orientation of the sealing surface 412 disclosed in FIG. 4 are provided by way of example only.

With more particular reference to the formation of the seal between the filter seat 360 and the filter cartridge 400, the configuration of the sealing surface 412 of the filter cartridge 400 and/or the configuration of the filter seat 360 can be such that the filter cartridge 400 can be acceptably sealed anywhere within a range of vertical positions of the sealing surface 412 relative to the filter seat 360.

That is, a sealing range 366 can be defined within which the sealing surface 412 and filter seat 360 cooperate to provide a seal adequate to prevent, or substantially prevent, water from bypassing the filter cartridge 400 when the filter cartridge 400 is properly positioned within the candle 350. Formation of an adequate seal between the sealing surface 412 and the filter seat 360 may be further facilitated by forming the sealing surface 412 and filter seat 360 at respective angles, which may or may not be the same, relative to vertical, and/or by constructing one or both of the sealing surface 412 and the filter seat 360 of a material, such as plastic, that is sufficiently compliant to permit some elastic deformation of one or both of the sealing surface 412 and the filter seat 360. Depending upon variables such as, but not limited to, the angle and vertical dimension of the sealing surface 412 of the filter cartridge 400, and the angle and vertical dimension of the filter seat 360, the length of the sealing range 366 can vary.

As well, where a seal is intended to be achieved by forming the sealing surface 412 and filter seat 360 at respective angles, the amount of contact area between those two elements can be controlled by selection of the respective angles, if one or both of those elements are compliant. To some extent at least, a relatively larger contact area may correspond to a relatively better and more stable seal than would be provided by a relatively smaller contact area.

C. Filter Management Elements—Example Embodiments

It will be appreciated from the preceding discussion that the filter management element 200a, and the other example embodiments of the filter management element discussed below, are example structural implementations of a means for performing any one or more of seating a filter cartridge within a sealing range, aligning a filter cartridge with a receptacle, and retaining the filter cartridge within a sealing range. The structures disclosed herein are provided only by way of example and any other structure(s) capable of the same, or comparable, functionality are likewise considered to fall within the scope of the invention. Moreover, any additional, or alternative functions disclosed herein in association with one or more embodiments of a filter management element can likewise be performed by such a means and, as such, the means is not limited to the function of seating a filter cartridge within a sealing range, aligning a filter cartridge with a receptacle, and/or retaining a filter cartridge within a sealing range.

In general, embodiments of a filter management element can be configured, oriented, and located in any fashion that enables implementation of the functionality disclosed herein. Some embodiments of a filter management element are configured to be removably connected to an element of a water pitcher, such as a cover for example, by way of structures such as snaps, tabs, and/or detents for example. As a result of this construction, a filter management element can be removed and replaced by a user. This may be desirable if, for example, the filter management element becomes damaged, or if a filter management element of a different configuration is better suited for use with the filter cartridge expected to be employed. As the foregoing thus suggests then, at least some embodiments of a filter management element can be manipulated by a user while other embodiments of a filter management element, such as those disclosed in FIGS. 10a-10c generally cannot.

In at least some instances, one or more aspects of the physical configuration of a filter management element may be determined based upon the physical configuration of the filter(s) in connection with which the filter management element is expected to be utilized. For example, one consideration that can bear significantly on the design of a filter management element is the fact that many filter cartridges include one or more air vents on the uppermost part of the filter cartridge. In brief, the air vents allow air to escape from the filter cartridge so that water can enter the filter cartridge. If airflow from the vents is impaired, the filter cartridge can become air locked such that little or no water may be able to enter the filter cartridge, thus impairing flow through the filter cartridge and, correspondingly, impairing filtration. Accordingly, various embodiments of the filter management elements disclosed herein are configured to avoid, or at least substantially avoid, blockages of the filter cartridge air vents. This can be achieved, for example, by way of a reduced contact footprint of the filter management element, examples of which are discussed below.

In terms of their overall composition, the filter management elements disclosed herein can be made of any suitable materials, examples of which include, glass, plastic, elastomeric materials such as rubber, ceramic, composites, and metal, or any group of one or more of those. Filter management elements can be molded, or produced by any other suitable process(es). As well, the filter management elements need not take any particular configuration, orientation, or location.

Figure 5:
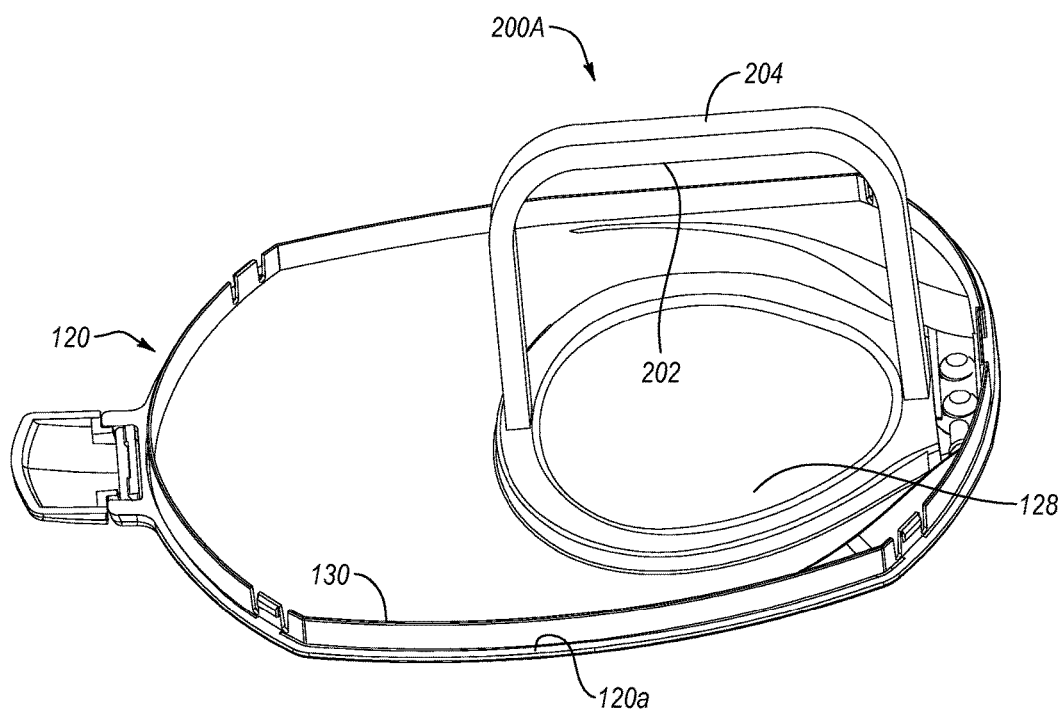
FIG. 5 is a view of an inverted cover that includes an example filter management element.

With particular attention now to FIG. 5, and directing continued attention to FIG. 2, details are provided concerning the example filter management element 200a. In the example of FIG. 5, the filter management element 200a is part of, or attached to, the underside of cover 120 and straddles a fill opening 128. The fill opening 128 can be employed by a user to introduce water into the untreated water reservoir 112 when a rim 130 of the cover 120 is positioned inside the inner perimeter of the chassis 102 and the lid 124 is open.

In the example of FIG. 5, the filter management element 200a has generally U-shaped configuration, and has a generally T-shaped cross-section in which the cross-piece of the T is denoted at 202, and the leg extending below the cross-piece is denoted at 204. The filter management element 200a is connected to the underside of the cover 120 at multiple points, as indicated. Thus configured and arranged, the contact area or contact point on the filter management element 200a that contacts the top 150a of the filter cartridge 150 may include the tip or point of the T-shaped cross-section. In one embodiment, the footprint of the contact area of the protrusion matches a recessed footprint of a corresponding contact area located on the top portion of the filter cartridge. This ensures that the user will be made aware if the filter cartridge is not properly rotationally aligned with the candle.

Figure 6A:
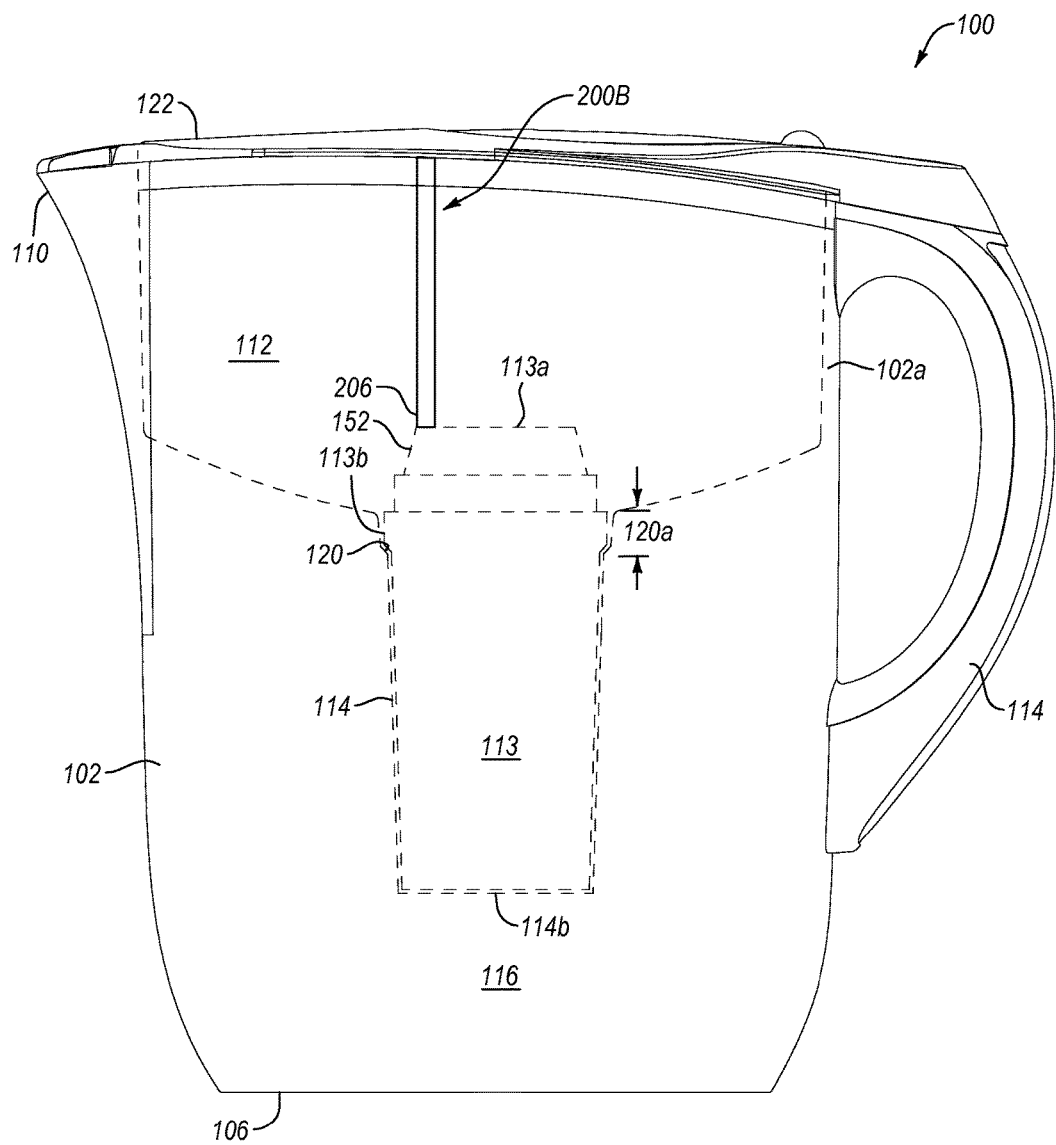
FIG. 6a is a cutaway view of an example pitcher that includes another example filter management element.
Figure 6B:
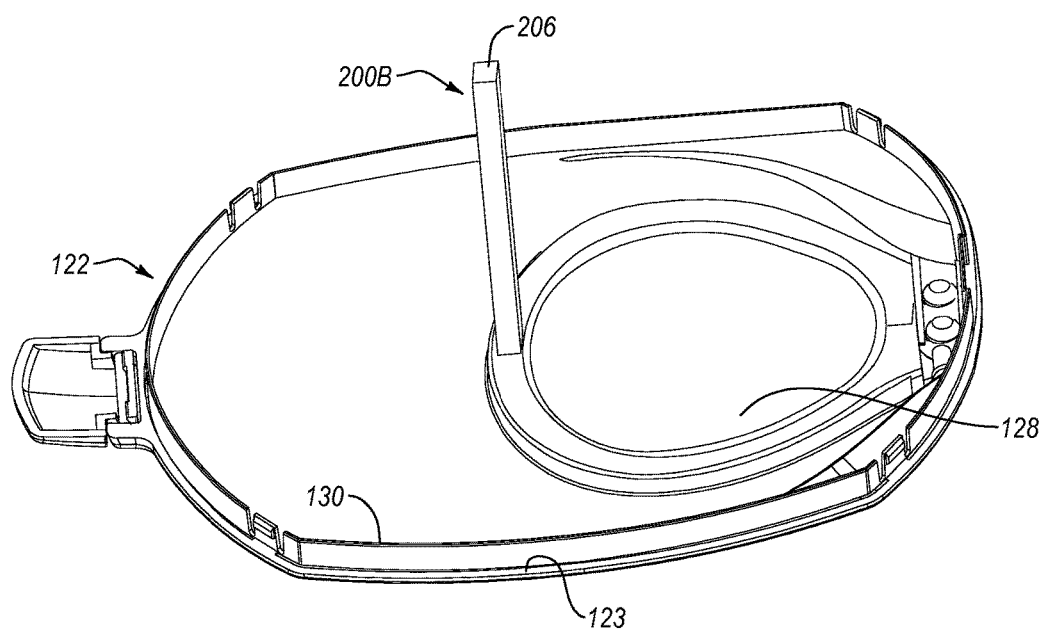

As noted above, the filter management element 200a illustrated in FIGS. 2 and 5 is merely exemplary of a filter management element according to the present disclosure. FIGS. 6a and 6b, for instance, illustrate a filter management element 200b according to another example embodiment of the present disclosure. In the example of FIGS. 6a and 6b, the filter management element 200b is part of, or attached to, the underside of cover 122. The filter management element 200b of FIGS. 6a and 6b has a generally straight configuration and is connected to the underside of the cover 122 at a single location adjacent the fill opening 128, as indicated. Other embodiments of a filter management element may have a curved or other non-straight configuration and/or may be oriented at a non-vertical angle. Similarly, other embodiments of a filter management element may be connected to the cover 122 at one or more locations adjacent to or away from the fill opening 128.

In any event, the contact area or contact point on the filter management element 200b that contacts the top 113a of the filter cartridge 113 may include the tip or end 206 of the filter management element 200b opposite the cover 122. As with the embodiment illustrated in FIGS. 2 and 5, the footprint of the contact area of the protrusion may match a recessed footprint of a corresponding contact area located on the top portion of the filter cartridge. This ensures that the user will be made aware if the filter cartridge is not properly rotationally aligned with the candle.

Directing attention now to FIGS. 7a-9c, details are provided concerning some aspects of various embodiments of filter management elements configured to avoid, or at least substantially avoid, blockage of filter cartridge air vents. In general, this result can be achieved by the positioning and/or configuration of the filter management element relative to the filter cartridge, or filter cartridges, with which the filter management element is expected to be employed. At least some embodiments of the filter management element are compatible for use with multiple different filter cartridge configurations, examples of which are disclosed in FIGS. 21a-21f below.

While particular filter management element configurations and contact positions are disclosed in the Figures, those are provided solely by way of example. More generally, various embodiments of a filter management element can contact a filter cartridge at any one or more locations of the filter management element and/or filter cartridge that enable filter seating functionality to be performed while substantially avoiding impairment of air flow from the filter cartridge. As noted elsewhere herein, yet other embodiments of a filter management element need not contact the filter cartridge, or contact the filter cartridge only at certain times, but not at others.

Figure 7A:
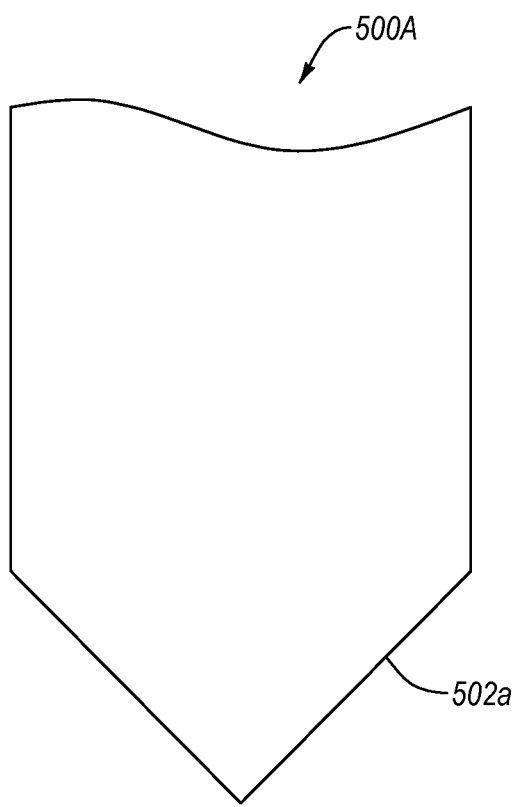
FIG. 7a is a cross-section view of a contact portion of an example filter management element.
Figure 7B:
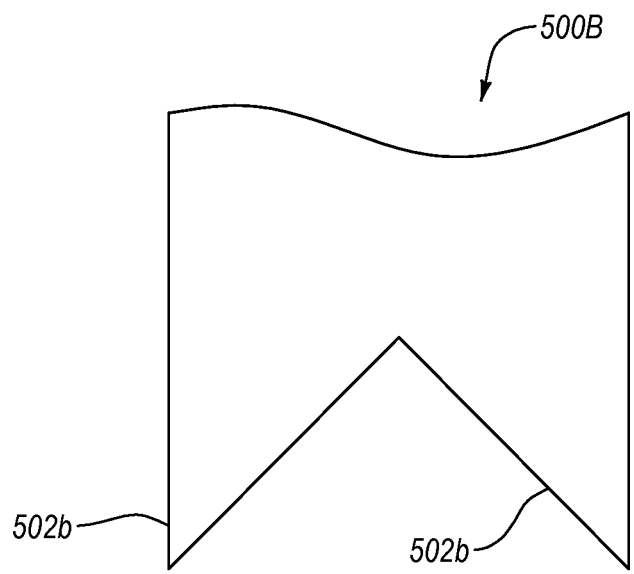
FIG. 7b is a cross-section view of a contact portion of another example filter management element.

In FIGS. 7a and 7b, example cross-sectional shapes of a filter management element 500A and 500b, respectively, are disclosed. In this example, the contact portion 502a, that is, the portion of the cross section that contacts the top of the filter cartridge (not shown), is tapered. As a result of this tapered configuration, the contact area between the filter management element 500a and the filter cartridge can be relatively small, thus helping to ensure that airflow from the filter cartridge is not materially impaired. Moreover, the upward slope of the contact portion 502a away from the air vents also helps to avoid adverse impact on air flow when the contact portion 502a is positioned on top of the filter cartridge.

The concept behind the filter management element 500B in FIG. 7b is the same as for filter management element 500A, although the implementation is different. In the example of FIG. 7b, the contact portion 502b has a shape that is generally the inverse of the shape of contact portion 502a. As well, the contact portion 502b has multiple contact points configured and arranged to make contact with a portion, such as the top, of a filter cartridge.

These different two shapes may be respectively referred to as male, and female, configurations. In general, while both contact portions 502a and 502b are indicated as having one or more tapered portions, one or more of those tapered portions can instead be rounded, pointed, curved or relatively flat, for example, at least to an extent that air flow from the filter cartridge is not materially impaired. Moreover, portions of the filter management elements 500a and 500b that do not contact a filter cartridge can be any desired shape. Thus, a filter management element may, but is not required to, have a substantially uniform cross-sectional shape throughout its entire length.

As in the case of the contact portion 502a, the contact portion 502b, which includes two, or more, points of contact, is configured such that the contact area between the filter management element 500b and the filter cartridge will be relatively small, thus helping to ensure that airflow from the filter cartridge is not materially impaired. Moreover, the upward slope of the middle of the contact portion 502b away from the air vents also helps to avoid adverse impact on air flow when the contact portion 502b is positioned on top of the filter cartridge.

Figure 8A:
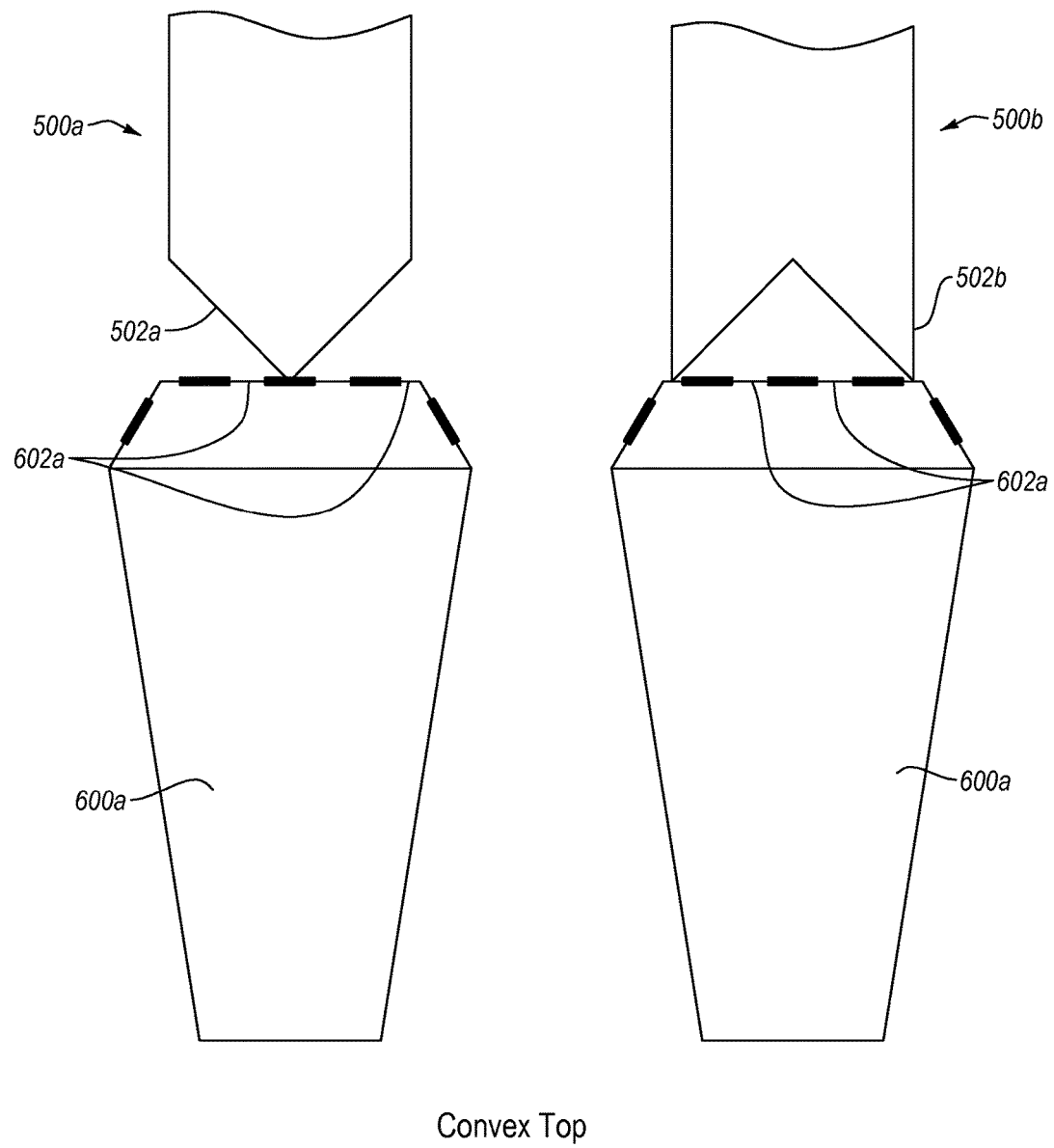
FIGS. 8a-8c are side views of the interaction of various filter management element with various filter cartridge configurations.
Figure 8B:
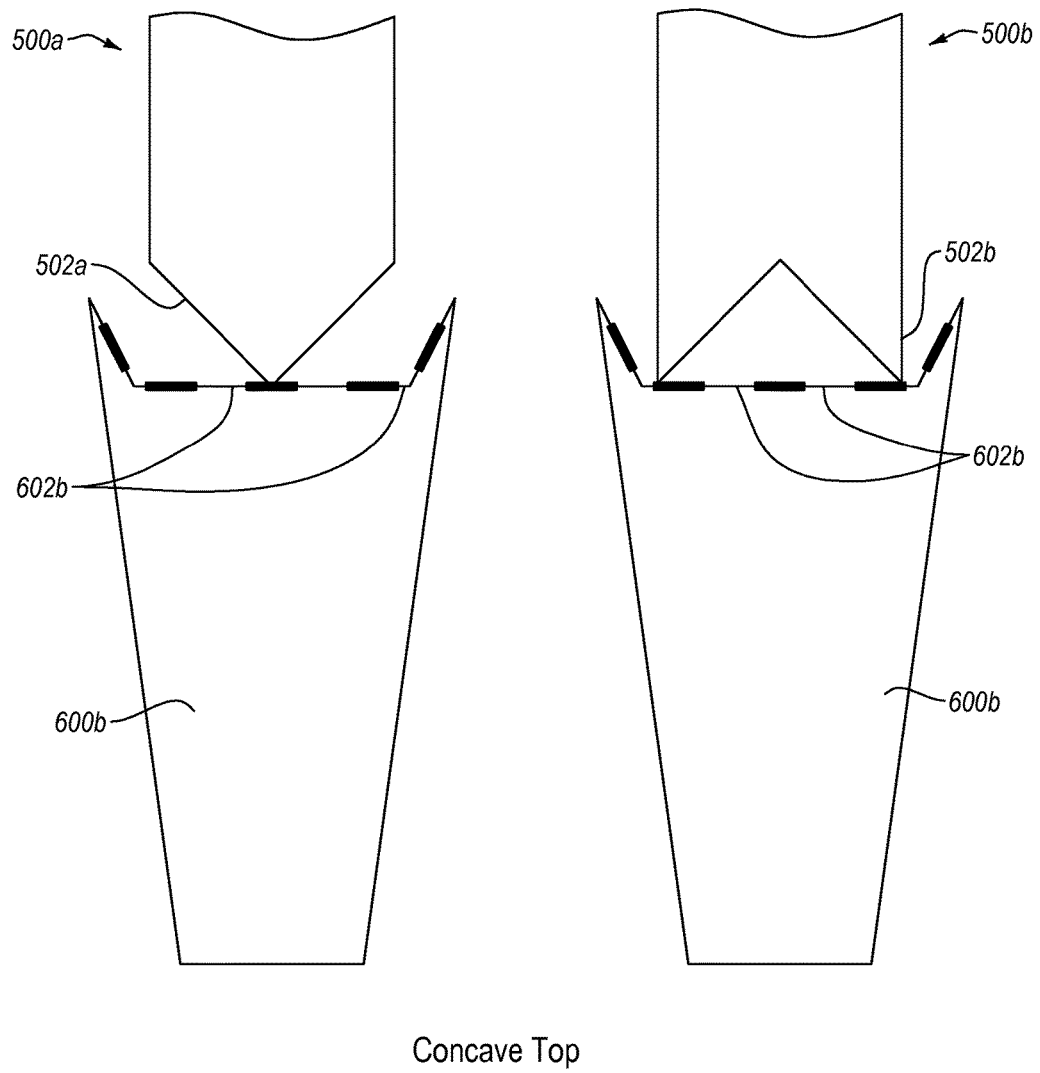
Figure 8C:
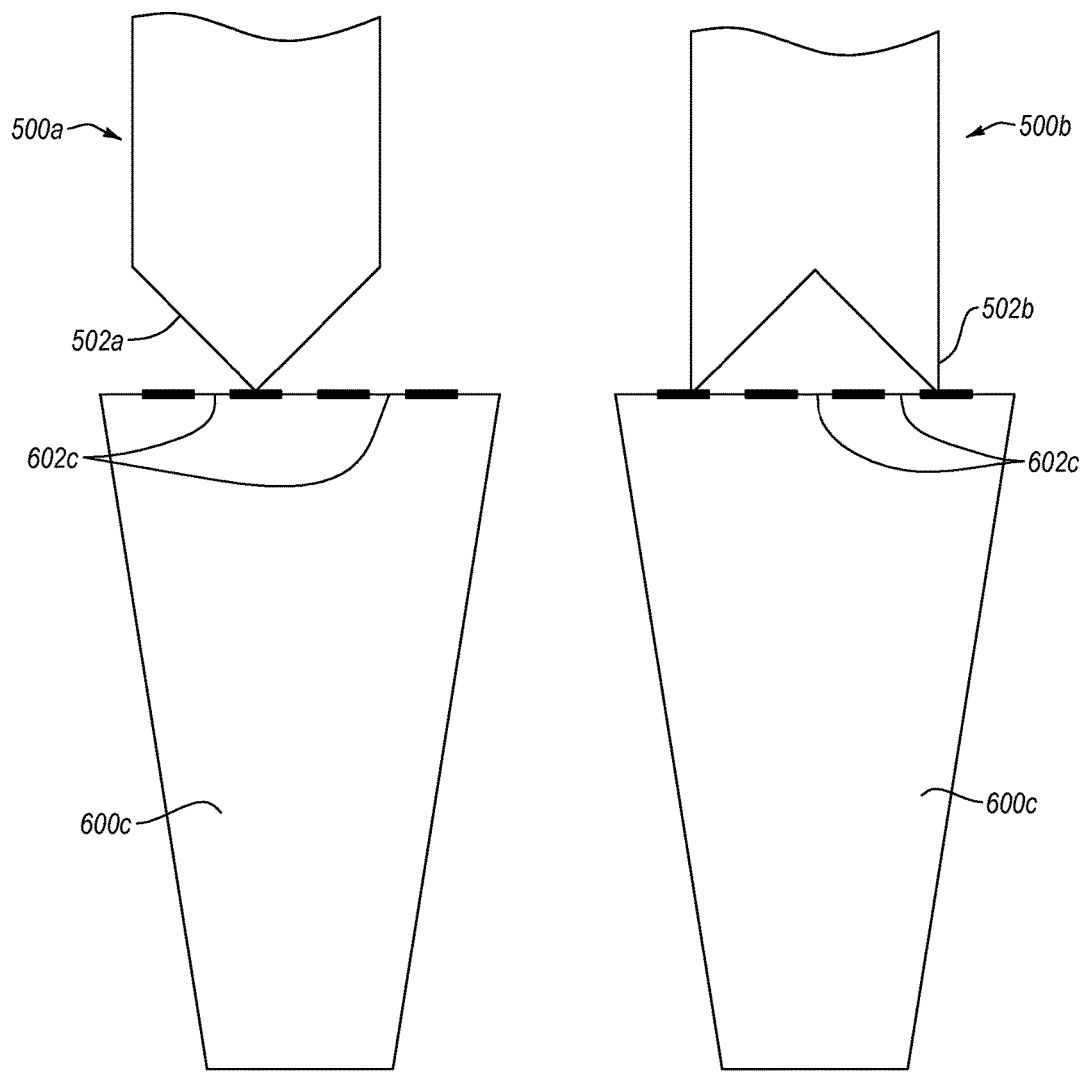

With attention now to FIGS. 8a-8c, details are provided concerning the use of filter management elements such as 500a and 500b in connection with various types of filter cartridge configurations. Among other things, FIGS. 8a-8c illustrate that a single configuration of a filter management element is compatible with multiple filter cartridges, each having a different respective configuration in the region where the filter cartridge is contacted by the filter management element.

In FIG. 8a, a filter cartridge 600a with a convex top is disclosed. The filter cartridge 600a includes a plurality of air vents 602a disposed in various locations on the top of the filter cartridge 600a. However, by virtue of the generally tapered construction of the contact portion 502a of the filter management element 500a, it can be seen in FIG. 8a that the contact portion 502a does not reside on, or block in any way, the air vents 602a. The contact portion 502a can contact the filter cartridge 600a generally in the center of the top of the filter cartridge 600a as generally indicated in FIG. 8a, or the contact portion 502a can contact the filter cartridge 600a at a location that is off center from the top of the filter cartridge 600a.

In FIG. 8b, a filter cartridge 600b with a concave top is disclosed. The filter cartridge 600b includes a plurality of air vents 602b disposed in various locations on the top of the filter cartridge 600b. However, by virtue of the generally tapered construction of the contact portion 502a of the filter management element 500a, it can be seen in FIG. 8b that the contact portion 502a does not reside on, or block in any way, the air vents 602b. The contact portion 502a can contact the filter cartridge 600b generally in the center of the top of the filter cartridge 600a as generally indicated in FIG. 8b, or the contact portion 502a can contact the filter cartridge 600b at a location that is off center from the top of the filter cartridge 600b.

With reference now to FIG. 8c, a filter cartridge 600c with a substantially flat top is disclosed. The filter cartridge 600c includes a plurality of air vents 602c disposed in various locations on the top of the filter cartridge 600c. However, by virtue of the generally tapered construction of the contact portion 502a of the filter management element 500a, it can be seen in FIG. 8c that the contact portion 502a does not reside on, or block in any way, the air vents 602c. The contact portion 502a can contact the filter cartridge 600c generally offset from the center of the top of the filter cartridge 600c as generally indicated in FIG. 8c, or the contact portion 502a can contact the filter cartridge 600c at a location that is substantially centered on the top of the filter cartridge 600c.

Figure 9A:
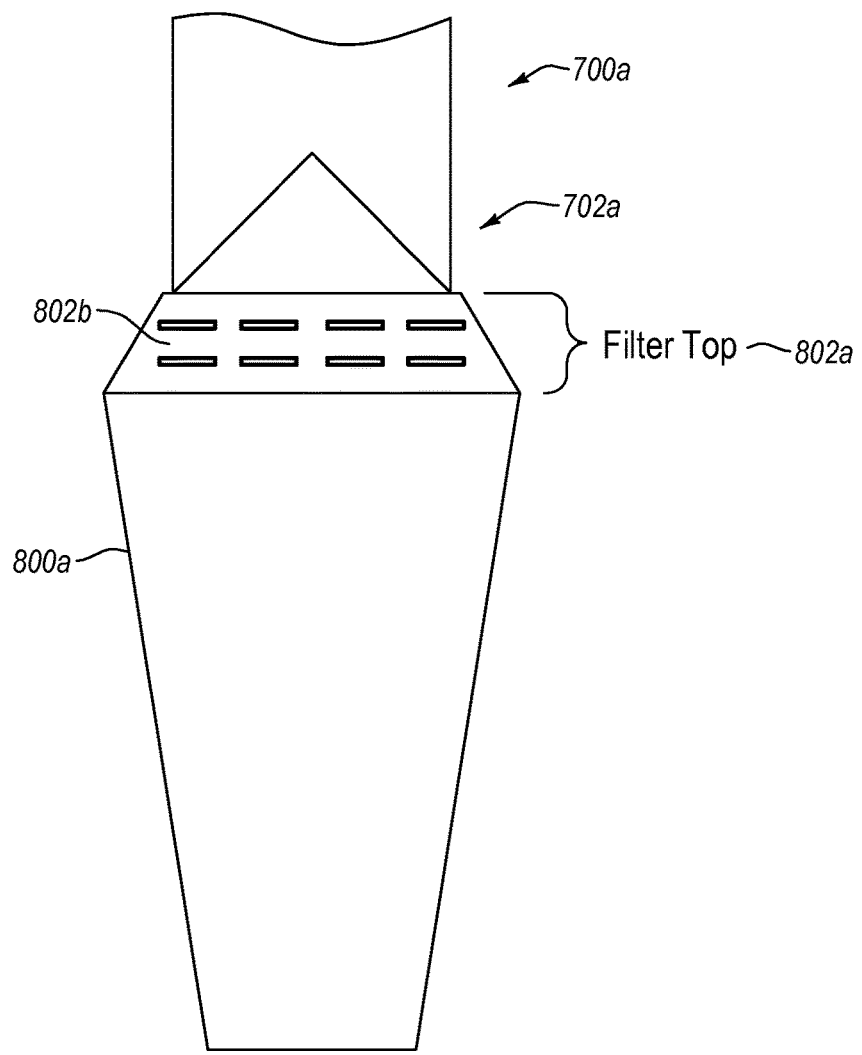
FIGS. 9a-9c are side views of the interaction of still further various filter management element with various filter cartridge configurations.
Figure 9B:
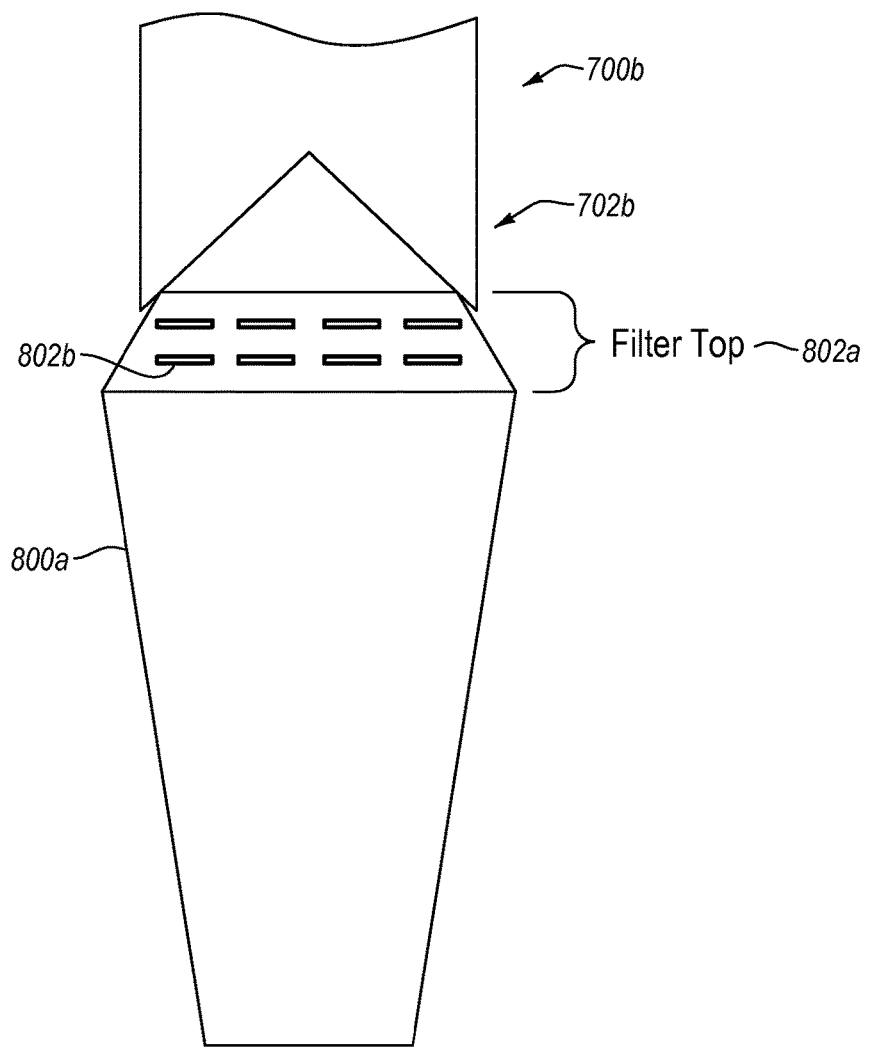
Figure 9C:
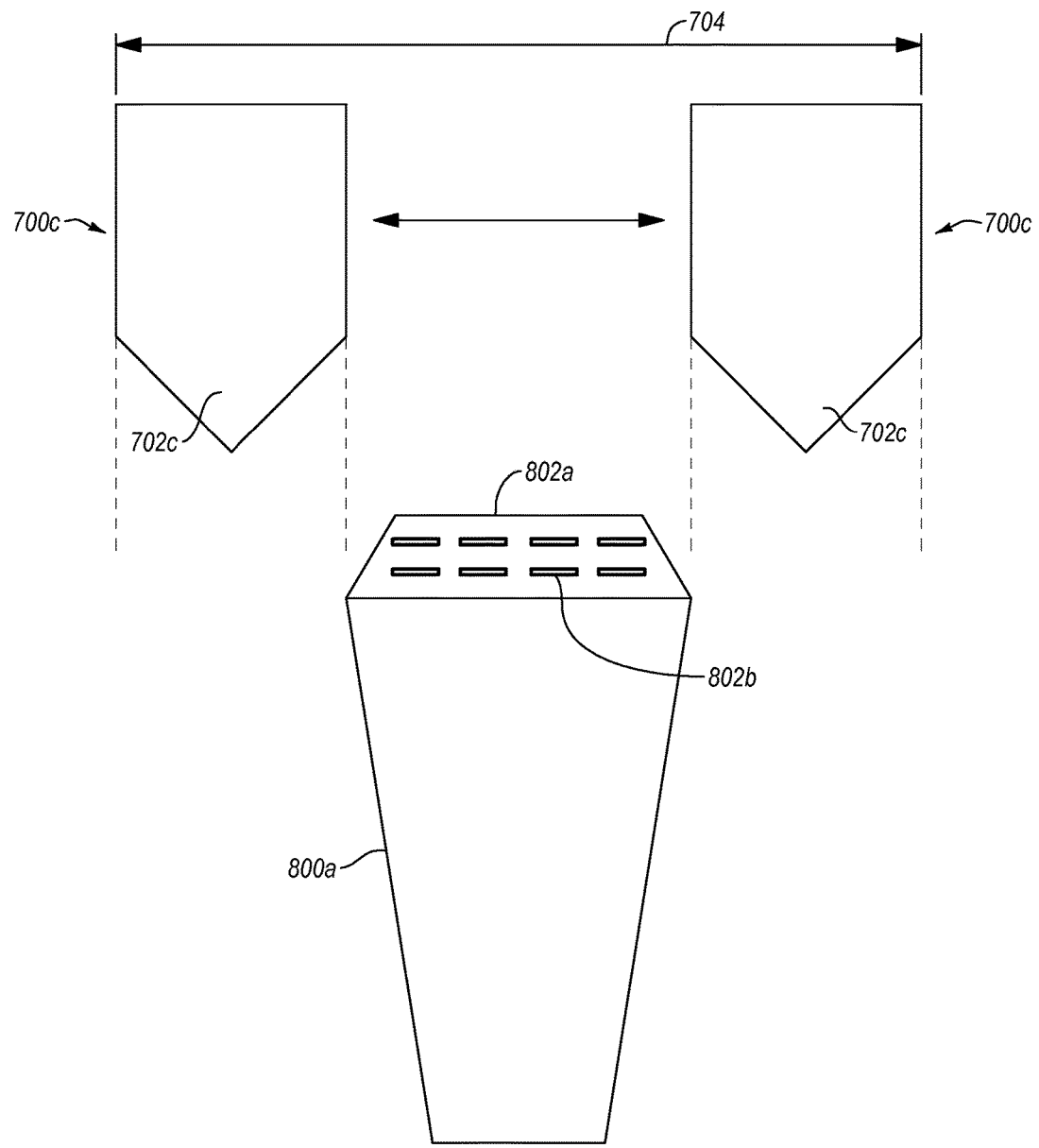

With attention now to FIGS. 9a-9c, details are provided concerning further example embodiments of filter management elements 700a, 700b and 700c. As indicated in FIGS. 9a and 9b, the filter management element 700a has a female configuration that includes a contact portion 702a having multiple contact points. The filter management element 700a can take a variety of configurations, any of which are effective to provide the filter seating functionality disclosed herein, while also avoiding material impairment of airflow from a filter cartridge.

With regard first to FIG. 9a, the filter management element 700a can be used with a variety of filter cartridge configurations, including the convex configuration of the filter cartridge 800a. In this particular example, the contact portion 702a of the filter management element 700a is sized and configured to contact the filter cartridge 800a in at least two locations within an outer perimeter of the filter top 802a. Thus configured and arranged, the filter management element 700a neither blocks the fluid inlet section 802b nor the air vents (not shown) on top of the filter cartridge 800a. The configuration of the filter management element 700b is similar except that the contact portion 702b is sized and configured to contact the filter cartridge 800a in at least two locations outside of an outer perimeter of the filter top 802a. Like the filter management element 700a, the filter management element 700b neither blocks the fluid inlet section 802b nor the air vents (not shown) on top of the filter cartridge 800a.

Turning now to FIG. 9c, a male type filter management element 700c is disclosed that is configured to the filter top 802a of the filter cartridge 800a. As shown, the filter management element 700c may move between left and right positions that define a range 704. As long as the filter management element 700c is positioned within the range 704, contact will be made with the filter top 802a of the filter cartridge 800a, and the filter management element 700c can operate to facilitate movement of the filter cartridge 800a into a sealing range.

D. Alternative Embodiments—Filter Seat Protrusions

Figure 10A:
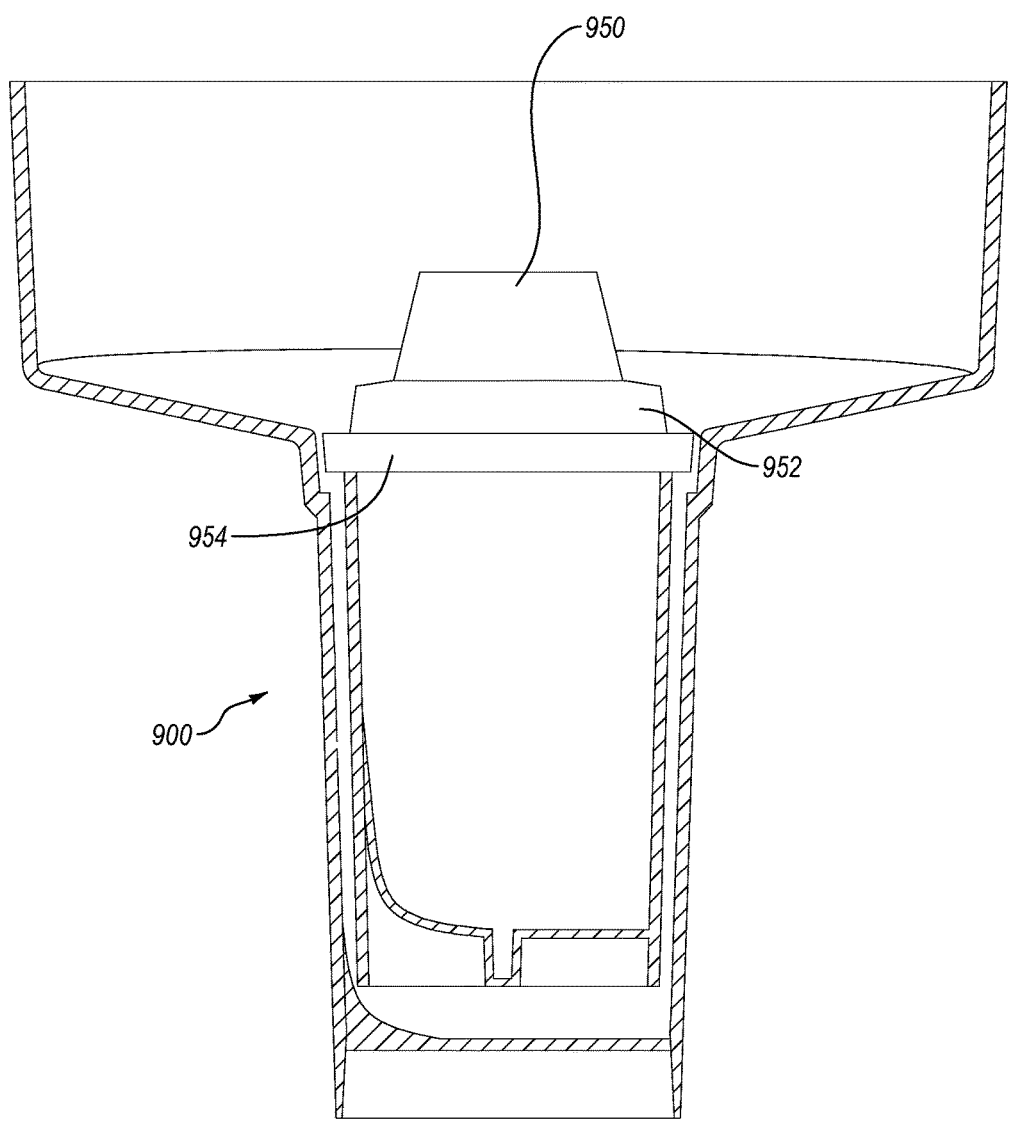
FIGS. 10a-10d are directed to an embodiment of a candle that includes various types of filter management elements.
Figure 10B:
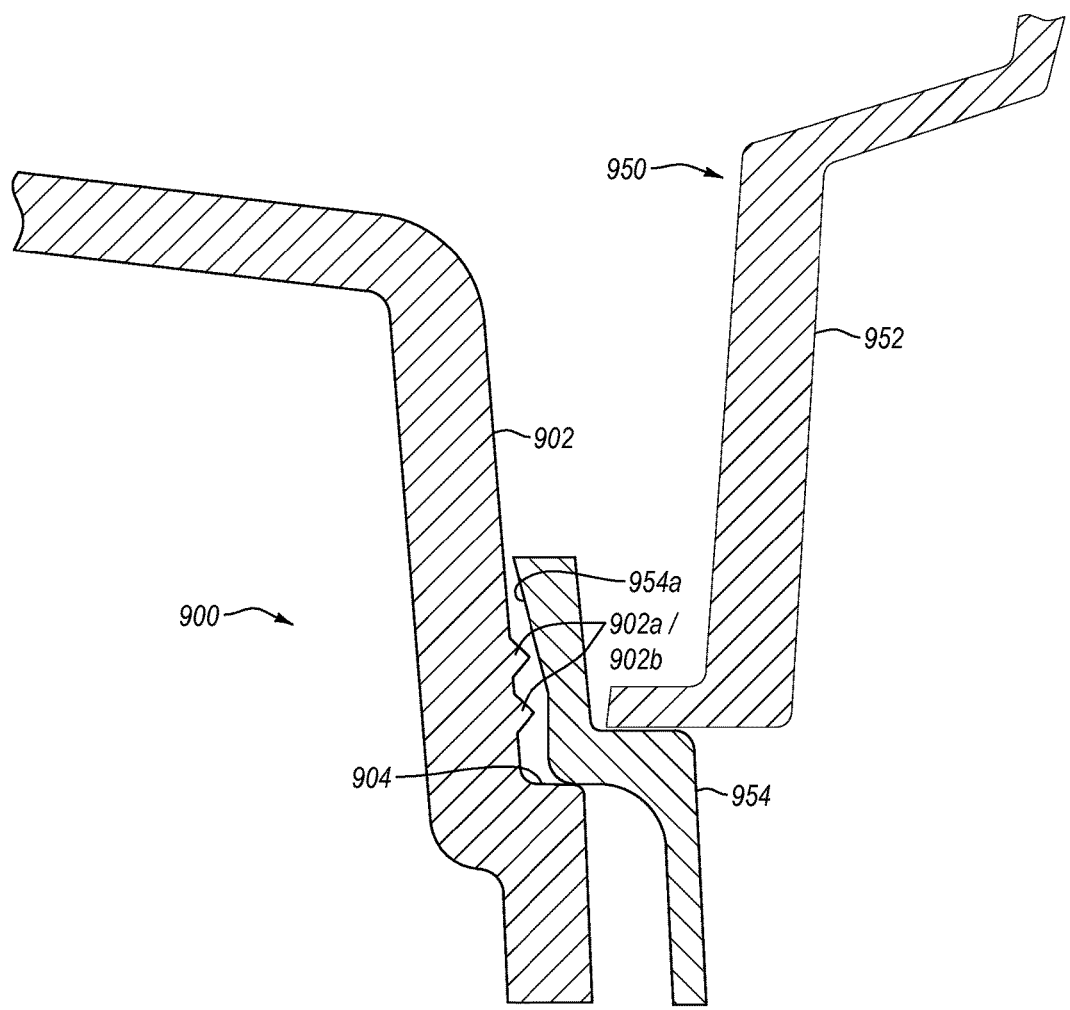
Figure 10C:
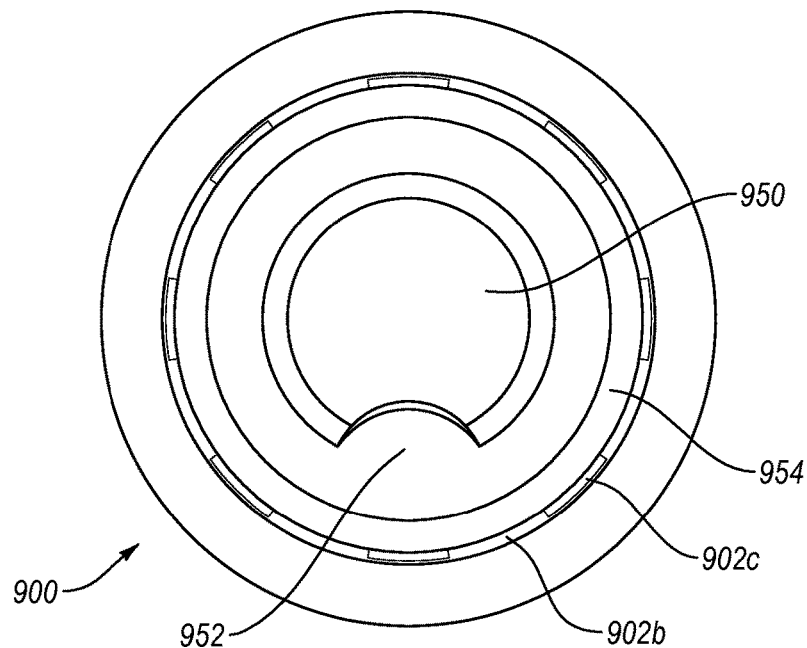

With regard now to FIGS. 10a-10c, details are provided concerning another embodiment of a candle, one example of which is denoted generally at 900 and includes one or more filter management elements. Except as noted below, the candle 900 may be substantially the same, or identical, to other embodiments of a candle disclosed herein. Moreover, the filter management elements employed in the candle 900 can be used either separately, or in conjunction with, any of the filter management elements disclosed herein. As in the case of the other candles disclosed herein, the candle 900 is not limited for use with any specific filter cartridge configuration(s).

Similar to other candles disclosed herein, the candle 900 may include an annular filter seat 902 that may be disposed at an angle relative to vertical. Below the filter seat 902, an annular shoulder 904 is positioned that limits the extent to which a filter cartridge 950 can be moved downward in the candle 900. As best shown in FIGS. 10a and 10b, the filter cartridge 950 includes an upper housing portion 952, and a lower housing portion 954 that can reside on the shoulder 904 of the candle 900. The lower housing portion 954 can cooperate with the filter seat 902 to form a fluid-tight, or substantially fluid-tight, seal in the manner disclosed elsewhere herein.

With continued reference to FIG. 10b in particular, the example lower housing portion 954 may have an inwardly tapering sealing surface 954a. As a result of this configuration, the contact area between the sealing surface 954a and the filter seat 902 may be relatively smaller than in the case of other filter cartridges. While an adequate seal is achievable with this configuration, it may be desirable in some instances to further enhance the seal between the lower housing portion 954 and the filter seat 902.

One way to further enhance the aforementioned seal is to extend at least a portion of the filter seat 902 inward, that is, toward the interior of the candle 900 so that a relatively greater portion of the filter seat 902 is positioned relatively closer to the sealing surface 954a. By extending the filter seat 902 in this way, the contact area between the filter seat 902 and the sealing surface 954a is increased when the lower housing portion 954 is located in a sealing range of the candle 900. In the example of FIG. 10b, this extension of the filter seat 902 is achieved through the use of one or more filter management elements 902a that extend from the filter seat 902 toward the interior of the candle 900. The filter management elements 902a are positioned below the outermost portion of the lower housing portion 954, and above the shoulder 904. One or both of the filter management elements 902a can be disposed within, or at least partly define, the sealing range of the candle 900. In general, the filter management elements 902a may help to improve or enhance a fluid-tight, or substantially fluid-tight, seal formed by the candle 900 in cooperation with the filter cartridge 950. Additionally, or alternatively, the filter management elements 902a, as well as filter management elements 902b, may aid in the retention of the filter cartridge 950 in the sealing range of the candle 900.

In terms of their construction, the filter management elements 902a may each take the form of an annular ring, and can each have a generally triangular cross-section, as shown, although that particular configuration is not required. More generally, any cross-sectional shape can be employed that serves to provide a relative increase in contact area between the filter seat 902 and the sealing surface 954a. Other example shapes include, but are not limited to, the following, or portions thereof, circular, square, oval, polygonal, and rectangular.

Further, the number, size and positioning of the filter management elements 902a are not limited to the illustrated configuration. For example, more, or fewer, than two filter management elements 902a can be employed. As well, the cross-sectional area of the filter management elements 902a can be larger, or smaller, than indicated in FIG. 10b. Further, the size and configuration of the filter management elements 902a need not be the same for each filter management element. That is, one filter management element can differ from another filter management element in terms of their respective sizes and/or shapes.

In addition to providing for a relative increase in contact area between the filter seat 902 and the sealing surface 954a, the use of one or more filter management elements 902a, which can take the form of annular rings as noted above, may also enhance the grip of the filter seat 902 on the lower filter cartridge housing 954. As a result, the filter cartridge housing 950 may be less likely to come loose from the candle 900 during use.

Figure 10D:
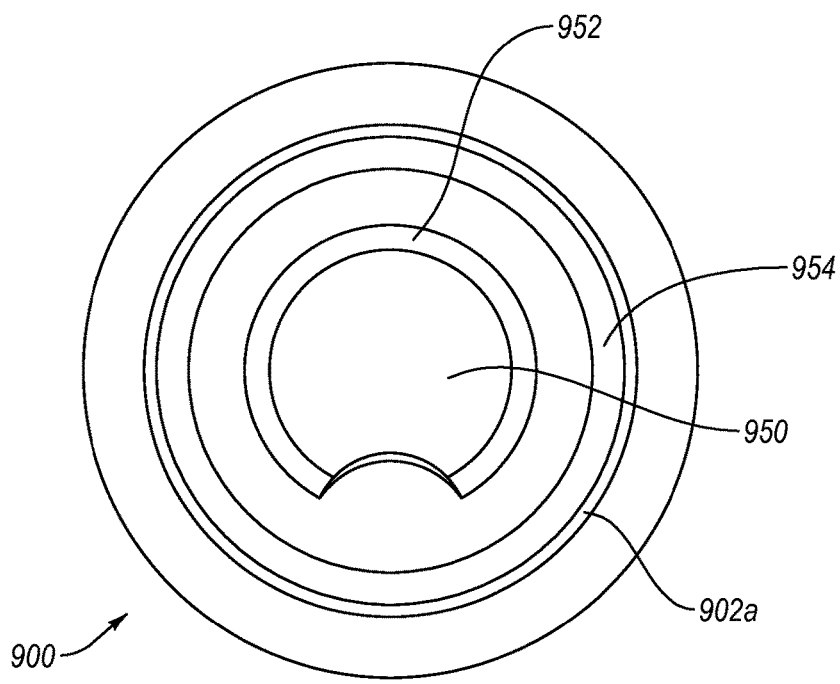

With continued reference to FIGS. 10c and 10d in particular, some embodiments of the candle 900 additionally, or alternatively, include one or more filter management elements 902b. In general, the filter management element(s) 902b may help to improve the grip of the candle 900 on the filter cartridge housing 950 so that the filter cartridge housing 950 is less likely to move out of the sealing range during use.

The filter management elements 902b may be generally annular in their overall configuration while taking the form of a non-continuous ring, that is, a segmented form where gaps 902c are present between successive sections of the filter management element 902b. The size, number and spacing of the gaps 902c can be varied as desired. The gaps 902c may, or may not, be relatively evenly distributed. In terms of their cross-sectional shape and/or size, the segments of the filter management element 902b can be the same as, or similar to, the filter management elements 902a.

One or more filter management elements 902b can be employed in a candle 900 with, or without, one or more filter management elements 902a, in any combination and number. In yet other embodiments, an example of which is disclosed in FIG. 10d, the filter management elements 902b can be omitted, and only one or more filter management elements 902a are employed. As well, any relative position of the filter management elements 902b and filter management elements 902a, when both are present, can be employed. For example, a filter management element 902b can be vertically positioned above, or below, a filter management element 902a. Finally, one or more filter management elements 902b can be positioned within the sealing range, although that is not required.

E. Alternative Embodiments—Hinged Cap

Figure 11A:
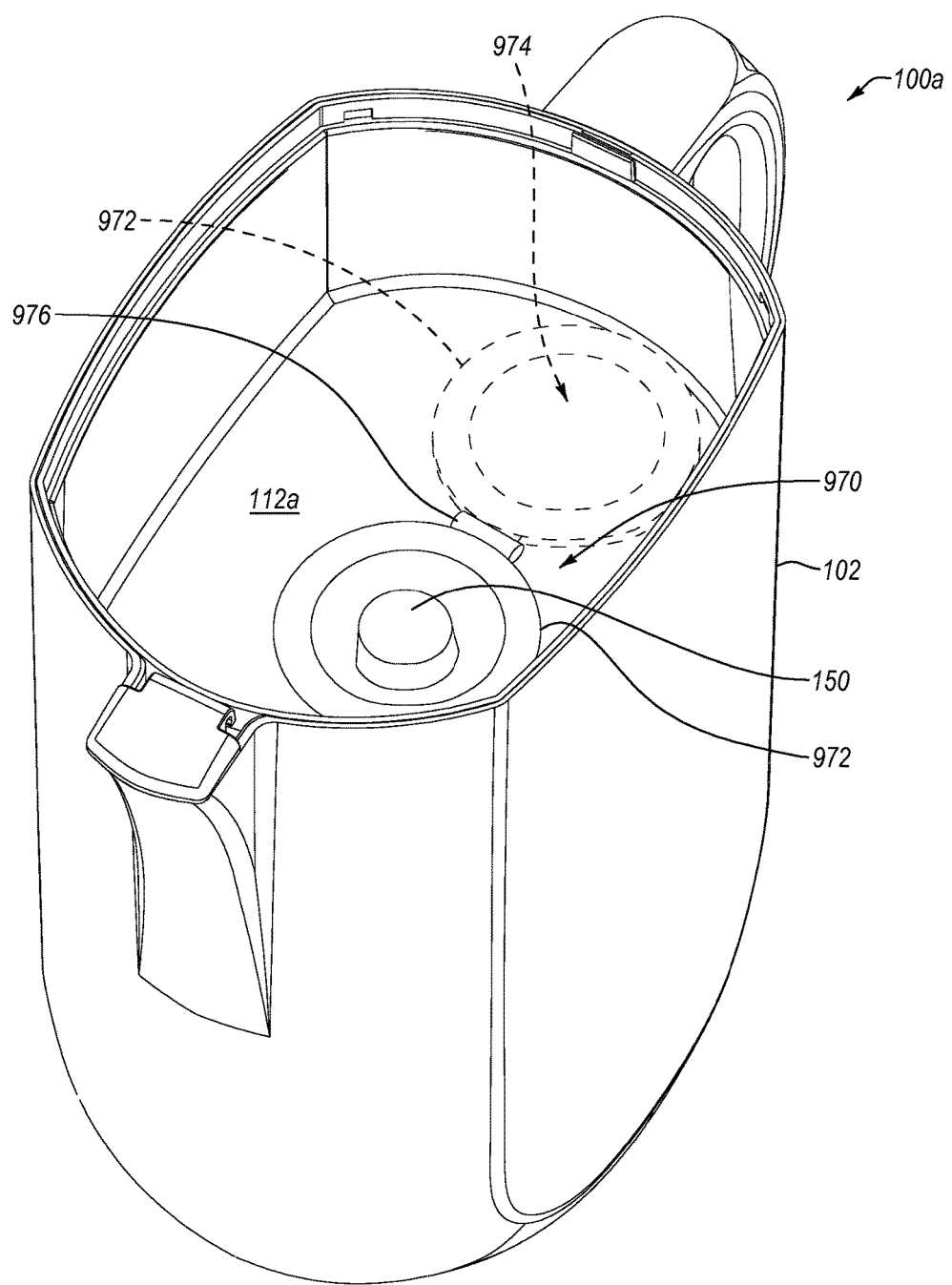
FIGS. 11a-11b are directed to an embodiment of a filter management element.
Figure 11B:
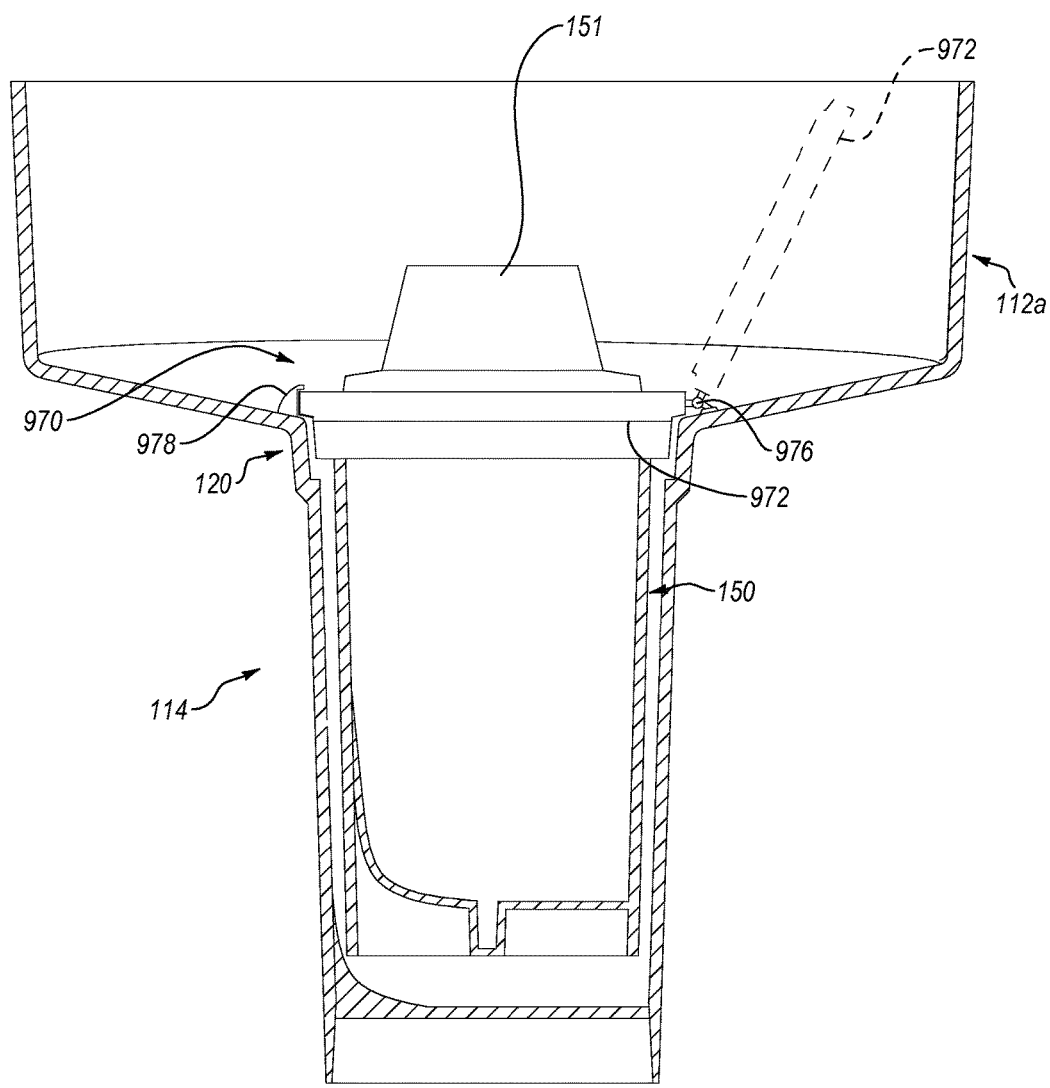

With regard now to FIGS. 11a-11b, details are provided concerning a water pitcher 100a that includes another embodiment of a filter management element, generally denoted at 970. Except as noted below, water pitcher 100a may be substantially the same, or identical, to other embodiments of water pitchers disclosed herein. Moreover, the filter management element 970 can be used either separately, or in conjunction with, any of the filter management elements disclosed herein. As in the case of the other water pitchers and filter management elements disclosed herein, the water pitcher 100a and filter management element 970 are not limited for use with any specific filter cartridge configuration(s).

Similar to other water pitchers disclosed herein, the water pitcher 100a may include a chassis 102 and an untreated water reservoir 112a. Similar to untreated water reservoir 112, the untreated water reservoir 112a includes a hollow candle 114 that defines a receptacle within which a filter cartridge 150 can be removably positioned. Also like the untreated water reservoir 112, the untreated water reservoir 112a includes a seat 120 positioned near the upper end of the candle 114 which is configured to cooperate with the filter cartridge 150 in the candle 114 to form a seal such that water in the untreated water reservoir 112a can enter a treated water reservoir in the chassis 102 only by passing through the filter cartridge 150. It should be noted that while the gap between the filter cartridge 150 and the candle 114 shown in FIG. 11b is solely for the purpose of clarity in showing the relation between the filter cartridge 150 and the candle 114, the gap also illustrates the bypass problem that can occur if the filter cartridge 150 is not properly aligned in the candle 114, and seated on the seat 120.

While an adequate seal may be achievable by properly seating the filter cartridge 150 on the seat 120, it may be desirable in some instances to further enhance the seal between the cartridge 150 and the seat 120. Likewise, it may be desirable to secure the filter cartridge 150 in place on the seat 120 so that the seal therebetween in not inadvertently broken. One way to further enhance the aforementioned seal is with the filter management element 970.

In the illustrated embodiment, the filter management element 970 includes a cap 972 that can opened and closed. When the cap 972 is opened, as shown in dashed lines in FIGS. 11a and 11b, the filter cartridge 150 can be inserted into the candle 114. Once the filter cartridge 150 is inserted into the candle 114, the cap 972 can be closed, as shown in solid lines in FIGS. 11a and 11b, to retain the filter cartridge 150 in a desired position within the candle 114. In some embodiments, when the cap 972 is closed, the cap 972 can hold the filter cartridge 150 against the seat 120 so as to create or maintain a seal between the filter cartridge 150 and the seat 120. Additionally, or alternatively, the cap 972 can interface with the interior of the untreated water reservoir 112a and the filter cartridge 150 when closed to seal off any gaps therebetween, as best seen in FIG. 11B.

In the illustrated embodiment, the cap 972 defines an opening 974 (as best seen in FIG. 11a) that accommodates an upper portion 151 of the filter cartridge 150. More specifically, in the illustrated embodiment, the opening 974 is sized and configured to allow for the upper portion 151 to extend at least partially through the opening 974. In such a configuration, water in the untreated water reservoir 112a can enter the upper end 151 of the filter cartridge 150 and pass through the filter cartridge 150 into the treated water reservoir within the chassis 102. It will be understood that, depending on the configuration of the filter cartridge, the upper portion of the filter cartridge may not extend through the opening 974. Rather, for instance, water in the untreated water reservoir 112a may flow through the opening 974 and into the upper end of the filter cartridge.

A cap of a filter management element may have any of a variety of configurations, with the cap 972 being just one example. For instance, rather than being formed in a generally ring shape with a single opening (i.e., opening 974) that allows for the upper end of a filter cartridge to extend therethrough, a cap may extend over the upper end of the filter cartridge, thereby substantially covering the upper end of the filter cartridge. The cap may still include one or more openings therein to allow water from the untreated water reservoir 112a to pass through the cap and into the upper end of the filter cartridge.

The cap 972 may be opened and closed in a variety of ways. By way of non-limiting example, FIGS. 11a and 11b illustrate cap 972 hingedly connected to the interior of the untreated water reservoir 112a by way of a hinge 976. The hinge 976 can allow the cap 972 to be pivoted between the open and closed positions. In some embodiments, the filter management element 970 also includes a retainer mechanism 978 that can selectively retain the cap 972 in the closed position. In the illustrated embodiment, the retainer mechanism 978 is a flange, clip, or protrusions extending from or connected to the inner surface of the untreated water reservoir 112a. When the cap 972 is closed, the retainer mechanism 978 can engage the cap 972 to maintain the cap 972 in the closed position. When desired, such as when replacing the filter cartridge 150, the retainer mechanism 978 can be released, thereby allowing for cap 972 to be opened.

In other embodiments, rather than being hingedly connected to the untreated water reservoir 112a, a cap of a filter management element may be selectively connectable to the untreated water reservoir 112a with a threaded connection.

For instance, the cap may include an externally threaded interface that can be selectively engaged with an internally threaded interface of the candle. In such an embodiment, the cap can be unthreaded from the candle to allow for the insertion or removal of a filter cartridge. Similarly, after the insertion of a filter cartridge into the candle, the cap can be threaded into the candle to secure the filter cartridge in place and create or maintain a seal. In other embodiments, the cap may be connected to the untreated water reservoir or candle with a snap-fit, friction-fit, or other type of interference fit, rather than corresponding threaded interfaces.

F. Adapter Elements—Example Embodiments

In general, embodiments of an adapter element can be configured, oriented, and located in any fashion that enables implementation of the functionality disclosed herein. Some embodiments of an adapter element are configured to be removably connected to an element of a water pitcher, such as a cover for example, by way of structures such as snaps, tabs, and/or detents for example. As a result of this construction, an adapter element can be removed and replaced by a user. This may be desirable if, for example, the adapter element becomes damaged, or if an adapter element of a different configuration is better suited for use with the filter cartridge expected to be employed. As the foregoing thus suggests then, at least some embodiments of an adapter element can be manipulated by a user while other embodiments of an adapter element may not.

In at least some instances, one or more aspects of the physical configuration of an adapter element may be determined based upon the physical configuration of the filter(s) in connection with which the adapter element is expected to be utilized. For example, one consideration that can bear significantly on the design of an adapter element is the fact that many filter cartridges include one or more air vents on the top of the filter cartridge. In brief, the air vents allow air to escape from the filter cartridge so that water can enter the filter cartridge. If airflow from the vents is impaired, the filter cartridge can become air locked such that little or no water may be able to enter the filter cartridge, thus impairing flow through the filter cartridge and, correspondingly, impairing filtration. Accordingly, various embodiments of the adapter elements disclosed herein are configured to avoid, or at least substantially avoid, blockages of the filter cartridge air vents. This can be achieved, for example, by way of a reduced contact footprint of the adapter element, examples of which are discussed below.

Another consideration that can have some bearing on the design of an adapter element is the fact that filter cartridges typically include an inlet section where water or other fluid is able to enter the filter cartridge. If fluid flow into the filter cartridge is impaired for any reason, the flow rate through the filter cartridge is reduced, resulting in an unsatisfactory experience for the user. Accordingly, various embodiments of the adapter elements disclosed herein are configured to avoid, or at least substantially avoid, impairment of fluid flow into the filter cartridge. This can be achieved, for example, by way of a reduced contact footprint of the adapter element, examples of which are discussed below.

In terms of their overall composition, the adapter elements disclosed herein can be made of any suitable materials, examples of which include, glass, plastic, elastomeric materials such as rubber, ceramic, composites, and metal, or any group of one or more of those. Adapter elements can be molded or produced by any other suitable process(es). As well, the adapter elements need not take any particular configuration, size, or orientation.

Figure 12:
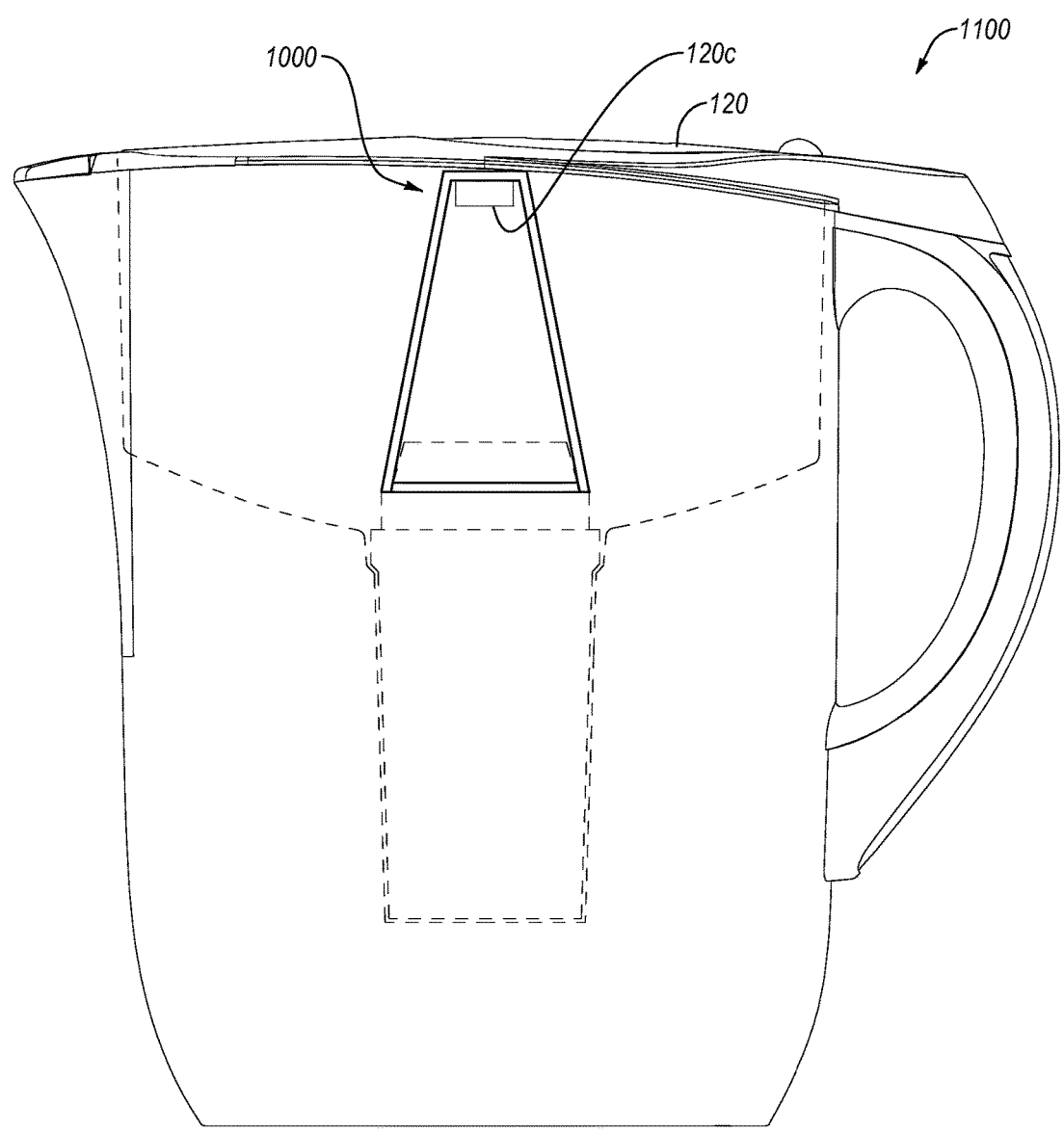
FIG. 12 is a cutaway view of an example pitcher.
Figure 13:
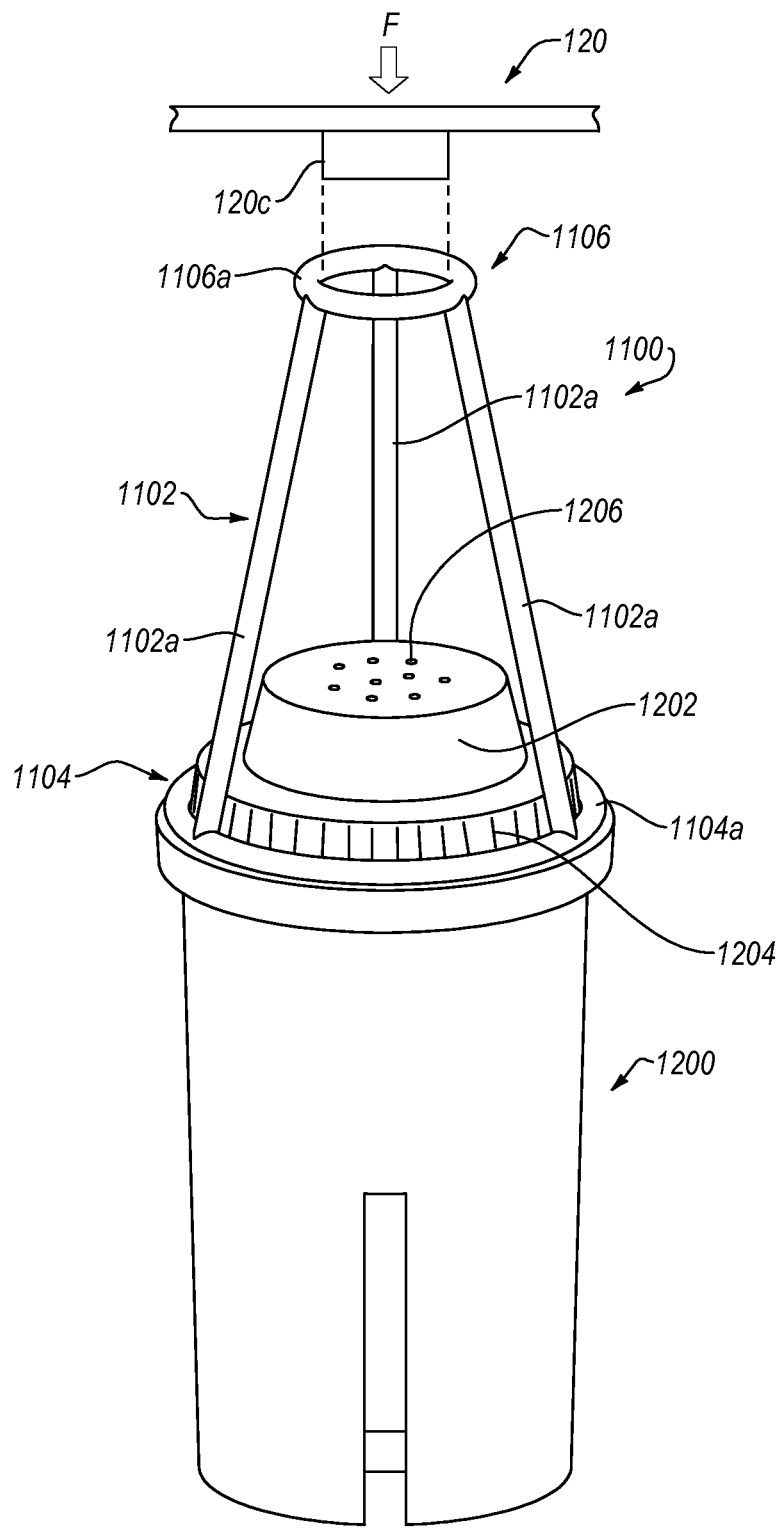
FIG. 13 is a side perspective view of an example adapter element and filter cartridge.
Figure 14:
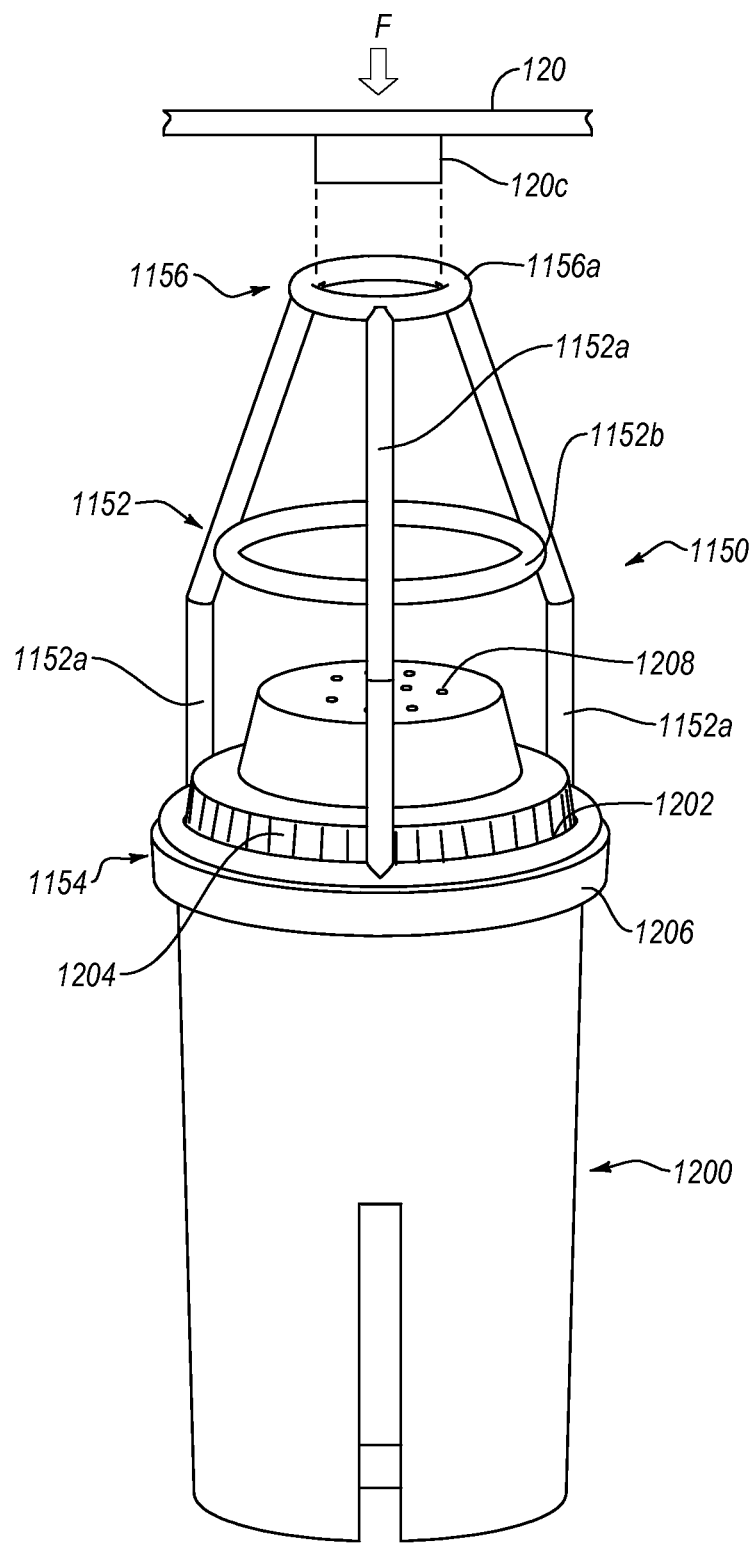
FIG. 14 is a side perspective view of another example adapter element and filter cartridge.

Directing attention now to FIGS. 12-14, details are provided concerning some aspects of various embodiments of adapter elements. At least some embodiments of the adapter element are compatible for use with multiple different filter cartridge configurations, examples of which are disclosed in FIGS. 10a-10f below. It should be noted that except for its inclusion of an adapter element 1000 instead of a filter management element 200a/200b, the pitcher 1100 disclosed in FIG. 12 may be the same, or identical, to the pitcher 100, although that is not required. Thus, a detailed description of the pitcher 1100 is not provided here.

While particular adapter element configurations and contact positions are disclosed in the Figures, those are provided solely by way of example. More generally, various embodiments of an adapter element can contact a filter cartridge at any one or more locations of the adapter element and/or filter cartridge that enable filter seating functionality to be performed while substantially avoiding impairment of air flow from the filter cartridge. As noted elsewhere herein, yet other embodiments of an adapter element need not contact the filter cartridge, or contact the filter cartridge only at certain times, but not at others.

With particular attention now to FIGS. 12 and 13, details are provided concerning the example adapter element 1100 used in connection with an example filter cartridge 1200. In the example of FIG. 13, the adapter element 1100 includes a support structure 1102 to which is attached a lower contact portion 1104 and an upper contact portion 1106. The lower contact portion 1104, support structure 1102 and upper contact portion 1106 may be formed as a unified single-piece structure.

The lower contact portion 1104 in this example is configured to directly contact the filter cartridge 1200. In particular, the lower contact portion 1104 includes a ring 1104a whose inside diameter is about the same, or slightly smaller than, the outside diameter of the bottom of the air vent dome 1202 of the filter cartridge 1200. Thus sized and configured, the lower contact portion 1104 is able to removably receive the air vent dome 1202. Moreover, the relatively close fit between the ring 1104a and air vent dome 1202 may contribute to the lateral stability of the adapter element 1100 in use.

As further indicated in FIG. 13, the support structure 1102 includes three legs 1102a, which can be substantially equidistant from each other, that extend upwardly from the ring 1104a. More, or fewer, legs 1102a can be used. Aspects of the legs 1102a can be selected to provide a degree of deformability that can be useful depending upon the height of the filter cartridge 1200 with which the adapter element 1100 is employed. For example, the thickness of the legs 1102a can be selected to be sufficient to transfer a force adequate to seat the filter cartridge 1200, while also being capable of bowing out to some extent in order to accommodate a filter cartridge that is relatively taller than the filter cartridge 1200.

In the illustrated embodiment, the legs 1102a connect to a ring 1106a of the upper contact portion 1106. As indicated, the ring 1106a can have a diameter that is smaller than the diameter of the ring 1104a, such that the support structure 1102 has a generally tapered configuration. In other embodiments, the ring 1106a can have a diameter that is about the same size as, or larger than, the diameter of the ring 1104a.

In some embodiments, the ring 1106a may cooperate with a cover, such as 120 (see FIG. 12) to enhance the lateral stability of the adapter element 1100. For example, the cover 120 can include structure, such as a retention stub 120c for example, that is received in the ring 1106a when the cover 120 is mated to the corresponding unfiltered water reservoir (not shown). This configuration and arrangement, either alone or in combination with the configuration and arrangement of the ring 1104a and air vent dome 1202, may enhance the lateral stability and, thus, the effectiveness, of the adapter element 1100.

With continued reference to FIG. 13, it can be seen that the lower contact portion 1104 is configured and employed in such a way that it does not impair fluid flow into the fluid inlet section 1204 of the filter cartridge 1200. Further, the open construction of the support structure 1102 does not impair air flow from the air vents 1206 of the filter cartridge 1200. Thus, the positioning and use of the adapter element 1100 does not adversely affect the performance of the filter cartridge 1200.

Turning now to FIG. 14, another embodiment of an adapter element is indicated at 1150. The adapter element 1150 can be used with the filter cartridge, and/or any other filter cartridges disclosed herein. Except as noted below, the adapter element 1150 may be substantially the same as, or identical to, the adapter element 1100, although that is not required, and the considerations noted above in the discussion of the adapter element 1100 apply as well to the adapter element 1150.

Similar to the adapter element 1100, the adapter element 1150 includes a support structure 1152 to which is attached a lower contact portion 1154 and an upper contact portion 1156. The lower contact portion 1154, support structure 1152 and upper contact portion 1156 may be formed as a unified single-piece structure.

The lower contact portion 1154 in this example is configured to directly contact the filter cartridge 1200. In particular, one or more legs 1152a can be positioned in a recess 1202 that is located between a fluid inlet portion 1204 of the filter cartridge 1200 and the structure that defines the sealing surface 1206 of the filter cartridge 1200. The legs 1152a, which can be substantially equidistant from each other, extend upwardly and are supported and reinforced by their attachment to ring 1152b. In the illustrated embodiment, the legs 1152a terminate at a ring 1156a of the upper contact portion 1156. As indicated, the ring 1156a can have a diameter that is smaller than the diameter collectively defined by the lower portions of the legs 1152a, such that the support structure 1152 has a generally tapered configuration. In other embodiments, the ring 1156a can have a diameter that is about the same size as, or larger than, the diameter collectively defined by the legs 1152a. In any case, when configured and positioned as shown and described, the legs 1152a have minimal impact on fluid flow into the fluid inlet portion 1204 of the filter cartridge 1200.

In some embodiments, the ring 1156a may cooperate with the cover 120 to enhance the lateral stability of the adapter element 1150. For example, the cover 120 can include structure, such as a retention stub 120c for example, that is received in the ring 1156a when the cover 120 is mated to the corresponding unfiltered water reservoir (not shown). This configuration and arrangement may enhance the lateral stability and, thus, the effectiveness, of the adapter element 1150.

With continued reference to FIG. 14, it can be seen that the lower contact portion 1154 and support structure 1152 are configured and employed in such a way that they will have little or no effect on fluid flow into the fluid inlet section 504 of the filter cartridge 1200. Further, the open construction of the support structure 1152 does not impair air flow from the air vents 1208 of the filter cartridge 1200. Thus, the positioning and use of the adapter element 1150 does not adversely affect the performance of the filter cartridge 1200.

G. Further Aspects of Example Adapter Elements

Figure 15:
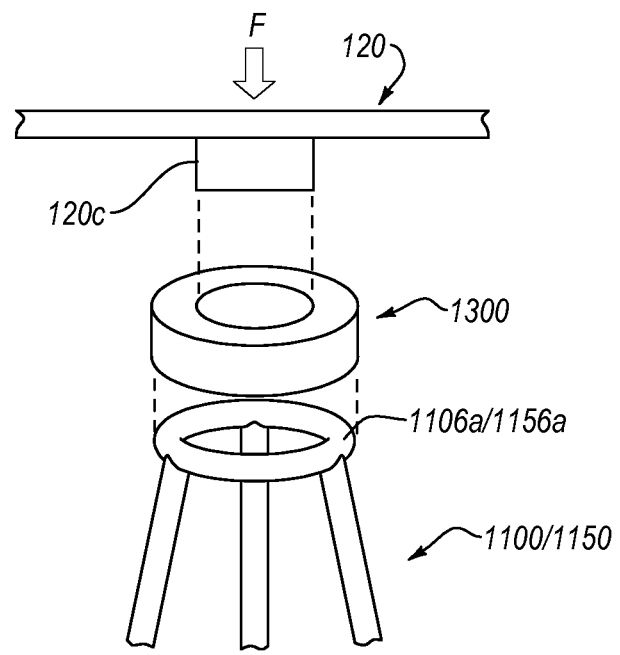
FIG. 15 is a partial perspective view of an example deformable element.

With attention now to FIG. 15, details are provided concerning aspects of an alternative embodiment of the adapter elements 1100 and 1150. As noted elsewhere herein, the disclosed adapter elements can be usefully employed with a wide variety of filter cartridges including, for example, filter cartridges which have different respective heights. To illustrate, a first filter cartridge may be relatively tall, such that there is relatively less headroom between the top of the first filter cartridge and the underside of the cover than there would be for a shorter second filter cartridge. This situation can occur where a user chooses to employ different filter cartridge sizes from time to time. For example, the user may start with the first filter cartridge, and then later switch to the second filter cartridge for cost reasons.

In some instances, an adapter element can adjust to filter cartridges of different heights by its ability to elastically deform in such a way that the vertical height of the adapter element is temporarily reduced. This ability to deform can be inherent in the structure and/or materials used in the adapter element. In other embodiments however, one or more dedicated deformable elements, can be provided whose primary purpose is to deform in response to an applied force, thereby reducing an overall vertical height of the adapter element. These deformable elements can be made of elastomers such as rubber, foam rubber, and/or any other deformable material(s). Properties such as the spring constant 'k' and relative hardness of such deformable structures can be selected to provide the desired effect(s). In some instances, the deformable element can be a spring, such as a helical spring for example.

With particular attention now to FIG. 15, the adapter element 1100/1150 can include a deformable element 1300 that, in general, is positioned in such a way that the force 'F' to seat the filter cartridge (not shown) is exerted directly or indirectly on the deformable element 1300. In the illustrated example, the deformable element 1300 is positioned at the top of the adapter element 1100/1150, though the scope of the invention is not limited to this arrangement of the deformable element 1300. More generally, the deformable element 1300 can be positioned in any other location between the cover 120 and filter cartridge 1200. The deformable element 1300 can be attached to the cover 120, or the adapter element 1100/1150, or not attached to either.

As further indicated in the example of FIG. 15, the deformable element 1300 is generally in the shape of a ring having an opening that can communicate with the opening defined by the ring 1106a/1156a. Thus configured, the deformable element 1300 can receive the retention stub 120c. Where no retention stub 120c is provided, the deformable element 1300 can take the form of a solid disk. In either case, the thickness, diameter, and other physical attributes of the deformable element 1300 can be selected based upon the expected operating requirements.

In operation, the deformable element 1300 may be compressed, or not, depending upon the height of the filter cartridge and/or adapter element with which it is employed. To illustrate, when the deformable element 1300 is used with a relatively tall filter cartridge, such that there may be a relatively small amount of headroom between the top of the filter cartridge and the underside of the cover, the deformable element 1300 may be compressed, possibly significantly, when the cover 120 is closed. On the other hand, when the deformable element 1300 is used with a relatively short filter cartridge, such that there may be a relatively large amount of headroom between the top of the filter cartridge and the underside of the cover, the deformable element 1300 may be compressed only slightly, or possibly not at all, when the cover 120 is closed. The deformable element 1300 is thus able to accommodate a range of filter cartridge sizes.

Figure 16:
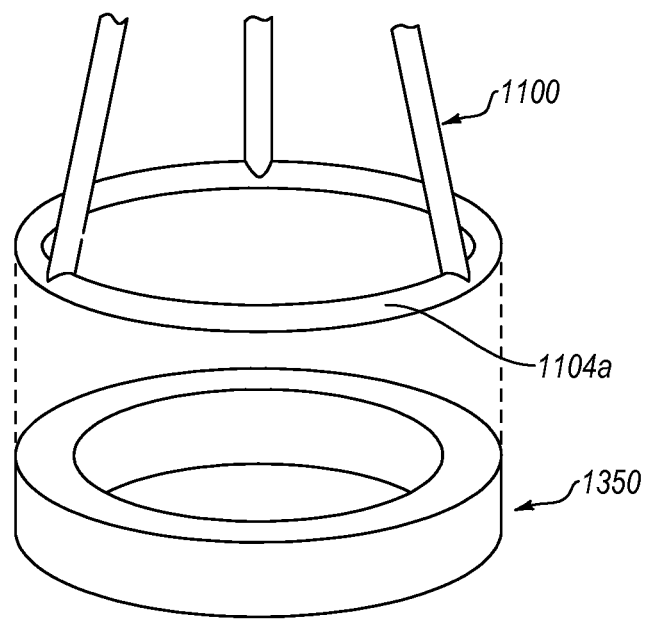
FIG. 16 is a partial perspective view of another example deformable element.

With attention now to FIG. 16, details are provided concerning aspects of an alternative embodiment of a deformable element 1350. Similar to the example of FIG. 15, a deformable element 1350 is provided for use in connection with the adapter element 1100. Except as may be noted below, the discussion of the deformable element 1300 of FIG. 15 applies as well to the deformable element 1350 in FIG. 16.

In the example of FIG. 16, the deformable element 1350 is located beneath the adapter element 1100, namely, between the adapter element 1100 and the filter cartridge 1200. The deformable element 1350 is in the shape of a ring so as to be able to accommodate an air vent dome of a filter cartridge. In terms of its composition and performance, the deformable element 1350 can be similar, or identical, to the deformable element 1300.

In some embodiments, a plurality of deformable elements, such as deformable element 1300 and deformable element 1350 for example, can be used together with an adapter element. Among other things, use of multiple deformable elements in this way may lend a further degree of adaptability with regard to the use of filter cartridges of different sizes.

H. General Aspects of Some Example Flumes

Directing attention now to FIGS. 17a-20b, fluid containers, such as a pitcher for example, can include a flume, one embodiment of which is denoted at 1400 in FIGS. 17a-17e. At least some embodiments of the flume 1400 are compatible for use with multiple different filter cartridge configurations, examples of which are disclosed in FIGS. 21a-21f below. It should be noted that except for its inclusion of a flume 1000 instead of a filter management element 200a/200b, or adapter element 1100/1150, the elements of a pitcher disclosed in FIGS. 17a-20b may be the same, or identical, to the corresponding elements of pitcher 100, although that is not required. Thus, a detailed description of a pitcher or other fluid container is not provided here. Following is a discussion of some general aspects of example flumes.

In general, embodiments of a flume, such as the example flume 1400, may perform a variety of different functions, examples of which include seating and retention of a filter cartridge. As these functions, and their performance, are the same, or identical, to those disclosed in connection with other structures such as a filter management element, or adapter element, a detailed discussion of the performance of filter cartridge seating and retention functions by embodiments of the flume is not provided. Other functions of the flume, such as direction of fluid flow, are discussed in detail below.

It should be noted at the outset that the scope of the invention is not limited to the particular configuration, arrangement, and orientation of the flume 1400 indicated in FIGS. 17a-17e. Rather, the illustrated flume is provided as an example for illustrating various concepts underlying the general notion of a flume.

Consistent with the foregoing, a variety of other example flumes having various configurations, arrangements, and orientations are disclosed, for example, in FIGS. 18a-20b. Examples of such alternate flumes include those referred to as constituting a "protrusion" in the United States provisional applications referenced, and incorporated, herein. In this regard, it should be noted that a flume can be used alone in connection with a fluid container, or in any combination with any other protrusion or filter management element disclosed in the aforementioned United States provisional applications and/or in the related applications referred to herein. These combinations of elements and devices are considered to be within the scope of the invention.

In general, embodiments of a flume can provide a variety of functions. By way of example, a flume may serve to perform any one or more of seating, aligning, and/or retaining a filter cartridge in a reservoir or other container, and directing fluid flow within the container. In at least some embodiments, the flume may implement multiple functionalities.

In view of the foregoing, it will be appreciated that the disclosed embodiments of a flume are example structural implementations of a means for performing any combination of a variety of different functions. These functions include, but are not limited to, directing fluid flow within a container, aligning a filter cartridge, seating a filter cartridge, retaining a filter cartridge in a sealing range. The scope of the invention is not limited to the example structures disclosed herein however and, instead, extends to any other structure(s) capable of performing any combination of the aforementioned functionalities. As well, the aforementioned means is not limited to such functionalities and may perform a variety of additional, or alternative, functions as well.

With reference to the aforementioned example functions, embodiments of a flume may serve to direct the flow of fluid within a container, such as a pitcher, bottle, jug or carafe for example. In at least some particular embodiments, the flume directs incoming water away from a filter cartridge and, particularly, the air vents of the filter cartridge. This functionality may, among other things, help to prevent, or at least attenuate, airlock and/or media compaction.

Additionally, or alternatively, a flume may be provided within a fluid container and generally configured and arranged to transmit a force to an associated filter cartridge in a direction and magnitude such that, if the filter cartridge is not already properly seated on a filter seat of the container, the filter cartridge will be moved into a sealing range defined by the filter seat. The flume may directly contact the filter cartridge during a process to seat the filter cartridge within the sealing range, although that is not required and, alternatively, one or more intervening structures can be used to transfer a force exerted by the flume to the filter cartridge.

As well, the flume may serve to retain the filter cartridge within the sealing range. To perform this function, it is not necessary that the flume remain in contact with the filter cartridge once the filter cartridge is in the sealing range of the candle, although the flume may do so in some instances. More generally, the flume can be positioned in any location where it is able to prevent the filter cartridge from moving out of the sealing range. This can be accomplished either with the flume in contact with the filter cartridge, or with the flume spaced apart from the filter cartridge but positioned such that the filter cartridge is prevented by the flume from moving out of the sealing range.

Finally, some embodiments of a flume may help to align a filter cartridge in a candle or other receptacle. By way of example, the flume may be used to move a filter cartridge into substantial axial alignment with the candle or other receptacle. This alignment can be required, for example, when a filter cartridge is only partly received within the candle or other receptacle.

In general, and as will be evident from the various flume configurations disclosed herein, embodiments of the flume can take any form or configuration consistent with their function(s) and so are not constrained to any particular form or configuration, nor location relative to the filter cartridge or any other element of a fluid container. As well, the flumes need not take any particular configuration, orientation, or location. In terms of their overall composition, the example flumes disclosed herein can be made of any suitable materials, examples of which include, glass, plastic, elastomeric materials such as rubber, ceramic, composites, and metal, or any group of one or more of those.

I. Aspects of Some Example Flumes

Figure 17A:
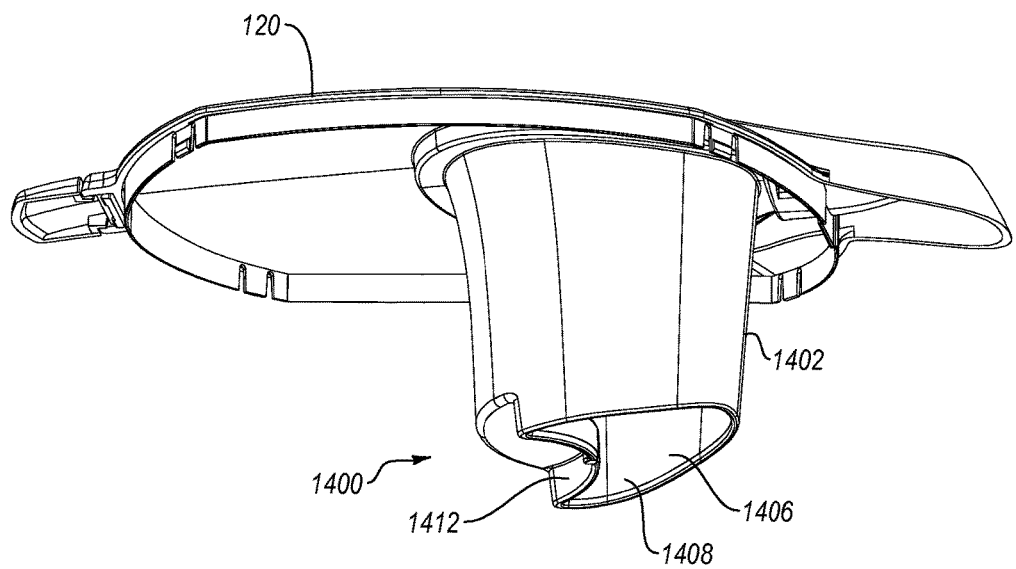
FIG. 17a is a bottom perspective view of an example cover and flume.
Figure 17B:
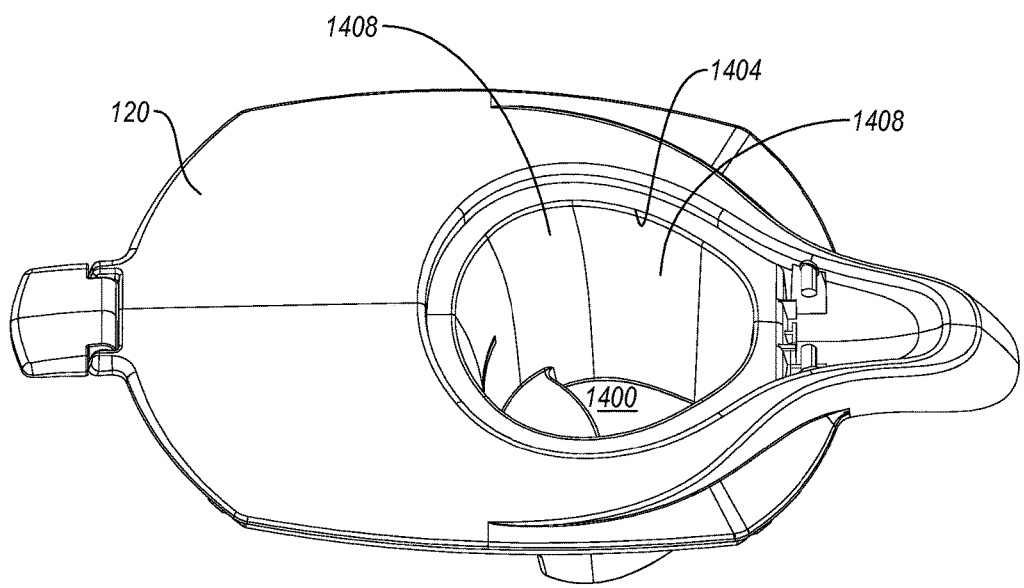
FIG. 17b is a top perspective view of an example cover and flume.
Figure 17C:
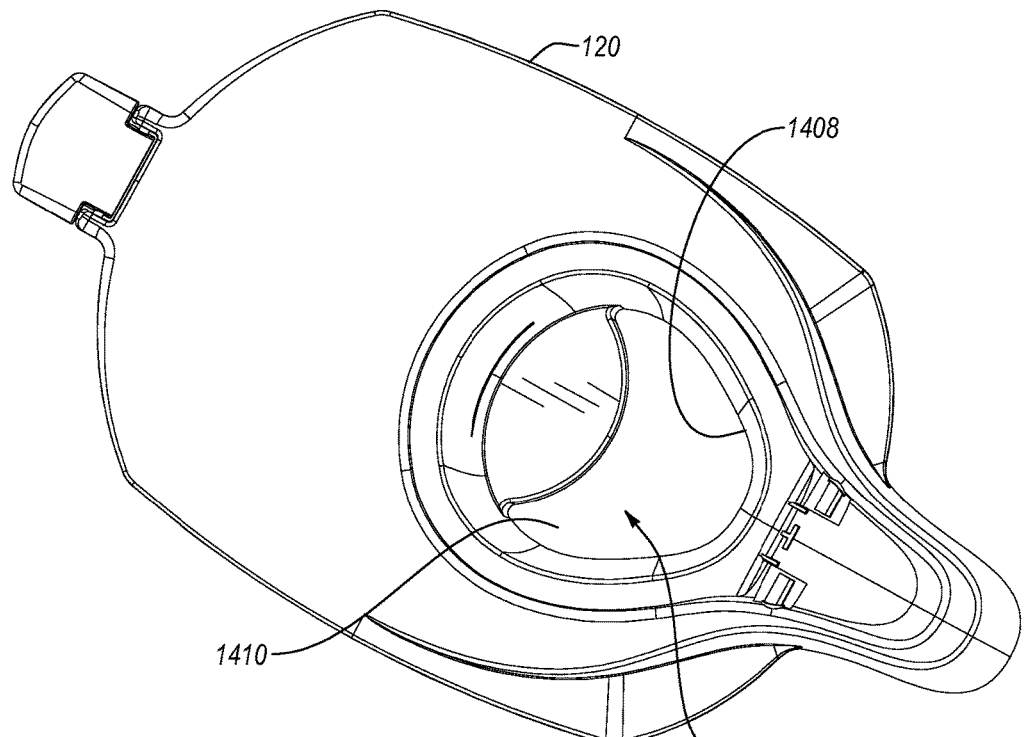
FIG. 17c is another bottom perspective view of an example cover and flume.
Figure 17D:
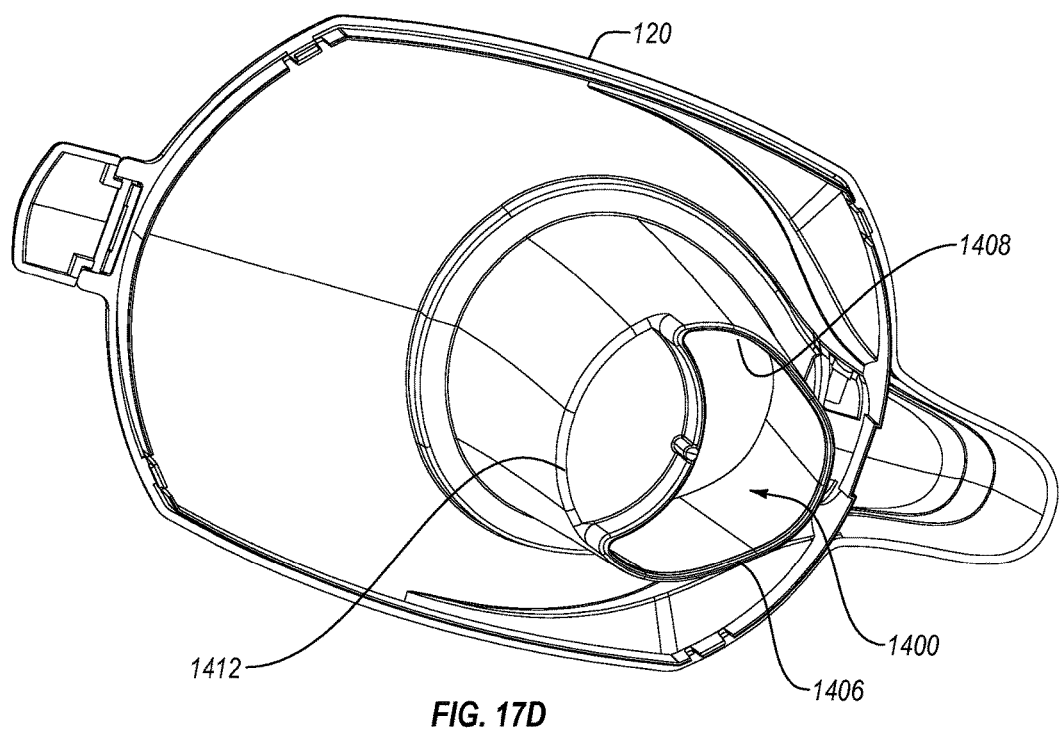
FIG. 17d is a further bottom perspective view of an example cover and flume.
Figure 17E:
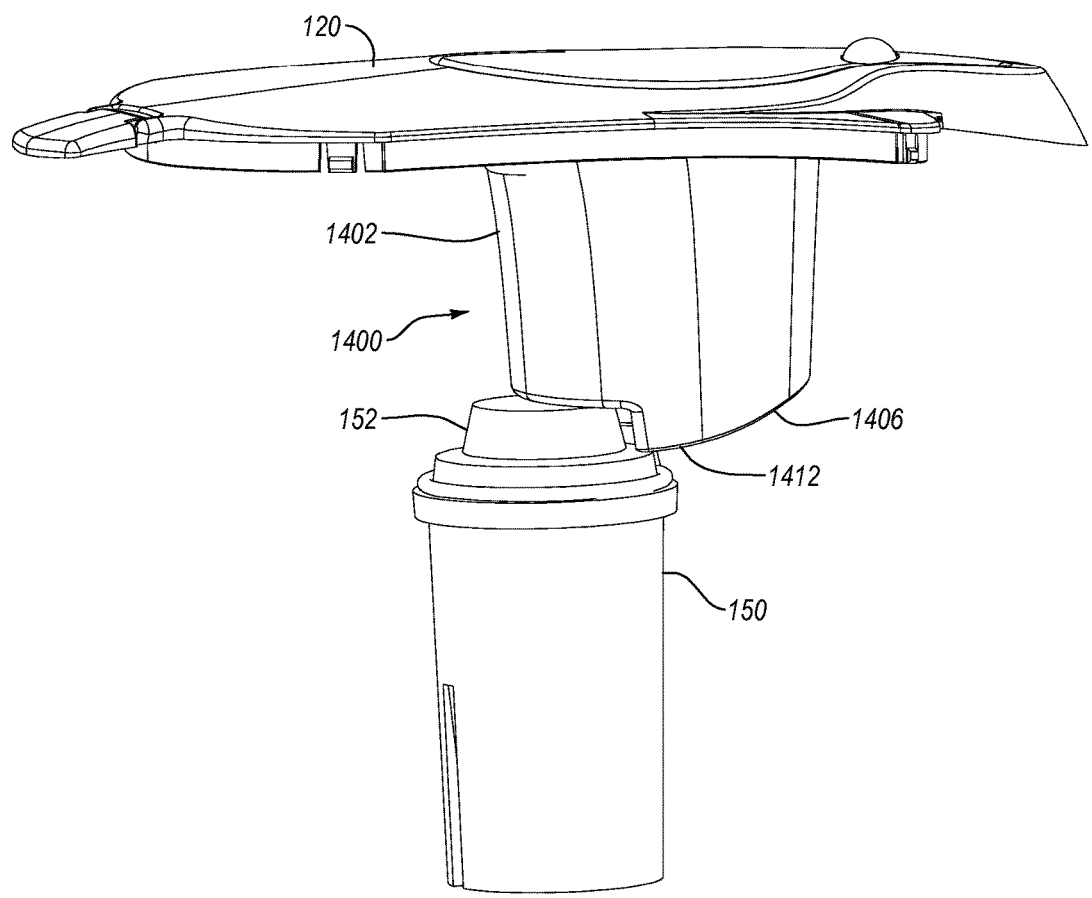
FIG. 17e is a side perspective view of an example cover and flume, and indicating an interface between the flume and a filter cartridge.

Turning now to FIGS. 17a-17e, and with reference as well to FIG. 1c, further details are provided concerning the example flume 1400. In some embodiments, the example flume 1400 may be integrally formed with, or otherwise connected to, the cover 120. In some instances, the flume 1400 may be detachably connected to the cover 120 so that it can be removed and replaced if desired by a user. The flume 1400 is configured to be substantially, or completely, received within the untreated water reservoir 112. As best indicated in FIG. 17e, the flume 1400 can be sized and configured to be positioned proximate the filter cartridge 150 when the filter cartridge 150 is present in the candle 114.

In the illustrated example, the flume 1400 includes a substantially hollow body 1402 that includes an inlet 1404, and an outlet 1406 arranged for fluid communication with the untreated water reservoir 112 when the flume 1400 is positioned as indicated in FIG. 17e. The inlet 1404 and outlet 1406 may have about the same, or different, cross-section areas. In the example of FIGS. 17a-17e, the inlet 1404 has a cross-section area that is larger than a cross-section area of the outlet 1406. As well, the inlet 1404 slopes from the front of the flume 1400 downward toward the back of the flume 1400, while the outlet 1406 slopes in the opposite fashion, namely, downward from the back of the flume 1400 toward the front of the flume 1400.

Within the body 1402, a plurality of flume surfaces 1408 cooperate to define a fluid passage 1410 that extends from the inlet 1404 to the outlet 1406. The flume 1400 additionally includes a contact portion 1412 located proximate the outlet 1406 and engageable with the filter cartridge 150 such that when the contact portion 1412 is engaged with the filter cartridge 150, a portion of the filter cartridge 150 engaged by the contact portion is located outside of the fluid passage 1410. In general, the contact portion 1412 can have any size, shape, configuration and/or orientation that enables it to perform any combination of the functions disclosed herein.

With regard to the particular flume 1400, the contact portion 1412 may configured to receive a portion of the filter cartridge 150, as best shown in FIG. 17e. The received portion of the filter cartridge 150 can be the air vent dome 152, but that is not required. When the contact portion 1412 is configured as shown in the example of FIG. 17e, and FIGS. 18a-20b discussed below, the flume 1400 can aid in vertically aligning the filter cartridge 150. This is because the contact portion 1412 can contact not only the top of the filter cartridge 150, but also the side of the filter cartridge 150. By exerting a lateral force on the side of the filter cartridge 150, the contact portion 1412 can thus adjust the lateral position of the filter cartridge 150.

When the portion of the filter cartridge 150 received by the contact portion 1412 is the air vent dome 152, the flume 1400 and filter cartridge 150 can be arranged in the untreated water reservoir 112 in such a way that the contact portion 1412 has no material effect on air flow from the air vent dome 152. Moreover, the configuration and arrangement of the flume 1400 may be such that the flume 1400 is able to direct incoming fluid away from the air vent dome 152 so as to prevent, or at least reduce, any airlock and/or media compaction that might otherwise be experienced in the filter cartridge 150 as a result of the incoming water.

With continued reference to FIGS. 17a-17e, further details are provided concerning the relation between the flume 1400 and the filter cartridge 150. In the example embodiment of FIG. 17e, the flume 1400 is positioned between the cover 120 and the top of the filter cartridge 150 such that when a user places the cover 120 in the fully closed position indicated in FIG. 17e, the cover 120 exerts a force "F" (see FIG. 2), either directly or indirectly, on the flume 1400 that is then transferred by the flume 1400 to the top of the filter cartridge 150. The exertion of this force moves the filter cartridge 150 into sealing contact with a filter seat, such as the filter seat 118 (see FIG. 2).

As shown in FIG. 17e, the flume 1400 may remain in contact with the filter cartridge 150 even after the filter cartridge 150 is properly aligned and seated. This contact can be maintained, for example, by retaining the cover 120 in the fully closed position indicated in FIG. 17e. One useful aspect of this arrangement is that the filter cartridge 150 remains properly aligned and seated even when the water pitcher 100 is tipped. Thus, the user need not be concerned with bypass that could result if the filter cartridge 150 were to become misaligned or unseated.

Similar to the case of the adapter element and filter management element disclosed herein, at least some embodiments of the flume are configured and arranged to provide, or enable, immediate and unambiguous feedback, such as sensory feedback, to the user if the filter cartridge 150 is not properly seated. Such feedback can include, for example, the audible feedback produced by the cover 120, as discussed elsewhere herein. Briefly, and as described in more detail elsewhere herein, if a filter cartridge 150 is not properly seated, engaging the cover 120 with the untreated water reservoir 112, thereby exerting a downward force on the flume 1400 that is transferred to the filter cartridge 150 so as to move the filter cartridge into the sealing range, causes a snapping sound that indicates to the user that the filter cartridge 150 has been moved into the sealing position, since the cover 120 cannot be engaged with the untreated water reservoir 112 otherwise.

J. Further Example Flume Embodiments

Directing attention now to FIGS. 18a-20b, details are provided concerning various alternative embodiments of a flume. In general, and as noted elsewhere herein, a flume can have any configuration that is consistent with the functionality that it is intended to perform, where such functionality can include any one or more of seating, aligning, and/or retaining a filter element in a reservoir or other container and, directing fluid flow within the container. Thus, the alternative embodiments of FIGS. 18a-20b are presented solely by way of example. Except as may be noted below, the flumes of FIGS. 18a-20b may be similar, or identical, to the flume 1400.

Figure 18A:
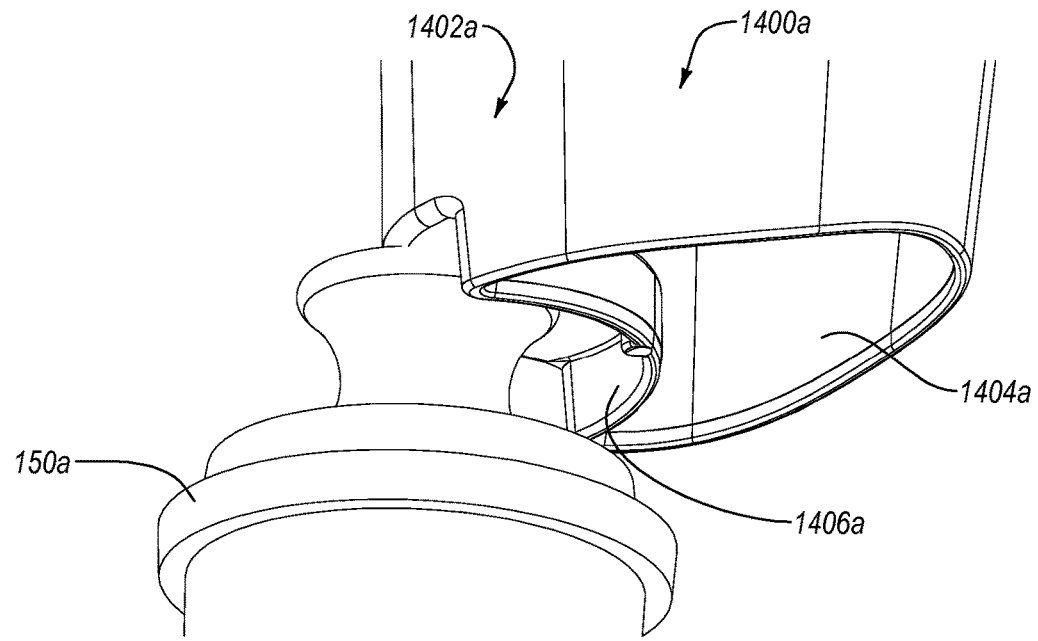
FIGS. 18a-20b disclose aspects of various example flume embodiments.

With particular attention first to FIG. 18a, a portion of a flume 1400a is illustrated that includes a substantially hollow body 1402a that has a generally semicircular cross-section shape. The body 1402a defines an outlet 1404a with a similarly shaped cross-section. As in the case of all the flume embodiments disclosed herein, the size, shape, and location of the outlet in a flume can vary from one embodiment to another. As well, more than one outlet can be provided in a single embodiment, and such outlets can be located on the front, rear, and/or one or more sides of the flume.

As indicated in FIG. 18a, the body 1402a also defines a contact portion 1406a whose shape is generally complementary to a shape of an associated filter cartridge 150a. The contact portion 1406a is sized and configured to contact, at least temporarily, the filter cartridge 150a in some circumstances, such as when the flume 1400a moves the filter cartridge 150a into a sealing range. The contact portion 1406a may, or may not, be in contact with the filter cartridge 150a after the filter cartridge 150a resides in the sealing range. These same considerations can inform the configuration and arrangement of the respective contact portions of the flumes disclosed in FIGS. 18a-20b and as such, those contact portions are not specifically addressed in the discussion of those Figures.

Figure 18B:
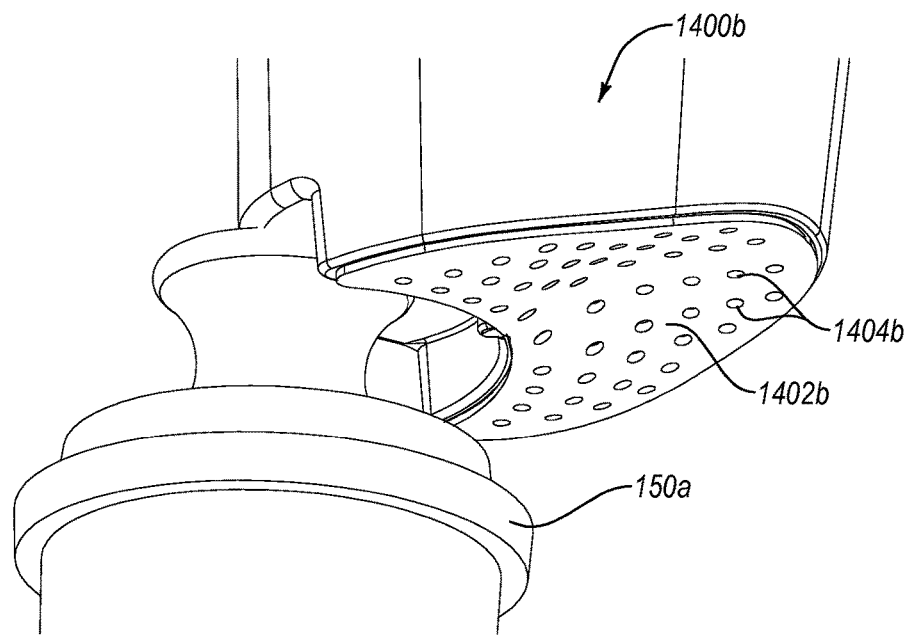

Turning now to FIG. 18b, a portion of a flume 1400b is disclosed that is generally similar to flume 1400a. In contrast with flume 1400a however, flume 1400b includes a floor 1402b that includes a plurality of perforations 1404b. The perforations 1404b collectively form an outlet of the flume 1400b. Aspects such as the size, number, shape, and distribution of the perforations 1404b can be implemented as required to enable one or more of the functionalities disclosed herein.

Where employed, the perforations 1404b may help to reduce a flow rate out of the flume 1400b to an extent that fluid impingement on one or more portions of the filter cartridge 150a is reduced, or minimized. This relative reduction in flow rate can thus help to avoid media compaction and/or airlock, but the extent to which the flow rate is reduced may have to be balanced against other considerations, such as the need to provide a satisfactory experience, namely, an adequate flow rate, to a user.

Figure 19A:
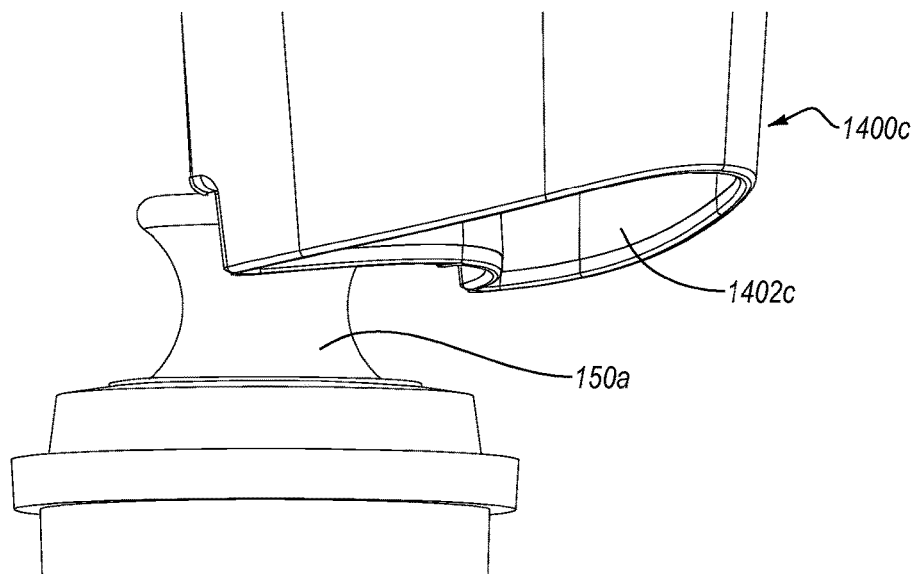

With reference now to FIG. 19a, another embodiment of a flume, denoted at 1400c, is disclosed. The flume 1400c is generally similar to the flume 1400a, at least in terms of the nature of the outlet 1402c which is open, rather than having a construction like that of the flume 1400b. However, the outlet 1402c is generally elongate in form, and tapers from a relatively wider portion near the filter cartridge 150a to a narrow, truncated configuration at the opposing end.

Figure 19B:
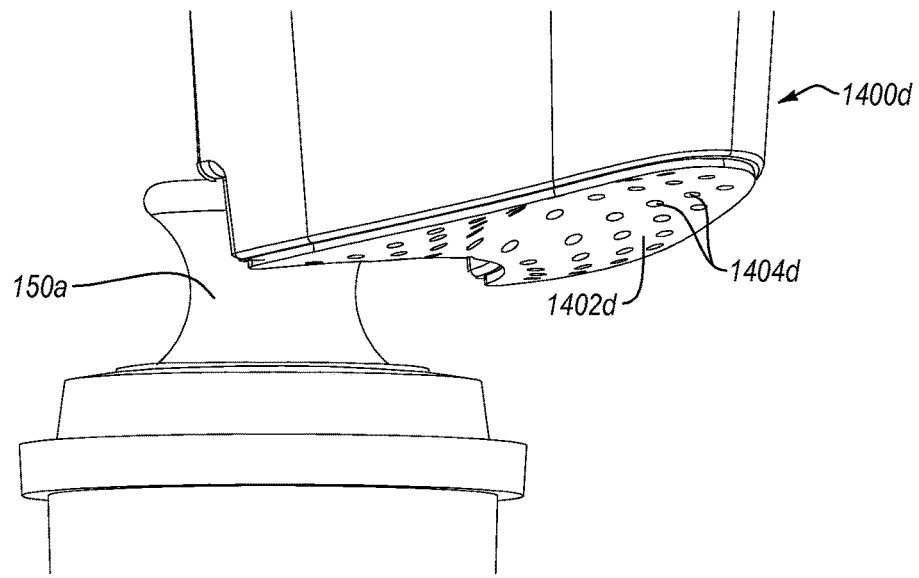

The flume 1400d in FIG. 19b is similar in terms of its shape to the flume 1400c. In contrast with that embodiment however, the flume 1400d includes a floor 1402d that includes a plurality of perforations 1404d. As such, the considerations noted above in the discussion of the flume 1400b apply as well to flume 1400d.

Figure 20A:
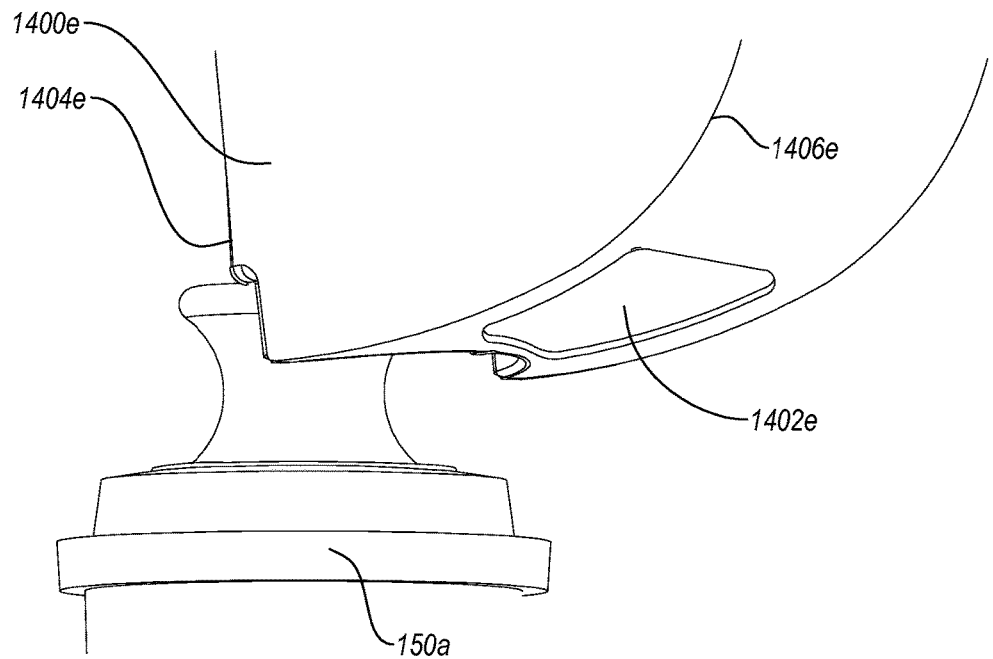

With reference now to FIG. 20a, another embodiment of a flume, denoted at 1400e, is disclosed. The flume 1400e is generally similar to flumes 1400a and 1400c, at least in terms of the nature of the outlet 1402e which is open, rather than having a construction like that of the flumes 1400b and 1400d. However, the overall shape of the flume 1400e is somewhat different from that of the flumes 1400b and 1400d in that, for example, the flume 1400e has a general vertical front surface 1404e that extends downward and intersects with a curved rear surface 1406e. The outlet 1402e is situated at the lower end of the curved rear surface 1406e, although the outlet 1402e could be located elsewhere on the flume 1400e.

Figure 20B:
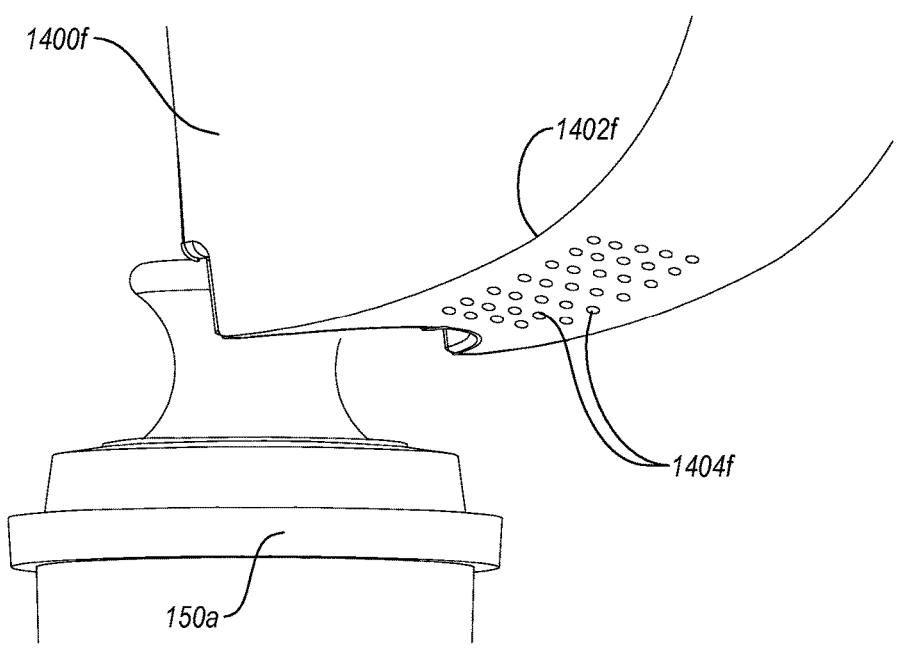
Figure 21A:
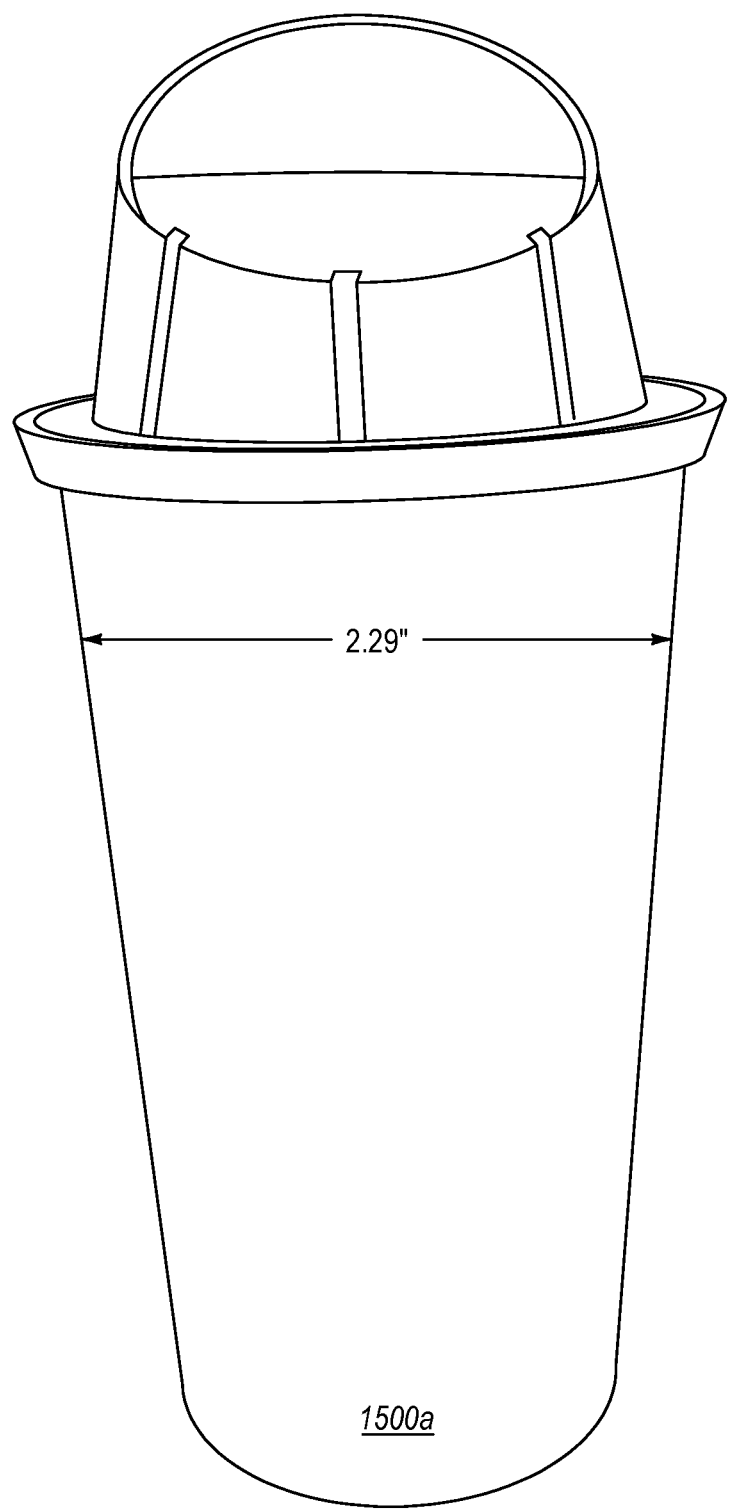
FIGS. 21a-21f are side views of example filter cartridges that can be employed with various embodiments of one or more of a filter management element, a protruding element of a filter cartridge seat, an adapter element, and a flume.
Figure 21B:
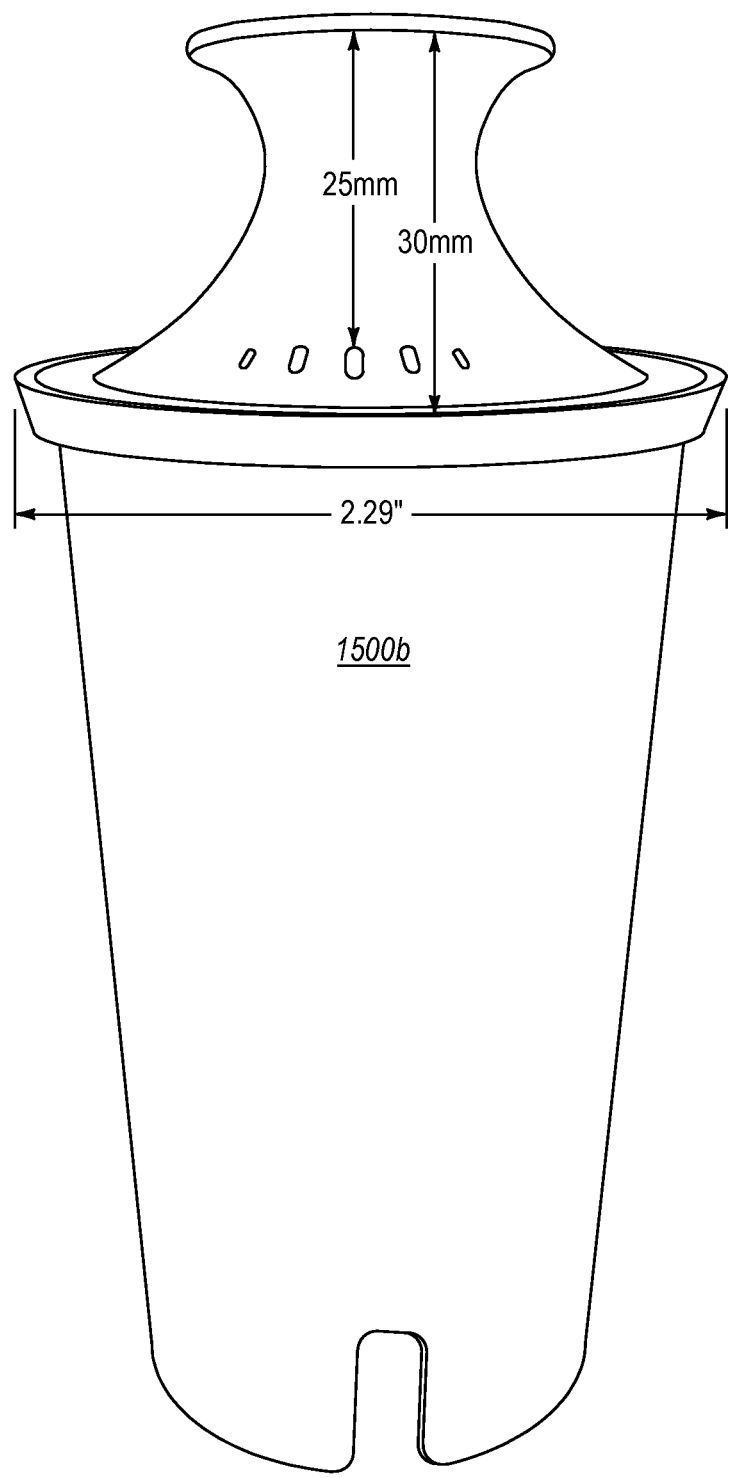
Figure 21C:
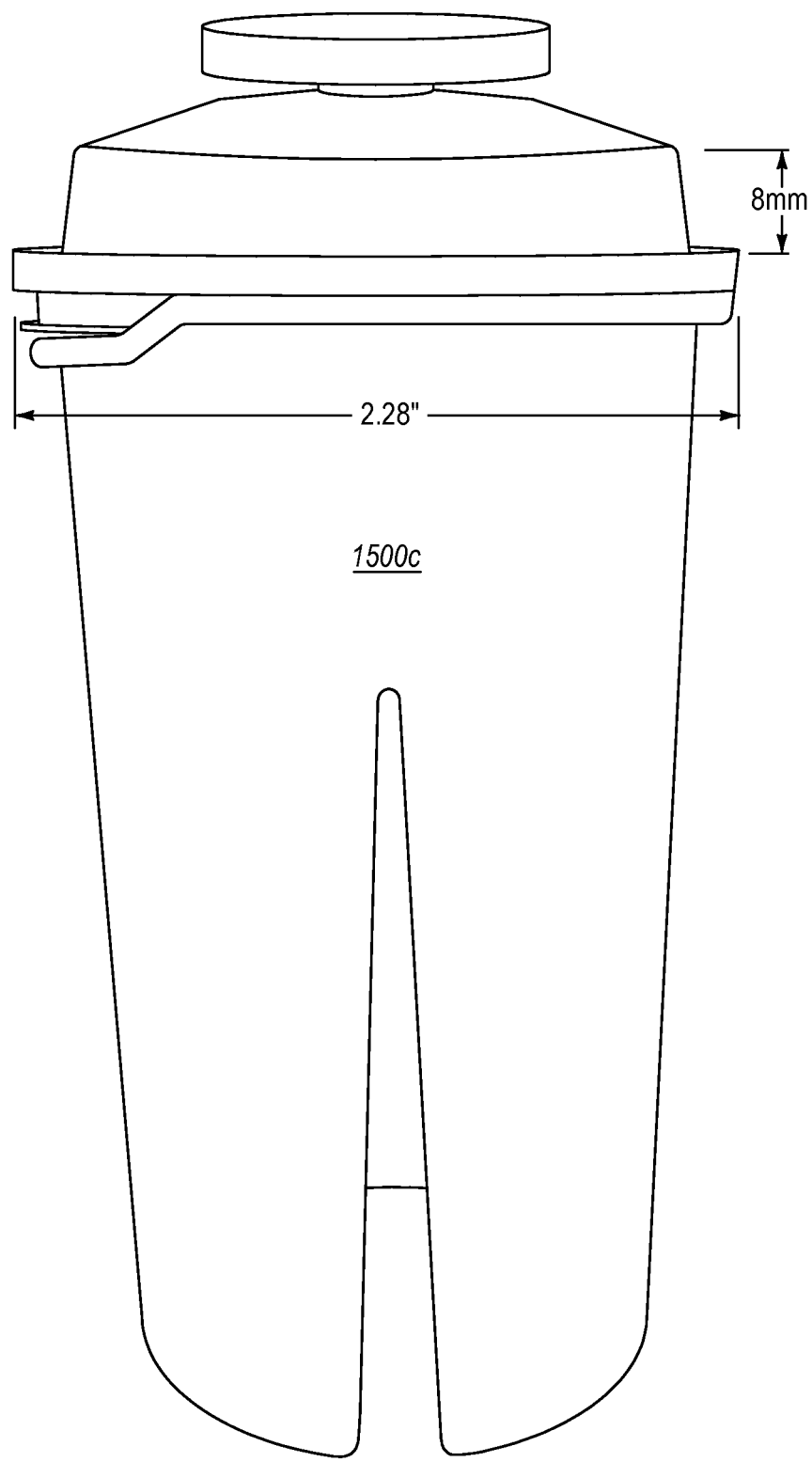
Figure 21D:
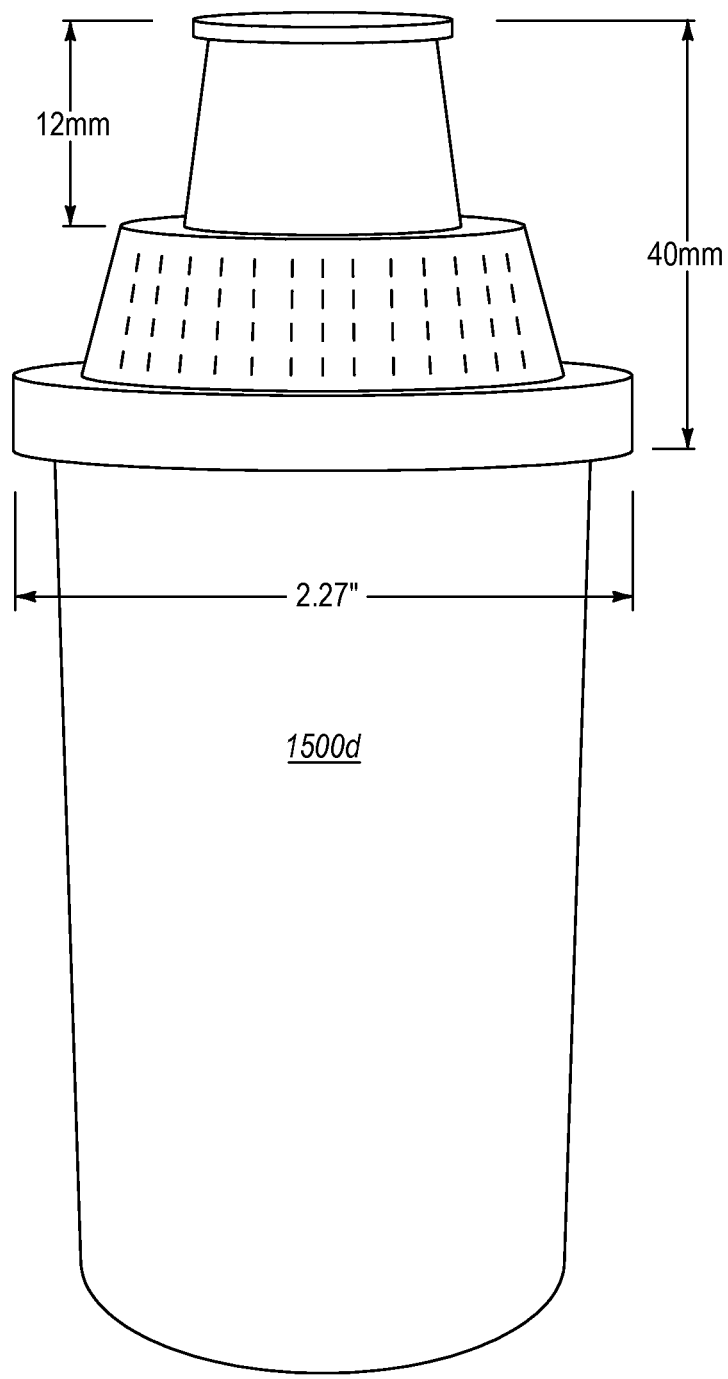
Figure 21E:
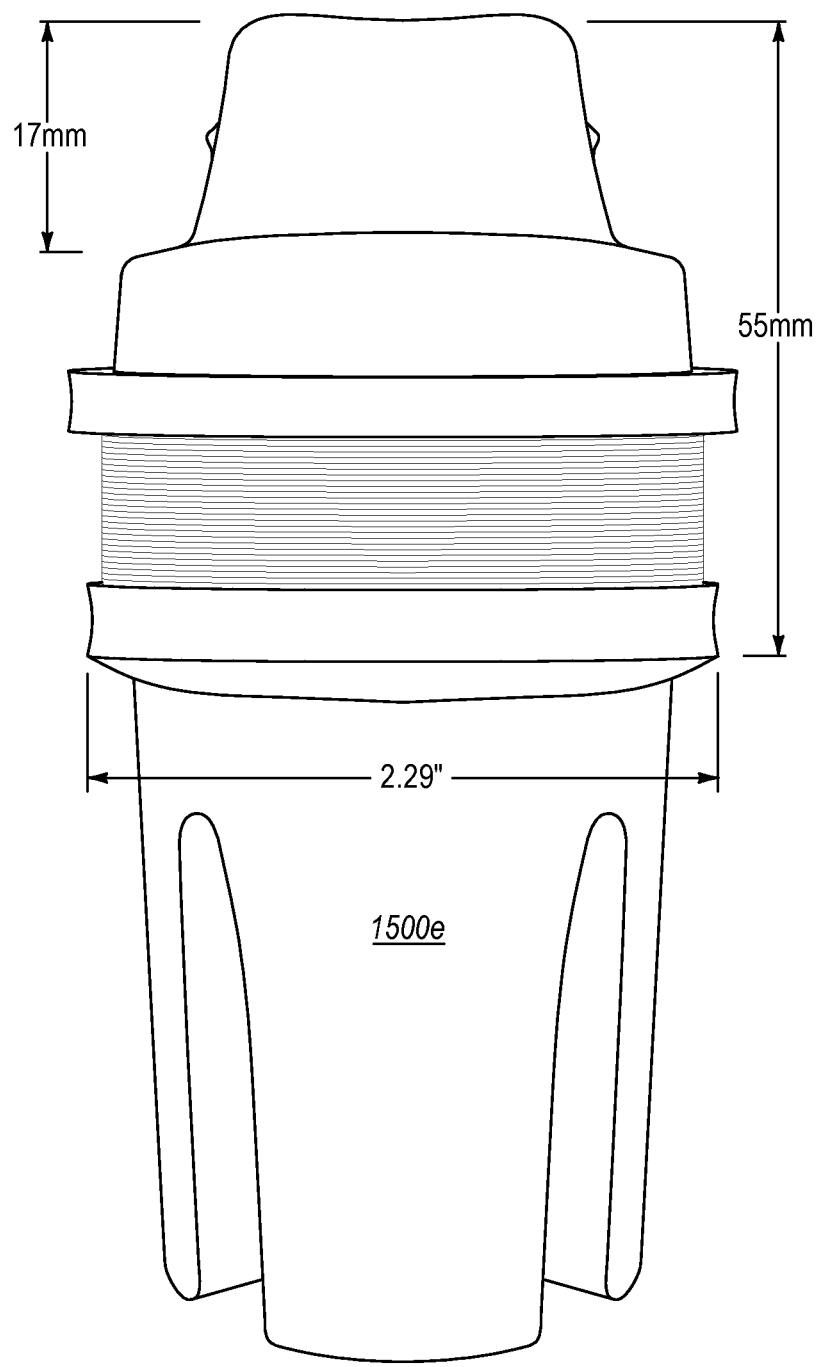
Figure 21F:
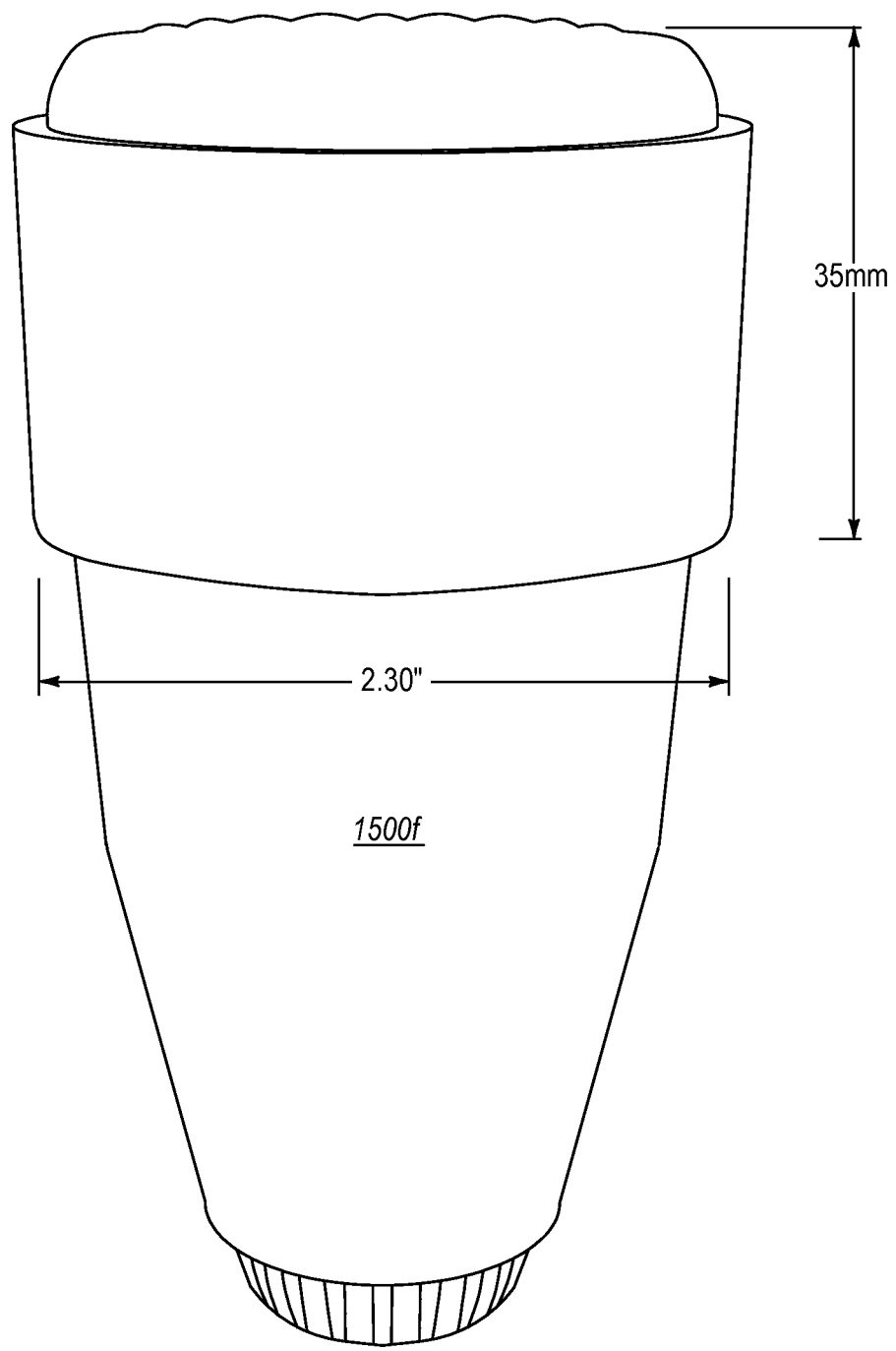

The flume 1400f in FIG. 20b is similar in terms of its shape to the flume 1400e. In contrast with that embodiment however, a lower portion of the curved rear surface 1402f includes a plurality of perforations 1404f. As such, the considerations noted above in the discussion of the flumes 1400b and 1400d apply as well to flume 1400f. It should be noted, that as in the case of flumes 1400b and 1400d, additional or alternative groups of perforations can be provided at any other location of the flume including, for example, the front portion nearest the filter cartridge 150a, the rear, and/or one or both of the sides.

K. Example Filter Cartridge Configurations

Turning finally to FIGS. 21a-21f, examples of various filter cartridge configurations are disclosed. In particular, at least some embodiments of a flume are configured and arranged such that, in operation, those embodiments can effect movement of one or more of the filter cartridges 1500a-1500f into a sealing range of an associated candle, as well as retention of the filter cartridges once the filter cartridges are positioned in the sealing range. Thus, embodiments of the invention are not constrained for use with any particular filter cartridge configuration(s). While the illustrated filter cartridges are indicated as having various dimensions, those dimensions are provided solely by way of example and are not intended to limit the scope of the invention in any way.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A pitcher comprising:
   a chassis that at least partly defines a treated water reservoir;
   a filter cartridge;
   an untreated water reservoir removably received in the chassis and including a candle that defines a receptacle with a fluid inlet and a fluid outlet, the fluid outlet arranged for fluid communication with the treated water reservoir, the receptacle configured to removably receive the filter cartridge, and the candle including a filter seat that cooperates with the filter cartridge to form a substantially fluid-tight seal when the filter cartridge is positioned in a sealing range defined by the candle;
   a cover that encloses part of the untreated water reservoir; and
   a flume rigidly connected to an underside of the cover and extending downward toward the candle, and part of the flume is configured and arranged to be located relative to the filter cartridge such that when the cover is closed and the filter cartridge resides in the sealing range, the flume prevents the filter cartridge from moving out of the sealing range, wherein the flume is configured and arranged such that a fluid inlet portion and air vents of the filter cartridge are not blocked by the flume, and the flume defines a fluid passage that extends away from the filter cartridge.

2. The pitcher as recited in claim 1, wherein when the filter cartridge is in the sealing range, fluid can flow from the untreated water reservoir to the treated water reservoir only by passing through the filter cartridge.

3. The pitcher as recited in claim 1, wherein a portion of the flume is in contact with the filter cartridge when the filter cartridge resides in the sealing range and the cover is closed.

4. The pitcher as recited in claim 1, wherein the filter cartridge comprises granular filter media.

5. A pitcher, comprising;
   a plastic chassis that at least partly defines a treated water reservoir;
   a filter cartridge;

an untreated water reservoir removably received in the chassis and including a candle that defines a receptacle with a fluid inlet and a fluid outlet, the fluid outlet arranged for fluid communication with the treated water reservoir, the receptacle configured to removably receive the filter cartridge, and the candle including a filter seat that cooperates with the filter cartridge to form a substantially fluid-tight seal when the filter cartridge is positioned in a sealing range defined by the candle;

a cover that encloses part of the untreated water reservoir; and a structural element rigidly connected to an underside of the cover and extending downward toward the candle, and part of the structural element is configured and arranged to be located relative to the filter cartridge such that when the cover is closed and the filter cartridge resides in the sealing range, the structural element prevents the filter cartridge from moving out of the sealing range, wherein the structural element comprises a fluid conduit having an inlet located proximate the cover and the fluid conduit also having an outlet located proximate the filter cartridge.

6. The pitcher as recited in claim 5, wherein the structural element comprises a flume that defines a fluid passage that extends away from one or more air vents and/or fluid inlets located at or near the top of the filter cartridge.

* * * * *